United States Patent
Kitazato et al.

(10) Patent No.: US 11,044,517 B2
(45) Date of Patent: *Jun. 22, 2021

(54) RECEIVING DEVICE, RECEIVING METHOD, TRANSMITTING DEVICE, AND TRANSMITTING METHOD

(71) Applicant: Saturn Licensing LLC, New York, NY (US)

(72) Inventors: Naohisa Kitazato, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/529,440

(22) Filed: Aug. 1, 2019

(65) Prior Publication Data

US 2020/0029120 A1    Jan. 23, 2020

Related U.S. Application Data

(63) Continuation of application No. 16/053,517, filed on Aug. 2, 2018, now Pat. No. 10,448,087, which is a (Continued)

(30) Foreign Application Priority Data

Oct. 4, 2013    (JP) .................................. 2013-209056

(51) Int. Cl.
*H04N 21/434* (2011.01)
*H04N 21/2362* (2011.01)
(Continued)

(52) U.S. Cl.
CPC ........ *H04N 21/4343* (2013.01); *H04H 20/95* (2013.01); *H04N 21/2362* (2013.01);
(Continued)

(58) Field of Classification Search
None
See application file for complete search history.

(56) References Cited

U.S. PATENT DOCUMENTS 8,087,052 B2    12/2011    Lee et al.
9,661,397 B2     5/2017    Kim et al.
(Continued)

FOREIGN PATENT DOCUMENTS

| JP | 2009-505557 A | 2/2009 |
| JP | 2012-156712 A | 8/2012 |
| KR | 10-2013-0127990 A | 11/2013 |

OTHER PUBLICATIONS

Extended European Search Report dated Feb. 22, 2017 in Patent Application No. 14850234.7.
(Continued)

*Primary Examiner* — Alexander Q Huerta
(74) *Attorney, Agent, or Firm* — Oblon, McClelland, Maier & Neustadt, L.L.P.

(57) ABSTRACT

A receiving device including a receiver and processing circuitry is provided. The receiver is configured to receive a broadcast stream. The broadcast stream includes a plurality of services. Each of the plurality of services includes one or a plurality of components and a first control signal transmitted by a unidirectional transport session. The processing circuitry is configured to process the one or the plurality of components constituting a particular service of the plurality of services included in the broadcast stream, and process the first control signal of the particular service received from signals transmitted by the unidirectional transport session according to an Internet Protocol (IP) address. Each of the plurality of services is associated with a different IP address that is contained in packets of the one or the plurality of components and the first control signal of the respective service, and in an IP layer.

20 Claims, 71 Drawing Sheets

Related U.S. Application Data continuation of application No. 14/914,950, filed as application No. PCT/JP2014/074782 on Sep. 19, 2014, now Pat. No. 10,085,057.

(51) Int. Cl.
| | | |
|---|---|---|
| *H04N 21/438* | (2011.01) | |
| *H04H 20/95* | (2008.01) | |
| *H04N 21/462* | (2011.01) | |
| *H04N 21/647* | (2011.01) | |
| *H04N 21/236* | (2011.01) | |
| *H04N 21/426* | (2011.01) | |
| *H04N 21/643* | (2011.01) | |

(52) U.S. Cl.
CPC . *H04N 21/23605* (2013.01); *H04N 21/42684* (2013.01); *H04N 21/434* (2013.01); *H04N 21/438* (2013.01); *H04N 21/4345* (2013.01); *H04N 21/4622* (2013.01); *H04N 21/64322* (2013.01); *H04N 21/64707* (2013.01)

(56) References Cited

U.S. PATENT DOCUMENTS

| | | | |
|---|---|---|---|
| 10,182,268 | B2 | 1/2019 | Kitahara et al. |
| 2008/0040762 | A1 | 2/2008 | Jung et al. |
| 2009/0316831 | A1 | 12/2009 | Song et al. |
| 2009/0320087 | A1 | 12/2009 | Song et al. |
| 2010/0050217 | A1 | 2/2010 | Suh et al. |
| 2010/0195633 | A1 | 8/2010 | Vare et al. |
| 2010/0281501 | A1 | 11/2010 | Paavola et al. |
| 2011/0289542 | A1* | 11/2011 | Kitazato ............ H04N 21/2625 725/115 |
| 2013/0034032 | A1 | 2/2013 | Vare et al. |
| 2013/0081094 | A1 | 3/2013 | Song et al. |
| 2013/0201399 | A1* | 8/2013 | Kitazato ............ H04N 5/4401 348/553 |
| 2013/0219431 | A1 | 8/2013 | Hong et al. |
| 2013/0305308 | A1* | 11/2013 | Lee ........................ H04H 20/40 725/116 |
| 2014/0157304 | A1 | 6/2014 | Fay et al. |
| 2014/0195879 | A1 | 7/2014 | Hong et al. |
| 2015/0007242 | A1* | 1/2015 | Fay ........................ H04H 60/00 725/116 |
| 2016/0037199 | A1* | 2/2016 | Oh ...................... H04N 21/4622 725/110 |
| 2016/0127757 | A1 | 5/2016 | Rushing et al. |
| 2016/0173945 | A1* | 6/2016 | Oh ........................ H04N 21/435 725/110 |
| 2016/0197970 | A1 | 7/2016 | Kitahara et al. |
| 2016/0198241 | A1 | 7/2016 | Kitazato |
| 2016/0301968 | A1* | 10/2016 | Takahashi ............. H04H 60/37 |
| 2016/0360241 | A1 | 12/2016 | Hong et al. |
| 2016/0360283 | A1 | 12/2016 | Kitahara et al. |
| 2018/0098132 | A1 | 4/2018 | Aitken et al. |
| 2018/0175955 | A1 | 6/2018 | Kitazato |
| 2018/0351674 | A1 | 12/2018 | Kitazato et al. |

OTHER PUBLICATIONS

"ATSC Recommended Practice: Guide to the ATSC Mobile DTV Standard", Doc. A/154:2013, Advanced Television Systems Committee, XP17846702, Jan. 30, 2013, 88 pages.

Sung Oh Hwang et al., "Guidelines on How to Provide MMT Transport over Broadcasting Network", MMT over DVB-T2 CE Participants, ISO/IEC JTC1/SC29/WG11, MPEG 2013/mxxxx, XP30058054, Apr. 2014, 9 pages.

Extended European Search Report dated Jul. 18, 2018 in European Patent Application No. 18178227.7, citing documents AX and AY therein, 12 pages.

Kim, Y.H., "Proposal for MMT C.1 Layer Design: MMT Service Specific Information (SSI)", Motion Picture Expert Group or ISO/IEC JTC1/SC29/WG11, MPEG2001/M21513, XP030050076, 2011, pp. 1-31.

Shuichi Aoki et al., "Efficient Multiplexing Scheme for IP Packets over the Advanced Satellite Broadcasting System", IEEE Transactions on Consumer Electronics, vol. 55, No. 1, Feb. 2009, pp. 49-55.

TM-H-TF-SUL, TM-GBS Meeting, "Signalling Solution for NGH IP Profile", XP017833427, Jan. 27-28, 2011, 14 pages.

ARIB Standard, "Content Download System for Digital Broadcasting," Association of Radio Industries and Businesses, ARIB STD-B45 Ver. 2.2, Jul. 2, 2012, 10 pages.

Aoki, S., et al., "New Media Transport Technologies in Super Hi-Vision Broadcasting Systems", IBC 2013 Conference, Sep. 12-17, 2013, XP030082471, 8 pages.

Ewald-Arostegui et al., "A Framework for an IP-based DVB Transmission Network", International Journal of Digital Multimedia Broadcasting, vol. 2010, Article ID 394965, 2010, 13 pages and cover page.

* cited by examiner

FIG. 14

| Data Field Name | Data Type |
|---|---|
| Service_Guide_Delivery_Unit{ | |
|   Unit_Header{ | |
|     extension_offset | uimsbf32 |
|     reserved | 16bits |
|     n_o_service_guide_fragments | uimsbf24 |
|     for(i=0;i<n_o_service_guide_fragments;i++){ | |
|       fragmentTransportID[i] | uimsbf32 |
|       fragmentVersion[i] | uimsbf32 |
|       offset[i] | uimsbf32 |
|     } | |
|   } | |
|   Unit_Payload{ | |
|     for(i=0;i<n_o_service_guide_fragments;i++){ | |
|       fragmentEncoding[i] | uimsbf8 |
|       if(fragmentEncoding[i]=0){ | |
|         fragmentType | uimsbf8 |
|         XMLFragment | bytestring |
|       } | |
|       else if(fragmentEncoding[i]=1){ | |
|         validFrom | uimsbf32 |
|         validTo | uimsbf32 |
|         fragmentID | bytestring |
|         SDPFragment | bytestring |
|       } | |
|     } | |
|   } | |
|   if(extension_offset>0){ | |
|     extension_type | uimsbf8 |
|     next_extension_offset | uimsbf32 |
|     extension_data | bytestring |
|   } | |
| } | |

FIG. 24

| Data Field Name | Data Type |
|---|---|
| Service_Guide_Delivery_Unit{ | |
|   Unit_Header{ | |
|     extension_offset | uimsbf32 |
|     reserved | 16bits |
|     n_o_service_guide_fragments | uimsbf24 |
|     for(i=0;i<n_o_service_guide_fragments;i++) { | |
|       fragmentTransportID[i] | uimsbf32 |
|       fragmentVersion[i] | uimsbf32 |
|       offset[i] | uimsbf32 |
|     } | |
|   } | |
|   Unit_Payload{ | |
|     for(i=0;i<n_o_service_guide_fragments;i++) { | |
|       fragmentEncoding[i] | uimsbf8 |
|       if(fragmentEncoding[i]=0) { | |
|         fragmentType | uimsbf8 |
|         XMLFragment | bytestring |
|       } | |
|       else if(fragmentEncoding[i]=1) { | |
|         validFrom | uimsbf32 |
|         validTo | uimsbf32 |
|         fragmentID | bytestring |
|         SDPFragment | bytestring |
|       } | |
|     } | |
|     if(extension_offset>0) { | |
|       extension_type | uimsbf8 |
|       next_extension_offset | uimsbf32 |
|       url_length | 8bits |
|       for(i=0;url_length;i++) { | |
|         url_text | 8bits |
|       } | |
|     } | |
|   } | |
| } | |

FIG. 25

| | | | SCT | |
|---|---|---|---|---|
| ELEMENT/ATTRIBUTE | | | NUMBER OF APPEARANCE | DEFINITION |
| sct | | | | 1 | SERVICE CONFIGURATION TABLE |
| | @network_id | | | 1 | NETWORK ID<br>BROADCASTER IDENTIFIER PER PhysicalChannel |
| | @name | | | 0..1 | BROADCASTER NAME PER PhysicalChannel |
| | BBP_stream | | | 1..n | BBP stream |
| | | @transport_stream_id | | 1 | BBP STREAM IDENTIFIER |
| | | @payload_type | | 1 | BBP PAYLOAD TYPE "ipv4", "ipv6", "ts" |
| | | @name | | 0..1 | BBP STREAM NAME |
| | | ESG_bootstrap | | 0..1 | ACCESS INFORMATION TO ESG |
| | | | @source_IP_address | 1 | SOURCE IP ADDRESS FOR ESG TRANSMISSION |
| | | | @destination_IP_address | 1 | DESTINATION IP ADDRESS FOR ESG TRANSMISSION |
| | | | @UDP_port_num | 1 | PORT NUMBER FOR ESG TRANSMISSION |
| | | | @TSI | 1 | TSI OF FLUTE Session FOR ESG TRANSMISSION |
| | | service | | 1 | SERVICE |
| | | | @service_id | 1 | SERVICE IDENTIFIER |
| | | | @service_type | 1 | SERVICE TYPE "tv", "audio", "data", "htt", "esg", " |
| | | | SCS_bootstrap | 1 | ACCESS INFORMATION TO SERVICE CHANNEL |
| | | | | @source_IP_address | 1 | SOURCE IP ADDRESS FOR SERVICE TRANSMISSION |
| | | | | @destination_IP_address | 1 | DESTINATION IP ADDRESS FOR SERVICE TRANSMISSION |
| | | | | @port_num | 1 | PORT NUMBER FOR SCS TRANSMISSION |
| | | | | @TSI | 1 | TSI OF FLUTE Session FOR SCS TRANSMISSION |

FIG. 26

```
<?xml version="1.0" encoding="UTF-8" ?>
<SCT xmlns="urn:ATSC:2013:SCT:1.1"
  xmlns:xsi="http://www.w3.org/2001/XMLSchema-instance"
  xsi:schemaLocation="urn:ATSC:2013:SCT:1.1
  G:\original\ATSC\ATSC3.0\LLSschema\SCT.xsd" networkId="1803">
  <BBPStream BBPStreamId="123" payloadType="ipv4">
    <service serviceType="tv" serviceId="777">
      <SCBootstrap sourceIPAddress="43.22.107.126"
      destinationIPAddress="224.10.10.10" UDPPortNum="12345" TSI="3"/>
    </service>
    <service serviceType="tv" serviceId="666">
      <SCBootstrap sourceIPAddress="43.22.107.126"
      destinationIPAddress="224.10.10.12" UDPPortNum="78901" TSI="7"/>
    </service>
    <service serviceType="audio" serviceId="999">
      <SCBootstrap sourceIPAddress="43.22.107.126"
      destinationIPAddress="224.10.10.11" UDPPortNum="45678" TSI="5"/>
    </service>
  </BBPStream>
  <BBPStream BBPStreamId="456" payloadType="ipv4">
    <service serviceType="data" serviceId="555">
      <SCBootstrap sourceIPAddress="43.22.107.126"
      destinationIPAddress="224.10.10.21" UDPPortNum="27890" TSI="2"/>
    </service>
  </BBPStream>
</SCT>
```

FIG. 27

```xml
<?xml version="1.0" encoding="UTF-8"?>
<xs:schema xmlns="urn:ATSC:2013:SCT:1.1" xmlns:xs="http://www.w3.org/2001/XMLSchema" targetNamespace="urn:ATSC:2013:SCT:1.1" elementFormDefault="qualified">
    <xs:element name="SCT" type="SCTType"/>
    <xs:complexType name="SCTType">
        <xs:sequence>
            <xs:element name="BBPStream" type="BBPStreamType" maxOccurs="unbounded"/>
            <xs:any namespace="##other" processContents="lax" minOccurs="0" maxOccurs="unbounded"/>
        </xs:sequence>
        <xs:attribute name="networkId" type="xs:string" use="required"/>
        <xs:attribute name="name" type="xs:string" use="optional"/>
        <xs:anyAttribute processContents="skip"/>
    </xs:complexType>
    <xs:complexType name="BBPStreamType">
        <xs:sequence>
            <xs:element name="ESGBootstrap" type="FLUTESessionSpecifierType" minOccurs="0"/>
            <xs:element name="service" type="serviceType" maxOccurs="unbounded"/>
            <xs:any namespace="##other" processContents="lax" minOccurs="0" maxOccurs="unbounded"/>
        </xs:sequence>
        <xs:attribute name="BBPStreamId" type="xs:string" use="required"/>
        <xs:attribute name="payloadType" type="xs:string" use="required"/>
        <xs:attribute name="name" type="xs:string" use="optional"/>
        <xs:anyAttribute processContents="skip"/>
        <!--
            Type of payloadType.
            Allowed values are:
            "ipv4", "ipv6", "ts"
        -->
    </xs:complexType>
    <xs:complexType name="FLUTESessionSpecifierType">
        <xs:sequence>
            <xs:any namespace="##other" processContents="lax" minOccurs="0" maxOccurs="unbounded"/>
        </xs:sequence>
        <xs:attribute name="sourceIPAddress" type="xs:string" use="required"/>
        <xs:attribute name="destinationIPAddress" type="xs:string" use="required"/>
        <xs:attribute name="UDPPortNum" type="xs:unsignedInt" use="required"/>
        <xs:attribute name="TSI" type="xs:string" use="required"/>
        <xs:anyAttribute processContents="skip"/>
    </xs:complexType>
    <xs:complexType name="serviceType">
        <xs:sequence>
            <xs:element name="SCBootstrap" type="FLUTESessionSpecifierType"/>
            <xs:element name="adjunctService" type="adjunctServiceType" minOccurs="0" maxOccurs="unbounded"/>
            <xs:any namespace="##other" processContents="lax" minOccurs="0" maxOccurs="unbounded"/>
        </xs:sequence>
        <xs:attribute name="serviceId" type="xs:string" use="required"/>
        <xs:attribute name="serviceType" type="xs:string" use="required"/>
        <xs:anyAttribute processContents="skip"/>
        <!--
            Type of serviceType.
            Allowed values are:
            "tv", "audio", "data", "nrt", "esg", " adjunct-nrt", "adjunct-shared"
        -->
    </xs:complexType>
    <xs:complexType name="adjunctServiceType">
        <xs:sequence>
            <xs:element name="triplet" type="tripletType"/>
            <xs:any namespace="##other" processContents="lax" minOccurs="0" maxOccurs="unbounded"/>
        </xs:sequence>
        <xs:attribute name="serviceType" type="xs:string" use="required"/>
        <xs:anyAttribute processContents="skip"/>
        <!--
            Type of serviceType.
            Allowed values are:
            "adjunct-nrt", "adjunct-shared"
        -->
    </xs:complexType>
    <xs:complexType name="tripletType">
        <xs:sequence>
            <xs:any namespace="##other" processContents="lax" minOccurs="0" maxOccurs="unbounded"/>
        </xs:sequence>
        <xs:attribute name="networkId" type="xs:string" use="optional"/>
        <xs:attribute name="BBPStreamId" type="xs:string" use="optional"/>
        <xs:attribute name="serviceId" type="xs:string" use="required"/>
        <xs:anyAttribute processContents="skip"/>
    </xs:complexType>
</xs:schema>
```

FIG. 28

SAT

| ELEMENT/ATTRIBUTE | | | NUMBER OF APPEARANCE | DEFINITION |
|---|---|---|---|---|
| sat | | | 1 | SERVICE ASSOCIATION TABLE |
| | service | | 0..n | SERVICE ON AIR |
| | | @service_id | 1 | SERVICE IDENTIFIER ON AIR |

FIG. 29

```xml
<?xml version="1.0" encoding="UTF-8"?>
<xs:schema xmlns="urn:ATSC:2013:SAT:1.1" xmlns:xs="http://www.w3.org/2001/XMLSchema" targetNamespace="urn:ATSC:2013:SAT:1.1" elementFormDefault="qualified">
    <xs:element name="SAT" type="SATType"/>
    <xs:complexType name="SATType">
        <xs:sequence>
            <xs:element name="service" type="serviceType" minOccurs="0" maxOccurs="unbounded"/>
            <xs:any namespace="##other" processContents="lax" minOccurs="0" maxOccurs="unbounded"/>
        </xs:sequence>
        <xs:anyAttribute processContents="skip"/>
    </xs:complexType>
    <xs:complexType name="serviceType">
        <xs:sequence>
            <xs:any namespace="##other" processContents="lax" minOccurs="0" maxOccurs="unbounded"/>
        </xs:sequence>
        <xs:attribute name="serviceId" type="xs:string" use="required"/>
        <xs:anyAttribute processContents="skip"/>
    </xs:complexType>
</xs:schema>
```

FIG. 30

RRT

| ELEMENT/ATTRIBUTE | | | | | NUMBER OF APPEARANCE | DEFINITION |
|---|---|---|---|---|---|---|
| rrt | | | | | 1 | |
| | @rating_region | | | | 1 | RATING REGION |
| | | @name | | | 0..1 | RATING REGION NAME |
| | | dimension | | | 0..n | |
| | | | @name | | 0..1 | |
| | | | @graduated_scale | | 1 | |
| | | | rating_value | | 1..m | |
| | | | | @abbrev_rating_value | 1 | |
| | | | | @rating_value | 1 | |

FIG. 32

| SESSION | ROW | ENGLISH NAME | NECESSITY | PLURALITY | CONTENTS |
|---|---|---|---|---|---|
| SESSION DESCRIPTION | v= | protocol version | ○ | | INDICATING PROTOCOL VERSION. "0" IS ALWAYS USED AT RFC2327. |
| | o= | origin | ○ | | INDICATING INFORMATION ON CREATOR OF SDP DESCRIPTION DOCUMENT. USED FOR ID OF SESSION DESCRIPTION OR ORDER ASSURANCE AT UPDATING ETC. |
| | s= | session name | ○ | | INDICATING SESSION NAME. |
| | i= | session information | | | INDICATING INFORMATION ON SESSION. |
| | u= | URI | | | INDICATING URI FOR ACQUIRING ADDITIONAL INFORMATION ON SESSION. |
| | e= | email address | △ | | INDICATING E-MAIL ADDRESS FOR CONTACT WITH SESSION MANAGER. |
| | p= | phone number | △ | | INDICATING TELEPHONE NUMBER FOR CONTACT WITH SESSION MANAGER. |
| | c= | connection data | △ | | INDICATING INFORMATION ON NETWORK ADDRESS USED FOR SESSION. |
| | b= | (session) bandwidth | | | INDICATING USE BAND OF MEDIA USED FOR SESSION. |
| TIME DESCRIPTION | t= | timing | ○ | ○ | INDICATING EFFECTIVE START TIME AND END TIME OF SESSION. |
| | r= | repeat times | | ○ | INDICATING REPEAT CYCLE ETC. WHEN SESSION IS REGULARLY AND REPEATEDLY EFFECTIVE. |
| | z= | time zones | | | INDICATING OFFSET TIME WHEN SWITCHING BETWEEN SUMMER TIME AND WINTER TIME ETC. IS NECESSARY BY DESIGNATION OF REPEAT IN TIME DESCRIPTION ("r-ROW"). |
| | k= | encryption keys | | | INDICATING ENCRYPTION KEY OR INFORMATION USED FOR SESSION. |
| | a= | (session) attributes | | ○ | INDICATING VARIOUS INFORMATION ON SESSION. |
| MEDIA DESCRIPTION | m= | media announcements | ○ | ○ | INDICATING MEDIA TYPE. |
| | i= | media information | | | INDICATING INFORMATION ON MEDIA. |
| | c= | connection data | △ | | INDICATING INFORMATION ON NETWORK ADDRESS USED FOR MEDIA. |
| | b= | (media) bandwidth | | | INDICATING BAND USED FOR MEDIA STREAM. |
| | k= | encryption keys | | | INDICATING ENCRYPTION KEY OR INFORMATION USED FOR MEDIA. |
| | a= | (media) attributes | | ○ | INDICATING VARIOUS ATTRIBUTES ABOUT MEDIA. |

FIG. 33

| ATTRIBUTE TYPE | VALUE | MEANING |
|---|---|---|
| a=ptime | DATA VOLUME CONTAINED IN PACKET (MILLISECOND) | INDICATING LENGTH OF MEDIUM CONTAINED IN ONE PACKET (PACKET TRANSMISSION INTERVAL FOR CONTINUOUS DATA). |
| a=fmtp | FORMAT AND PARAMETER | INDICATING FORMAT USED FOR MEDIA AND PARTICULAR PARAMETER NECESSARY FOR FORMAT. |
| a=sendrecv | NONE | INDICATING TRANSMISSION AND RECEPTION BIDIRECTIONAL MEDIA. |
| a=recvonly | NONE | INDICATING RECEPTION-ONLY MEDIA. |
| a=sendonly | NONE | INDICATING TRANSMISSION-ONLY MEDIA. |
| v=inactive | NONE | INDICATING NON-TRANSMISSION MEDIA IN EITHER DIRECTION. USED AT SUSPENSION OF TRANSMISSION AND RECEPTION OF MEDIA DURING SESSION, OR ASSURANCE OF PORT NUMBER, CODEC ETC. BEFORE SESSION START. |
| a=rtpmap | PAYLOAD TYPE AND ENCODING TYPE | INDICATING PAYLOAD AND ENCODING TYPE MAPPING. |

FIG. 34

```
o=<username> <sess-id> <sess-version> <nettype> <addrtype>
  <unicast-address>
o=ricky 2890876487 2890876487 IN IP4 host.example.com
c=<nettype> <addrtype> <connection-address>
c=IN IP4 192.0.2.4
m=<media> <port> <proto> <fmt> ...
m=audio 49170 RTP/AVP 0
```

FIG. 37

```
c=IN IP4 192.0.2.1/127
a=group:DDP L1 L2 m=video 40000/2 RTP/AVP 96
a=rtpmap:96 H264/90000
a=fmtp:96 profile-level-id=42e00d;sprop-parameter-sets=[sps0],[pps0];packetization-mode=0;
a=mid:L1 m=video 40002/2 RTP/AVP 97
a=rtpmap:97 H264-SVC/90000
a=fmtp:97 profile-level-id=53001f;sprop-parameter-sets=[sps1],[pps1];packetization-mode=1;
a=mid:L2
a=depend:97 lay L1:96
```

FIG. 38

```
v=0
o=user123 2890844526 2890842807 IN IP6 2201:056D::112E:144A:1E24
s=File delivery session example
i=More information
t=2873397496 2873404696
a=mbms-mode:broadcast 123869108302920 1
a=FEC-declaration:0 encoding-id=1
a=source-filter: incl IN IP6 * 2001:210:1:2:240:96ff:FE25:8EC9
a=flute-tsi:3
m=application 12345 FLUTE/UDP 0
c=IN IP6 FF1E:03AD::7F2E:172A:1E24/1
b=64
a=lang:EN
a=FEC:0
```

RECEIVING DEVICE, RECEIVING METHOD, TRANSMITTING DEVICE, AND TRANSMITTING METHOD

CROSS-REFERENCE TO RELATED APPLICATIONS

This application is a continuation of U.S. Ser. No. 16/053,517 filed Aug. 2, 2018, which is a continuation of U.S. application Ser. No. 14/914,950, filed on Feb. 26, 2016 now U.S. Pat. No. 10,085,057, which is a U.S. national phase application of International Application No. PCT/JP2014/074782, filed on Sep. 19, 2014, which is based on and claims priority to Japanese Application No. 2013-209056, filed on Oct. 4, 2013, entire contents of all of which are incorporated herein by reference.

TECHNICAL FIELD

The present technology relates to a receiving device, a receiving method, a transmitting device, and a transmitting method, and more particularly to a receiving device, a receiving method, a transmitting device, and a transmitting method capable of handling various operation modes with high flexibility.

BACKGROUND ART

Currently, a transmission method of Moving Picture Experts Group phase 2-Transport Stream (MPEG2-TS) has been adopted as digital broadcasting standards in various countries (for example, see Patent Document 1). It is expected that more advanced services will be offered in the future with introduction of an Internet Protocol (IP) transmission method which utilizes IP packets for digital broadcasting as well as for the conventional field of communication.

CITATION LIST

Patent Document

Patent Document 1: Japanese Patent Application Laid-Open No. 2012-156712

SUMMARY OF THE INVENTION

Problems to be Solved by the Invention

It is expected that introduction of the IP transmission method realizes transmission of content in various formats to various devices for utilization of various operation modes. However, technical systems necessary for handling these modes are not yet established at present.

The present technology has been developed in consideration of these circumstances. The present technology realizes flexible handling of various operation modes in digital broadcasting which introduces an IP transmission method.

Solutions to Problems

A receiving device according to a first aspect of the present technology includes: a receiving unit that receives a broadcasting wave of digital broadcasting using an IP transmission method; and a processing unit that processes one or a plurality of components constituting a particular service of a plurality of services included in the broadcasting wave, and a first control signal transmitted by FLUTE session in such a manner that the components and the first control signal are processed in units of service based on an IP address contained in each packet.

A packet of the component and a packet of the first control signal contained in an identical service have an identical IP address.

The first control signal is used in a first layer corresponding to a layer higher than an IP layer in layers of protocol in the IP transmission method, and at least contains information about the component constituting the particular service.

The broadcasting wave transmits a second control signal used in a second layer corresponding to a layer lower than the IP layer. The second control signal at least contains an ID for identifying a network, an ID for identifying a transport stream, and an ID for identifying a service.

The particular first control signal transmitted by FLUTE session is designated based on URL information contained in an electronic service guide transmitted by the broadcasting wave for designating the first control signal.

The second control signal contains information indicating whether a particular service is on the air.

The first control signal and the second control signal are contained in an SGDU container and transmitted.

The receiving device according to the first aspect of the present technology may be either an individual device or an internal block constituting one device.

A receiving method according to the first aspect of the present technology is a receiving method corresponding to the receiving device according to the first aspect of the present technology.

According to the receiving device and the receiving method of the first aspect of the present technology, a broadcasting wave of digital broadcasting using the IP transmission method is received. One or a plurality of components constituting a particular service of a plurality of services included in the broadcasting wave, and the first control signal transmitted by FLUTE session are processed in units of service based on an IP address contained in each packet.

A transmitting device according to a second aspect of the present technology includes: a component acquisition unit that acquires one or a plurality of components; a control signal acquisition unit that acquires a control signal; and a transmission unit that transmits a broadcasting wave of digital broadcasting using an IP transmission method in such a manner that a packet of the component constituting a particular service and a packet of the control signal transmitted by FLUTE session have an identical IP address.

The transmitting device according to the second aspect of the present technology may be either an individual device or an internal block constituting one device.

A transmitting method according to the second aspect of the present technology is a transmitting method corresponding to the transmitting device according to the second aspect of the present technology.

According to the transmitting device and the transmitting method of the second aspect of the present technology, one or a plurality of components are acquired, and a control signal is further acquired. A broadcasting wave of digital broadcasting using the IP transmission method is transmitted in such a manner that a packet of the component constituting a particular service and a packet of the control signal transmitted by FLUTE session have an identical IP address.

A receiving device according to a third aspect of the present technology includes: a receiving unit that receives a broadcasting wave of digital broadcasting using an IP transmission method; and a processing unit that processes one or a plurality of components constituting a particular service of a plurality of services included in the broadcasting wave, and a first control signal transmitted by User Datagram Protocol (UDP), in such a manner that the components and the first control signal are processed in units of service based on an IP address contained in each packet.

A packet of the component and a packet of the first control signal contained in an identical service have an identical IP address.

The first control signal is used in a first layer corresponding to a layer higher than an IP layer in layers of protocol in the IP transmission method, and at least contains information about the component constituting the particular service.

The broadcasting wave transmits a second control signal used in a second layer corresponding to a layer lower than the IP layer. The second control signal at least contains an ID for identifying a network, an ID for identifying a transport stream, and an ID for identifying a service.

The first control signal and the second control signal are contained in an SGDU container and transmitted.

The packet of the first control signal contains first URL information for designating the first control signal as extension information of SGDU. The particular first control signal transmitted by UDP is designated by specifying the first URL information based on second URL information that is contained in an electronic service guide transmitted by the broadcasting wave and designates the first control signal.

The second control signal contains information indicating whether a particular service is on the air.

The receiving device according to the third aspect of the present technology may be either an individual device or an internal block constituting one device.

A receiving method according to the third aspect of the present technology is a receiving method corresponding to the receiving device according to the third aspect of the present technology.

According to the receiving device and the receiving method of the third aspect of the present technology, a broadcasting wave of digital broadcasting using the IP transmission method is received. One or a plurality of components constituting a particular service of a plurality of services included in the broadcasting wave, and the first control signal transmitted by UDP are processed in units of service based on an IP address contained in each packet.

A transmitting device according to a fourth aspect of the present technology includes: a component acquisition unit that acquires one or a plurality of components; a control signal acquisition unit that acquires a control signal; and a transmission unit that transmits a broadcasting wave of digital broadcasting using an IP transmission method in such a manner that a packet of the component constituting a particular service and a packet of the control signal transmitted by UDP have an identical IP address.

The transmitting device according to the fourth aspect of the present technology may be either an individual device or an internal block constituting one device.

A transmitting method according to the fourth aspect of the present technology is a transmitting method corresponding to the transmitting device according to the fourth aspect of the present technology.

According to the transmitting device and the transmitting method of the fourth aspect of the present technology, one or a plurality of components are acquired, and a control signal is further acquired. A broadcasting wave of digital broadcasting using the IP transmission method is transmitted in such a manner that a packet of the component constituting a particular service and a packet of the control signal transmitted by UDP have an identical IP address.

Effects of the Invention

According to the first aspect through the fourth aspect of the present technology, various operation modes can be handled with high flexibility.

Advantages to be offered are not limited to these advantages, but may be any of advantages described in the present disclosure.

BRIEF DESCRIPTION OF DRAWINGS

FIG. 14 is a view illustrating a structure of SGDU in the FLUTE transmission method.

FIG. 24 is a view illustrating a structure of SGDU in the UDP transmission method.

FIG. 25 is a view illustrating a data structure of SCT.

FIG. 26 is a view illustrating a description example of SCT.

FIG. 27 is a view illustrating a description example of SCT.

FIG. 28 is a view illustrating a data structure of SAT.

FIG. 29 is a view illustrating a description example of SAT.

FIG. 30 is a view illustrating a data structure of RRT.

FIG. 32 is a view illustrating data structures of a session description and a media description.

FIG. 33 is a view illustrating attribute types of media.

FIG. 34 is a view illustrating specific examples of origin, connection data, and media announcements.

FIG. 37 is a view illustrating a description example of SDP.

FIG. 38 is a view illustrating a description example of SDP.

MODE FOR CARRYING OUT THE INVENTION

An embodiment according to the present technology is hereinafter described with reference to the drawings. This embodiment will be discussed in the following order.

1. Digital Broadcasting by IP Transmission Method
(1) FLUTE Transmission Method
(2) UDP Transmission Method
2. Signaling Information
(1) Structure Details of LLS (SCT, SAT, RRT)
(2) Structure Details of SCS (SDP)
3. Specific Operation Examples
(1) Basic Operation
(2) NRT Service Handling
(3) Hybrid Service Handling
(4) UDP Transmission Method
4. Specific Processes Performed by Respective Devices 1. Digital Broadcasting by IP Transmission Method Digital broadcasting which adopts an IP transmission method according to the present technology can use either an FLUTE transmission method or an UDP transmission method. The FLUTE transmission method in this context refers to a method for transmitting signaling information as Service Channel Signaling (SCS) by using File Delivery over Unidirectional Transport (FLUTE) session. On the other hand, the UDP transmission method in this context refers to a method for transmitting signaling information as SCS by using User Datagram Protocol (UDP).

<(1) FLUTE Transmission Method>
(Protocol Stack)

Figure 1:
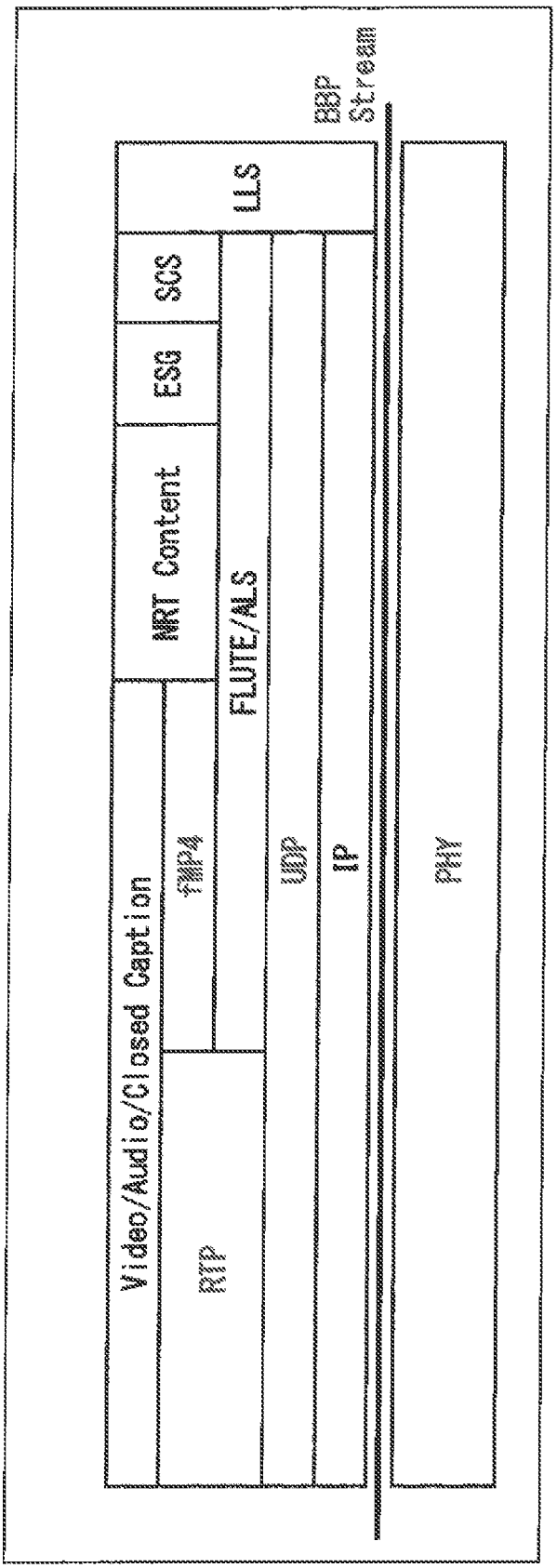
FIG. 1 is a view illustrating a protocol stack of digital broadcasting in a FLUTE transmission method.

FIG. 1 is a view illustrating a protocol stack of digital broadcasting in the FLUTE transmission method.

As illustrated in FIG. 1, a lowest layer is a physical layer provided in correspondence with a frequency band of a broadcasting wave allocated to a service (channel). A layer disposed immediately above the physical layer is an IP layer. A Base Band Packet Stream (BBP stream) is interposed between the physical layer and the IP layer. The BBP stream is a stream which contains packets for storing various types of data in the IP transmission method.

The IP layer is similar to Internet Protocol (IP) in a protocol stack of TCP/IP. In this case, an IP packet is specified by an IP address. A layer disposed immediately above the IP layer is a UDP layer. A layer immediately above the UDP layer includes Real-time Transport Protocol (RTP), and FLUTE/ALS. According to digital broadcasting in the IP transmission method, packets corresponding to designated UDP port numbers are transmitted to establish RTP session or FLUTE session, for example. Details of FLUTE are regulated as RFC3926.

A layer disposed immediately above FLUTE/ALS is Fragmented MP4 (fMP4), while a layer disposed immediately above RTP and fMP4 contains video data (video), audio data (audio), caption data (closed caption) and others. In this case, RTP session is used for transmission of video data and audio data in synchronous stream format, while FLUTE session is used for transmission of video data and audio data in asynchronous file format.

A layer disposed immediately above FLUTE/ALS contains NRT content, ESG, and SCS. In this case, the NRT content, ESG, and SCS are transmitted by FLUTE session. The NRT content transmitted in Non-RealTime (NRT) broadcasting is temporarily stored in a storage of a receiver before reproduction. The NRT content is only an example of content. Files of other content may be transmitted by FLUTE session. The Electronic Service Guide (ESG) is an electronic service guide which contains information such as a program title and start time.

The Service Channel Signaling (SCS) is signaling information generated in units of service and transmitted by FLUTE session. For example, Session Description Protocol (SDP) and Application Information Table (AIT) are transmitted as the SCS. The SDP contains service attributes in units of service, component configuration information, component attributes, component filter information, and component location information, for example. The AIT is application control information in a hybrid service. A relationship between services and components is described below with reference to FIG. 2.

Further provided is Low Layer Signaling (LLS) indicating low layer signaling information transmitted on the BBP stream. For example, service configuration information such as Service Configuration Table (SCT), Service Association Table (SAT), and Region Rating Table (RRT) is transmitted as LLS.

The SCT contains a combination of network_id, transport_stream_id, and service_id (hereinafter referred to as "triplet") used in MPEG2-TS method. This triplet indicates a BBP stream configuration and a service configuration within a broadcasting network. The SCT further contains information about an IP address and the like as attribute and setting information in units of service, bootstrap information for accessing the ESG and the SCS, and channel selection information for selecting services (channels), for example.

The SAT indicates a service currently on the air for each BBP stream. Whether or not a particular service is on the air (being broadcast) can be determined based on the SAT. The RRT indicates a regional information table concerning classification of programs.

(ID System in FLUTE Transmission Method)

Figure 2:
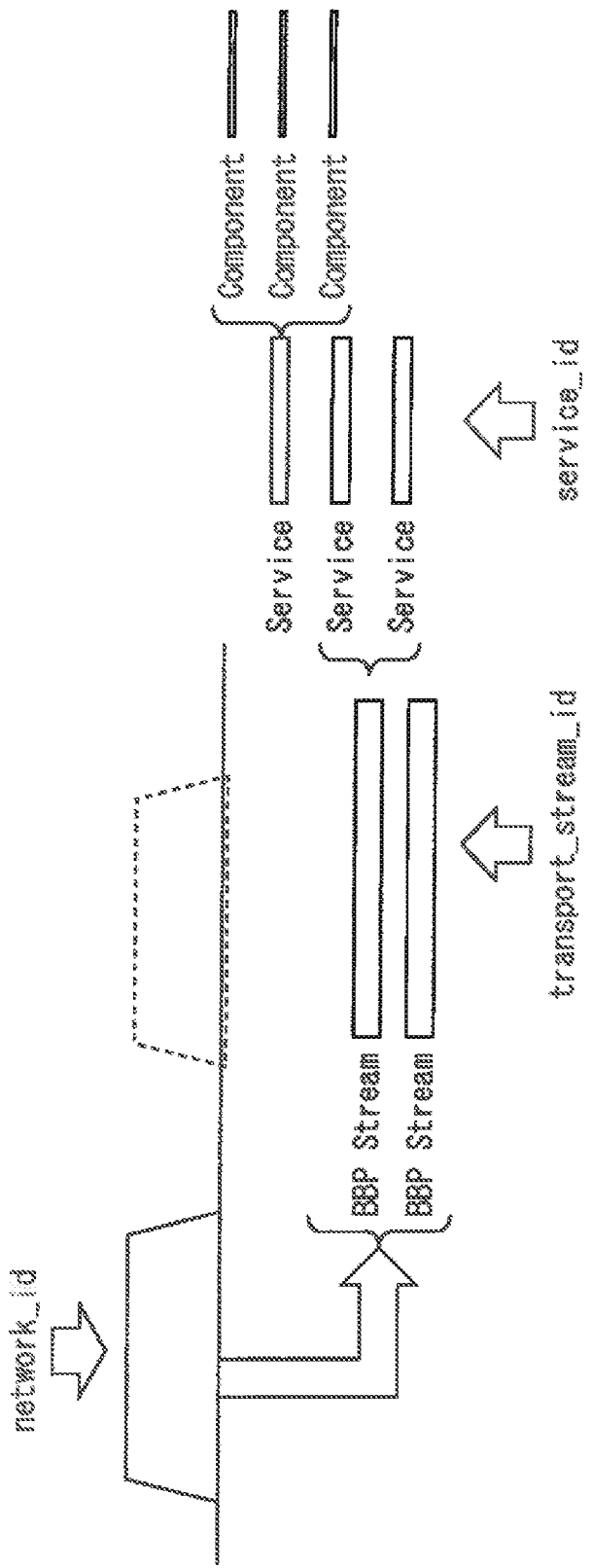
FIG. 2 is a view illustrating a relationship between a signal of a broadcasting wave and an ID system of the FLUTE transmission method.

FIG. 2 is a view illustrating a relationship between a signal of a broadcasting wave and an ID system in the FLUTE transmission method.

As illustrated in FIG. 2, network_id is allocated to a broadcasting wave having a frequency band of 6 MHz (broadcasting network). Each of the broadcasting waves contains one or a plurality of BBP streams identified by transport_stream_id. Each of the BBP streams includes a plurality of BBP packets each of which is constituted by a BBP header and a payload.

Each of the BBP streams contains a plurality of services identified by service_id. Each of the services is constituted by one or a plurality of components. Each of the components corresponds to information such as video data and audio data for constituting a program.

As described above, the triplet as the combination of network_id, transport_stream_id, and service_id can be adopted as the ID system of the FLUTE transmission method similarly to the MPEG2-TS method to ensure consistency with the MPEG2-TS method widely used at present. Accordingly, simulcast at a shift from the MPEG2-TS method to the IP transmission method (FLUTE transmission method) is easily achievable, for example.

In case of a mode using both a major channel number and a minor channel number as identification information corresponding to service_id, higher 8 bits contained in 16 bits of service_id can be allocated to 8 bits of the major channel number, and lower 8 bits in 16 bits can be allocated to 8 bits of the minor channel number to handle this mode.

(Configuration of Broadcasting Wave in FLUTE Transmission Method)

Figure 3:
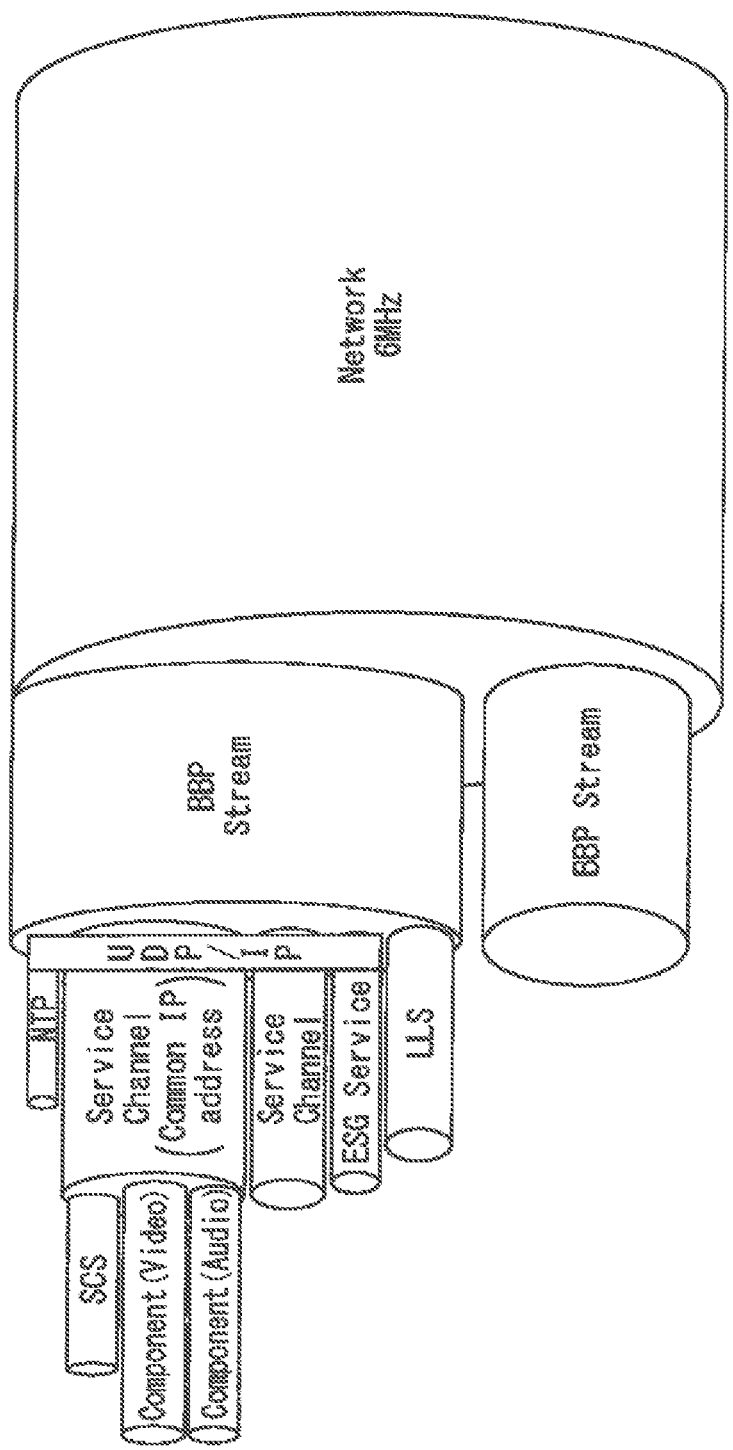
FIG. 3 is a view illustrating a configuration of a broadcasting wave of the digital broadcasting in the FLUTE transmission method.

FIG. 3 is a view illustrating a configuration of a broadcasting wave in digital broadcasting in the FLUTE transmission method.

As illustrated in FIG. 3, one or a plurality of BBP streams can be acquired from a broadcasting wave having a frequency band of 6 MHz ("Network" in the figure). In addition, Network Time Protocol (NTP), a plurality of service channels, an electronic service guide (ESG service), and LLS can be acquired from each of the BBP streams. In this case, the NTP, the service channels, and the electronic service guide are transmitted under protocol of UDP/IP. However, the LLS is transmitted on the BBP stream. The NTP is time information common to the plurality of service channels.

Each of the service channels contains components such as video data and audio data, and SCS such as SDP and AIT. Moreover, each of the service channels is given a common IP address so that components, control signals and the like can be packaged for each service channel based on this IP address.

The BBP streams and the components in FIG. 3 correspond to the BBP streams and the components in FIG. 2. On the other hand, the service channel in FIG. 3 corresponds to the service in FIG. 2.

(Configuration of LLS)

Figure 4:
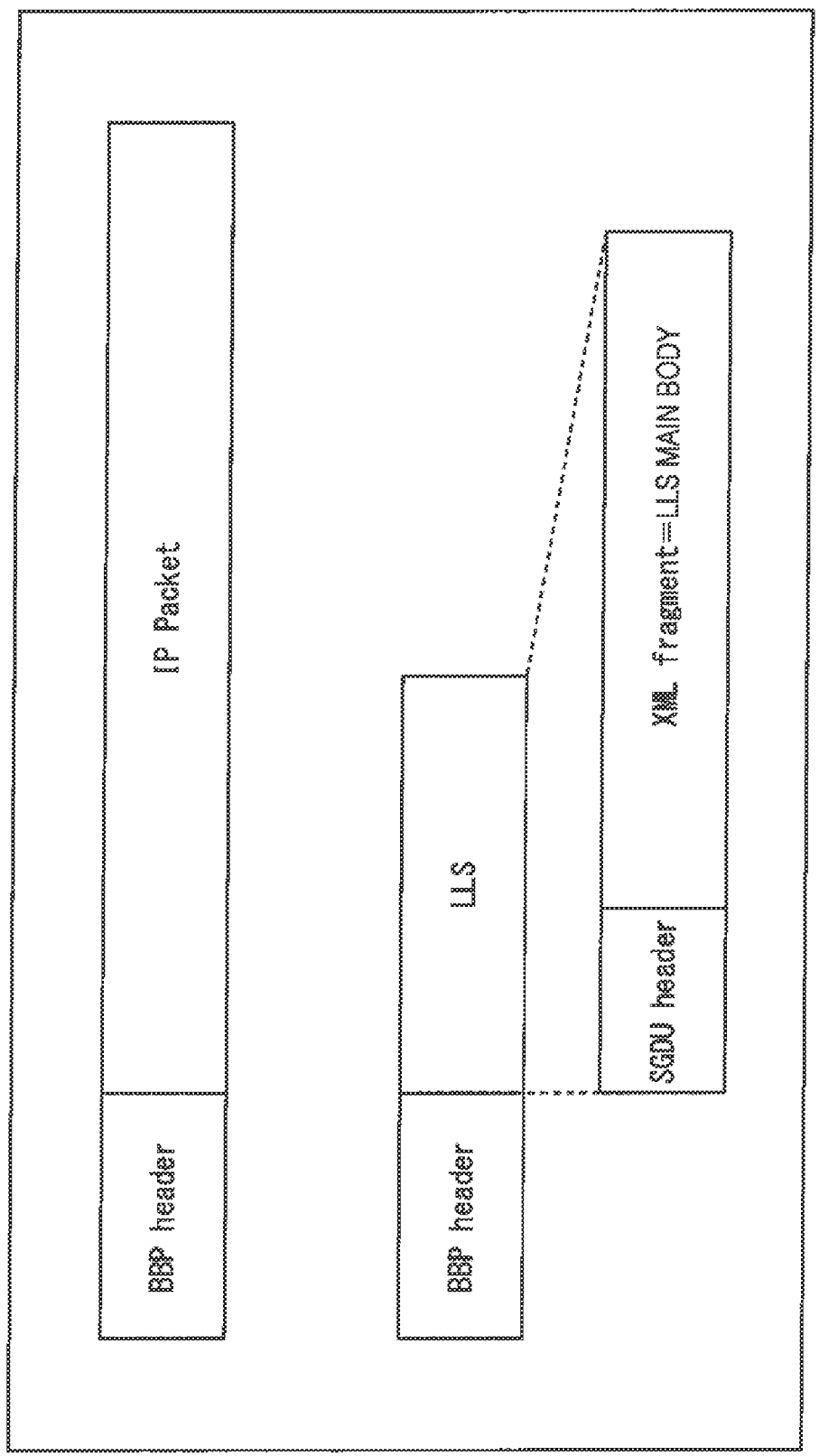
FIG. 4 is a view illustrating a configuration of LLS in the FLUTE transmission method.

FIG. 4 is a view illustrating a configuration of LLS in the FLUTE transmission method.

As illustrated in FIG. 4, a BBP packet is constituted by a BBP header and a payload. At the time of transmission of an IP packet by a BBP stream, this IP packet constitutes a payload portion.

At the time of transmission of LLS by a BBP stream, this LLS is disposed after the BBP header. The LLS contains SCT, SAT and the like described in Extensible Markup Language (XML) format, for example. In this case, an SGDU header is added to an XML fragment corresponding to a part of LLS data and constituting the LLS main body. Accordingly, the SCT and SAT are transmitted via an Service Guide Delivery Unit Container (SGDU container). The SGDU is adopted as a standard of Open Mobile Alliance (OMA).

The BBP header contains 2-bit type information based on which whether the BBP packet is an IP packet or LLS can be determined.

(Configuration of SCS)

Figure 5:
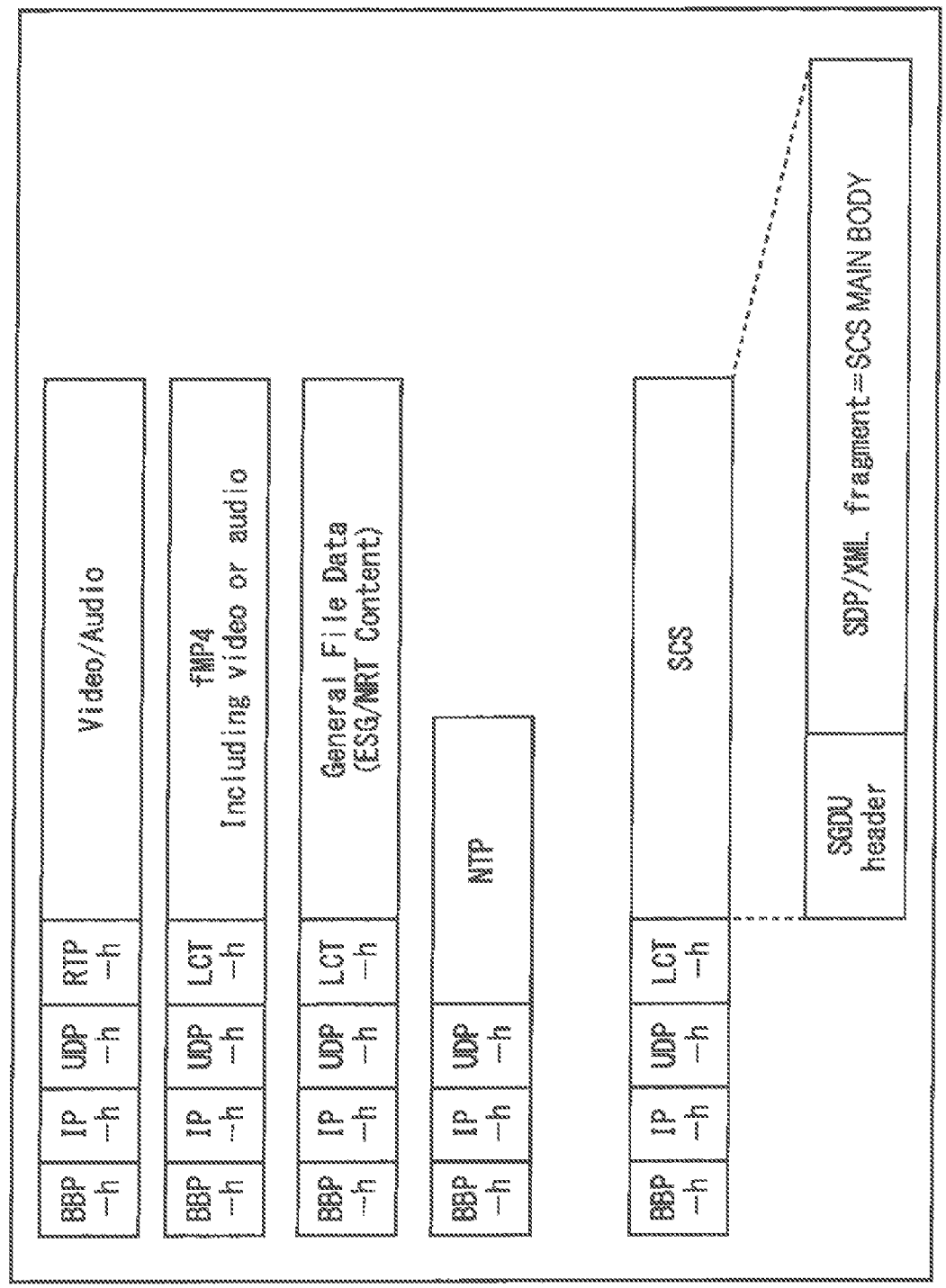
FIG. 5 is a view illustrating a configuration of SCS in the FLUTE transmission method.

FIG. 5 is a view illustrating a configuration of SCS in the FLUTE transmission method.

As illustrated in FIG. 5, RTP session is used when video data or audio data is transmitted in synchronous stream format, for example. In this case, each header of BBP, IP, UDP, and RTP is added to the payload. On the other hand, FLUTE session is used when file data such as fMP4, ESG, and NRT content is transmitted in asynchronous file format. In this case, each header of BBP, IP, UDP, and LCT is added to the payload. In the figure, NTP provided as a layer higher than a UDP layer is disposed after each header of BBP, IF, and UDP.

In the figure, SCS transmitted by using FLUTE session is disposed after each header of BBP, IP, UDP, and LCT. The SCS includes SDP and the like described in text format, for example. In this case, an SGDU header is added to an SDP fragment corresponding to a part of SCS data and constituting the SCS main body. Accordingly, the SDP is transmitted via an SGDU container. The SCS main body thus disposed is not limited to the SDP fragment, but for example, may be an XML fragment of AIT described in XML format to be transmitted via the SGDU container.

(Concept of Service Channel)

Figure 6:
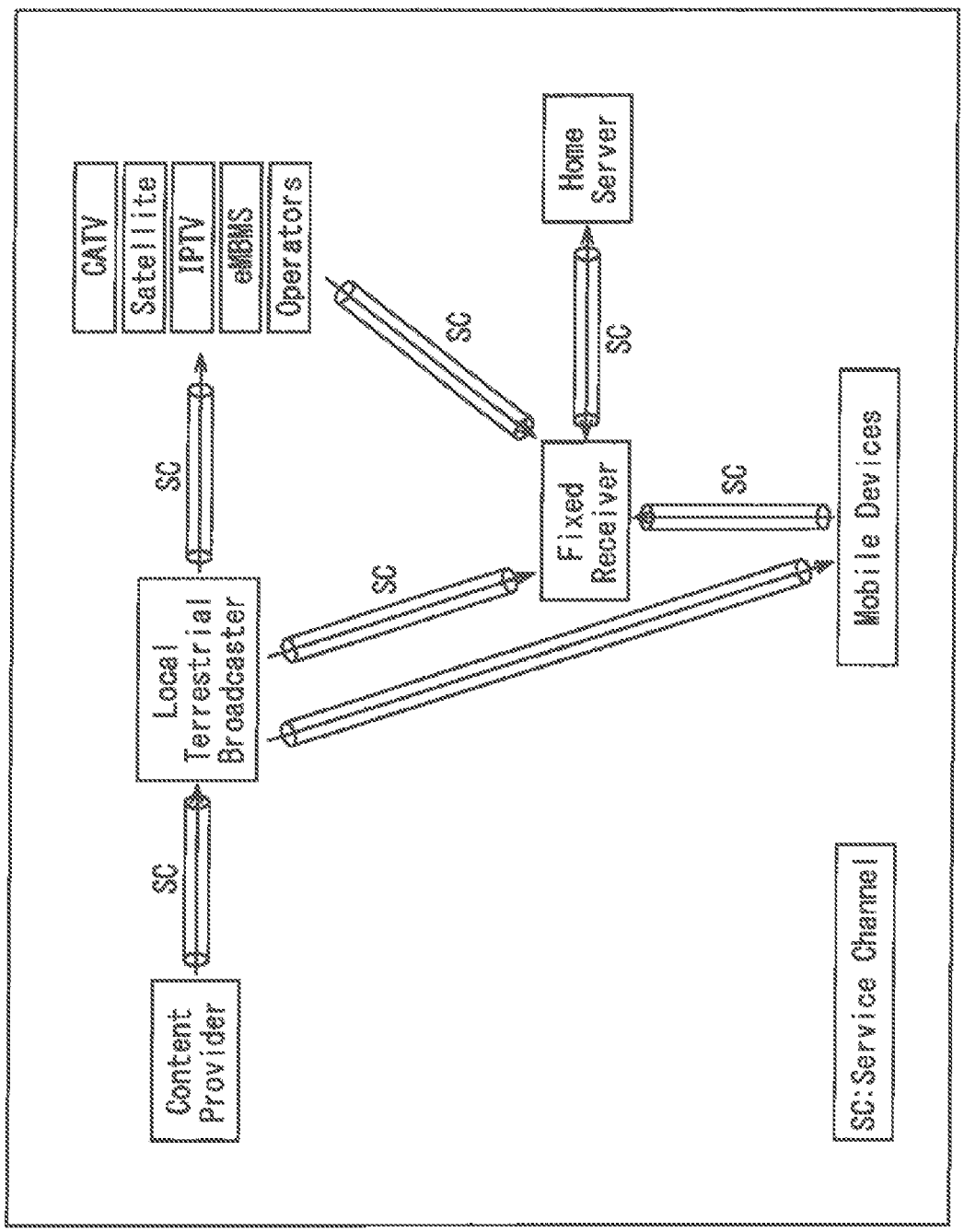
FIG. 6 is a view illustrating a concept of a service channel.

FIG. 6 is a view illustrating a concept of a service channel (SC).

As illustrated in FIG. 6, a local terrestrial broadcaster receives content created by a content provider in the form of a package containing components, control signals and the like having an identical IP address. Accordingly, the local terrestrial broadcaster is capable of receiving content in units of service channel. The service channel provided by the local terrestrial broadcaster is further supplied to CATV providers, satellite broadcasting providers, IPTV providers, multicast service providers (eMBMS: evolved Multimedia Broadcast Multicast Service), operators and the like. The CATV providers and the like may re-package the service channel by adding an application, for example.

A receiver (fixed receiver) receives service channels transmitted from the local terrestrial broadcaster, CATV and the like. The receiver displays images of the service channels on a display unit, and outputs voices corresponding the images from a speaker. The receiver can also transmit service channels to a home server, an external device (mobile device) and the like connected to a home network constructed at home. According to this structure, the home server accumulates service channels received from the receiver. In addition, the external device displays images on a display unit as images of the service channels received from the receiver, and outputs voices corresponding to these images from a speaker. The external device may directly receive service channels transmitted from the local terrestrial broadcaster or the like.

Signals of elements constituting a service such as video data, audio data, and control signals having an identical IP address and packaged in the foregoing manner are handled in units of service channel (service). Accordingly, various operation modes such as addition of an application to a service channel are easily achievable with high flexibility.

Configuration Example of Broadcasting System

Figure 7:
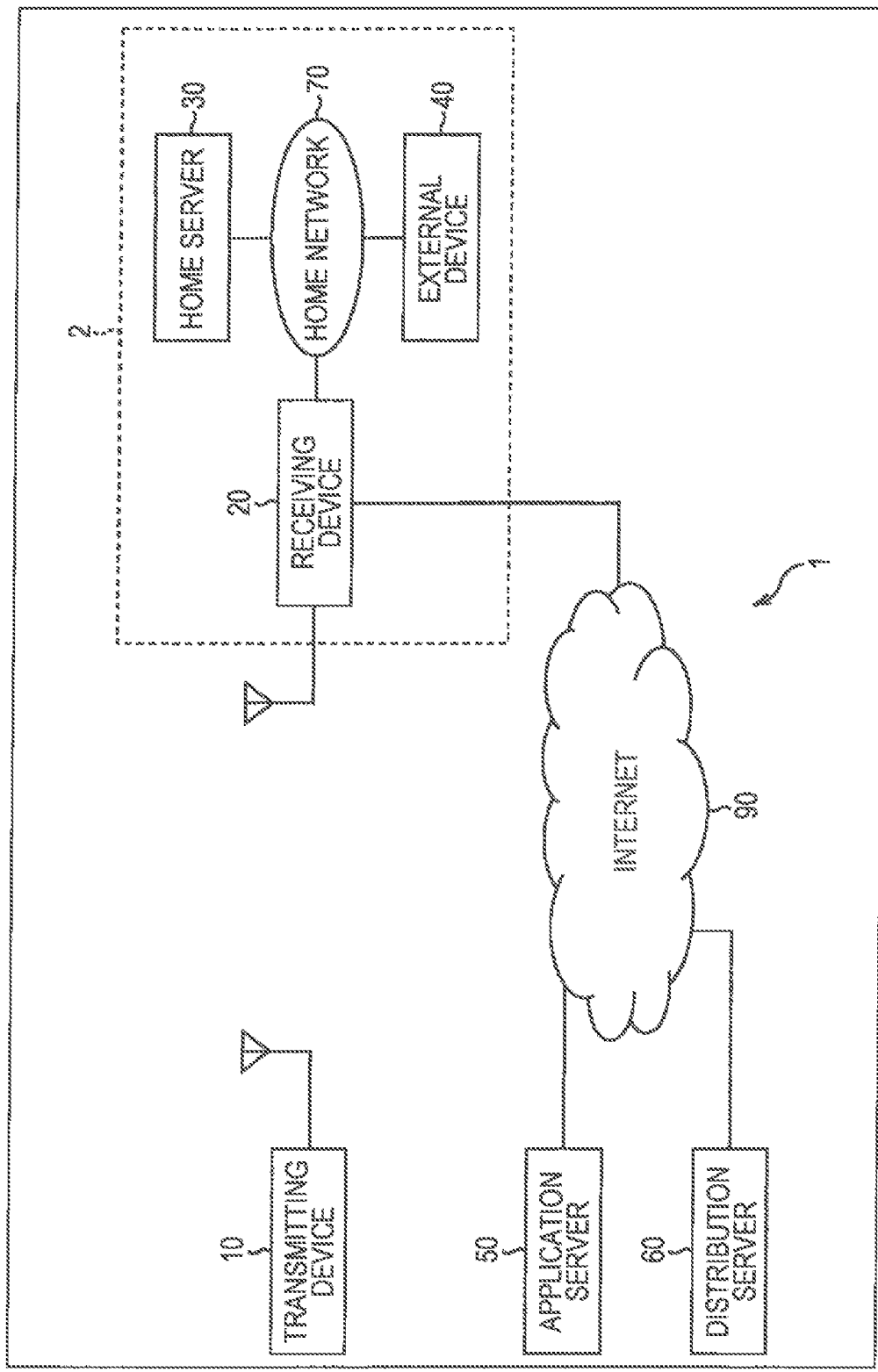
FIG. 7 is a view illustrating a configuration of a broadcasting system according to an embodiment of the present technology.

FIG. 7 is a view illustrating a configuration of a broadcasting system according to an embodiment of the present technology.

As illustrated in FIG. 7, a broadcasting system 1 includes a transmitting device 10, a receiving device 20, a home server 30, an external device 40, an application server 50, and a distribution server 60. The receiving device 20, the home server 30, and the external device 40 are disposed within a residence 2, and connected with each other via a home network 70. The receiving device 20 is connected with the application server 50 and the distribution server 60 via the Internet 90.

The transmitting device 10 transmits broadcasting content such as a TV program via a broadcasting wave of digital broadcasting which uses the IP transmission method.

The receiving device 20 receives broadcasting signals transmitted from the transmitting device 10 to acquire images and voices of broadcasting content. The receiving device 20 displays images of broadcasting content on a display unit, and outputs voices synchronous with the images from a speaker. The receiving device 20 may be constituted by an independent body containing the display and the speaker, or may be included in a television receiver or a video recorder as a built-in unit.

The receiving device 20 exchanges various types of data with the home server 30 via the home network 70. The home server 30 receives and records, via the home network 70, data transmitted from the receiving device 20, and supplies data to the receiving device 20 in response to a request from the receiving device 20.

The receiving device 20 exchanges various types of data with the external device 40 via the home network 70. The external device 40 receives data transmitted from the receiving device 20 via the home network 70, and displays the received data. The external device 40 is a mobile device such as a smartphone and a tablet-type terminal.

The application server 50 manages applications executed in conjunction with broadcasting content. The application server 50 supplies an application to the receiving device 20 via the Internet 90 in response to a request from the receiving device 20. The receiving device 20 executes the application received from the application server 50 in conjunction with the broadcasting content.

The distribution server 60 provides communication content such as broadcast programs already broadcast, and movies already released via the Internet 90 in response to Video On Demand (VOD). The receiving device 20 receives communication content delivered from the distribution server 60 via the Internet 90. The receiving device 20 displays images of the communication content on the display unit, and outputs voices synchronous with the images from the speaker.

This is all the structure of the broadcasting system 1.

Configuration Example of Transmitting Device

Figure 8:
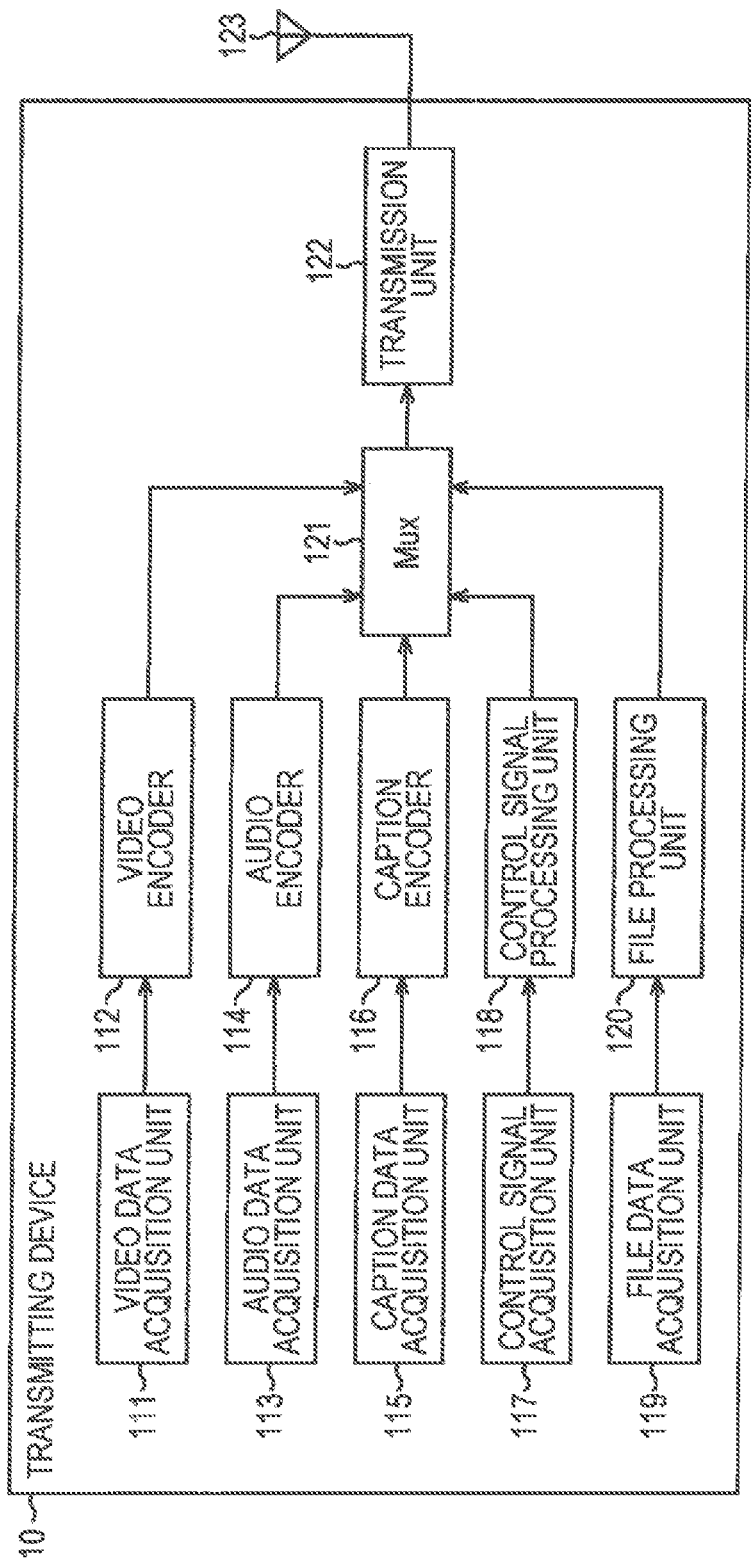
FIG. 8 is a view illustrating a configuration of a transmitting device according to an embodiment of the present technology.

FIG. 8 is a view illustrating a configuration of the transmitting device according to an embodiment of the present technology.

As illustrated in FIG. 8, the transmitting device 10 includes a video data acquisition unit 111, a video encoder 112, an audio data acquisition unit 113, an audio encoder 114, a caption data acquisition unit 115, a caption encoder 116, a control signal acquisition unit 117, a control signal processing unit 118, a file data acquisition unit 119, a file processing unit 120, a Mux 121, and a transmission unit 122.

The video data acquisition unit 111 acquires video data from a built-in storage, or a server, a camera or the like disposed outside, and supplies the acquired video data to the video encoder 112. The video encoder 112 encodes the video data supplied from the video data acquisition unit 111 in conformity to an encoding method such as MPEG, and supplies the encoded video data to the Mux 121.

The audio data acquisition unit 113 acquires audio data from a built-in storage, or a server, a microphone or the like disposed outside, and supplies the acquired audio data to the audio encoder 114. The audio encoder 114 encodes the audio data supplied from the audio data acquisition unit 113 in conformity to an encoding method such as MPEG, and supplies the encoded audio data to the Mux 121.

The caption data acquisition unit 115 acquires caption data from a built-in storage, or a server or the like disposed outside, and supplies the acquired caption data to the caption encoder 116. The caption encoder 116 encodes the caption data supplied from the caption data acquisition unit 115 in conformity to a predetermined encoding method, and supplies the encoded caption data to the Mux 121.

The control signal acquisition unit 117 acquires control signals such as LLS and SCS from a built-in storage, or a server or the like disposed outside, and supplies the acquired control signals to the control signal processing unit 118. The control signal processing unit 118 performs predetermined signal processing for control signals received from the control signal acquisition unit 117, and supplies the processed control signals to the Mux 121. For example, the control signal processing unit 118 performs signal processing for SCS acquired by the control signal acquisition unit 117 to allow transmission of the SCS by FLUTE session.

The file data acquisition unit 119 acquires file data such as NRT content and an application from a built-in storage or a server or the like disposed outside, and supplies the acquired file data to the file processing unit 120 at the time of transmission of data in asynchronous file format. The file processing unit 120 performs predetermined file processing for the file data received from the file data acquisition unit 119, and supplies the processed file data to the Mux 121. For example, the file processing unit 120 performs file processing for the file data acquired by the file data acquisition unit 119 to allow transmission of the file data by FLUTE session.

The Mux 121 multiplexes the video data received from the video encoder 112, the audio data received from the audio encoder 114, the caption data received from the caption encoder 116, the control signals received from the control signal processing unit 118, and the file data received from the file processing unit 120 to generate a BBP stream in IP transmission format, and supplies the generated BBP stream to a transmission unit 122. The transmission unit 122 transmits the BBP stream supplied from the Mux 121 via an antenna 123 as broadcasting signals.

Configuration Example of Receiving Device

Figure 9:
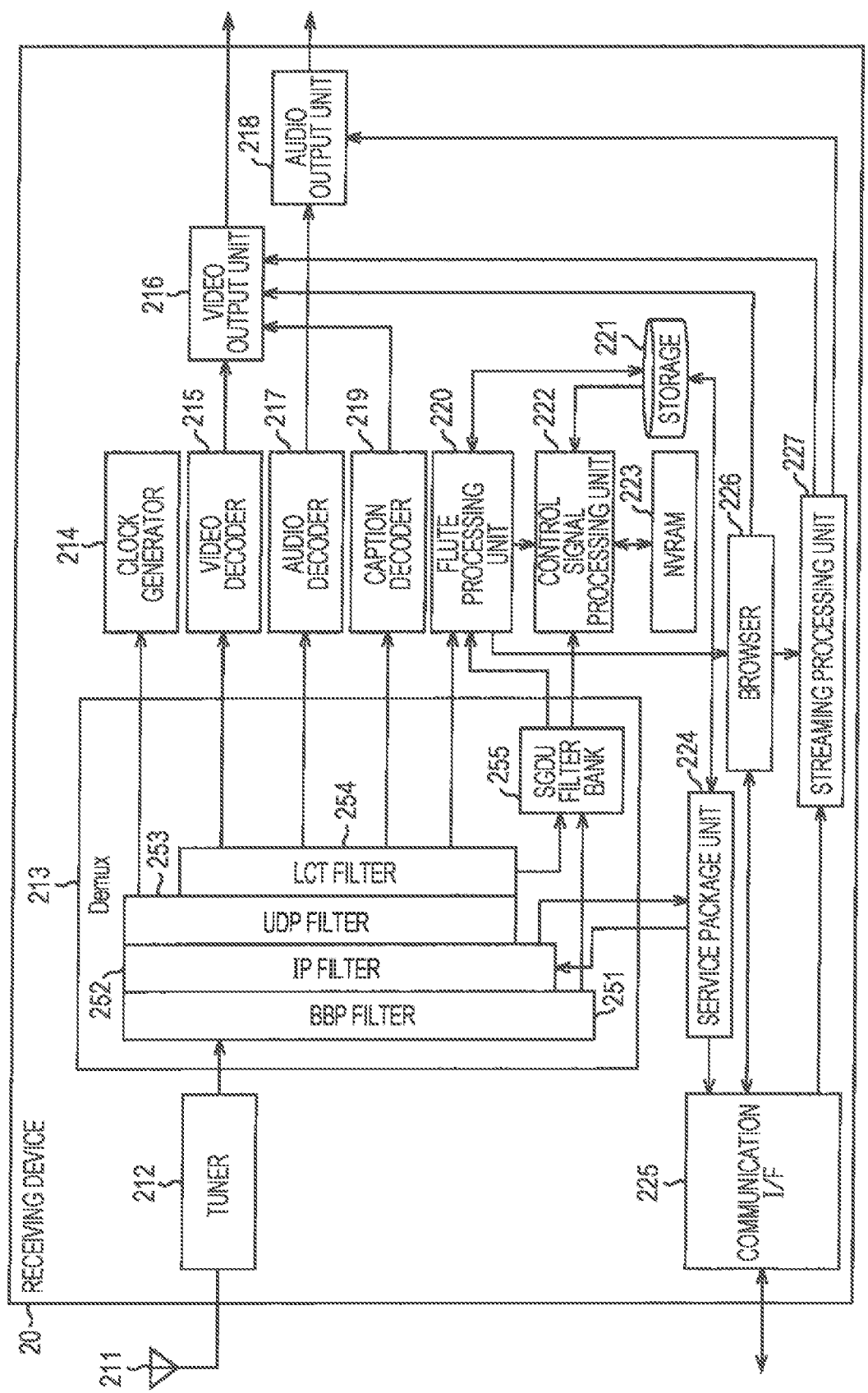
FIG. 9 is a view illustrating a configuration of a receiving device according to an embodiment of the present technology.

FIG. 9 is a view illustrating a configuration of the receiving device according to an embodiment of the present technology.

As illustrated in FIG. 9, the receiving device 20 includes a tuner 212, a Demux 213, a clock generator 214, a video decoder 215, a video output unit 216, an audio decoder 217, an audio output unit 218, a caption decoder 219, a FLUTE processing unit 220, a storage 221, a control signal processing unit 222, an NVRAM 223, a service package unit 224, a communication I/F 225, a browser 226, and a streaming processing unit 227.

The tuner 212 extracts broadcasting signals of a service corresponding to a selected channel from broadcasting signals received via an antenna 211, demodulates the extracted broadcasting signals, and supplies a BBP stream in IP transmission format obtained by demodulation to the Demux 213.

The Demux 213 separates the BBP stream in IP transmission format supplied from the tuner 212 into video data, audio data, caption data, control signals and the like, and outputs the separated data and signals to a subsequent block. More specifically, the Demux 213 is constituted by a BBP filter 251, an IP filter 252, a UDP filter 253, an LCT filter 254, and an SGDU filter bank 255. The BBP filter 251 performs filtering based on a BBP header, and supplies LLS to the SGDU filter bank 255.

The IP filter 252 performs filtering based on IP headers. The UDP filter 253 performs filtering based on UDP headers. The LCT filter 254 performs filtering based on LCT headers. After the filtering performed by the 9P filter 252 through the LCT filter 254, NTP is supplied to the clock generation unit 214, while SCS is supplied to the SGDU filter bank 255. The video data, the audio data, and the caption data are supplied to the video decoder 215, the audio decoder 217, and the caption decoder 219, respectively. Respective file data is supplied to the FLUTE processing unit 220.

The SGDU filter bank 255 performs filtering based on an SGDU header, and supplies LLS and SCS to the control signal processing unit 222 or the FLUTE processing unit 220 in an appropriate manner. The IP filter 252 performs filtering based on an IP address, and supplies components (audio/video), control signals (SCS) and the like having an identical IP address, and time information (NTP) to the service package unit 224.

The clock generator 214 generates a clock signal based on the NTP received from the Demux 213, and supplies the generated clock signal to the video decoder 215, the audio decoder 217, and the caption decoder 219.

The video decoder 215 decodes video data supplied from the Demux 213 in decoding format corresponding to the video encoder 112 (FIG. 8) based on the clock signal received from the clock generator 214, and supplies the decoded vide data to the video output unit 216. The video output unit 216 outputs the video data supplied from the video decoder 215 to the subsequent display unit (not shown). As a result, images of a TV program are displayed on the display unit, for example.

The audio decoder 217 decodes the audio data supplied from the Demux 213 in decoding format corresponding to the audio encoder 114 (FIG. 8) based on the clock signal received from the clock generator 214, and supplies the decoded audio data to the audio output unit 218. The audio output unit 218 supplies the audio data received from the audio decoder 217 to the subsequent speaker (not shown). As a result, voices corresponding to images of a TV program are output from the speaker, for example.

The caption decoder 219 decodes the caption data supplied from the Demux 213 in decoding format corresponding to the caption encoder 116 (FIG. 8) based on the clock signal received from the clock generator 214, and supplies the decoded caption data to the video output unit 216. The video output unit 216 having received the caption data from the caption decoder 219 combines the caption data with the video data received from the video decoder 215, and supplies the combined data to the subsequent display unit (not shown). As a result, the images of the TV programs, and captions corresponding the images are both displayed on the display unit.

The FLUTE processing unit 220 restores ESG, applications, NRT content and the like from respective file data supplied from the Demux 213. For example, the FLUTE processing unit 220 records the restored ESG or NRT content in the storage 221. The FLUTE processing unit 220 supplies the restored applications to the browser 226. The FLUTE processing unit 220 supplies SCS received from the Demux 213 to the control signal processing unit 222. In this case, the SCS may be supplied to the control signal processing unit 222 not from the FLUTE processing unit 220, but directly from the Demux 213.

The storage 221 is a large volume recording device such as a Hard Disk Drive (HDD). The storage 221 records respective data supplied from the FLUTE processing unit 220 and the like.

The control signal processing unit 222 controls operations of respective units based on the control signals (LLS, SCS) supplied from the Demux 213 or the FLUTE processing unit 220. The NVRAM 223 is a non-volatile memory which records respective data under control by the control signal processing unit 222.

The service package unit 224 packages elements constituting a service channel, such as components, control signals, and time information supplied from the Demux 213, and records the packaged elements in the storage 221. The service package unit 224 reads packaged data for the service channel from the storage 221, depackages the data, and supplies the depackaged data to the IP filter 252 of the Demux 213. This structure allows restoration and reproduction of the packaged elements constituting the service channel. The data contained in the packaged service channels may be supplied to the home server 30, the external device 40 and the like connected to the home network 70 via the communication I/F 225.

The communication I/F 225 exchanges data with the home server 30, the external device 40 and the like connected to the home network 70. The communication I/F 225 receives an application from the application server 50 provided on the Internet 90, and supplies the received application to the browser 226. The browser 226 receives an application from either the FLUTE processing unit 220 or the communication I/F 225. The browser 226 having received an application generates video data constituted by HTML document described in Hyper Text Markup Language 5 (HTML5) in accordance with this application, and supplies the generated video data to the video output unit 216. As a result, images of the application in conjunction with a TV program are displayed on the display unit.

The communication I/F 225 also receives communication content data distributed from the distribution server 60 provided on the Internet 90, and supplies the received data to the streaming processing unit 227. The streaming processing unit 227 performs various types of processing necessary for streaming reproduction of the data supplied from the communication I/F 225, and supplies video data obtained by this processing to the video output unit 216, and audio data obtained by this processing to the audio output unit 218. As a result, images of the communication content are displayed on the display unit, and voices synchronous with the images are output from the speaker.

According to the receiving device 20 illustrated in FIG. 9, the tuner 212, the Demux 213, the clock generator 214, the video decoder 215, the video output unit 216, the audio decoder 217, the audio output unit 218, the caption decoder 219, the storage 221, the NVRAM 223, and the communication I/F 225 constitute hardware, for example. On the other hand, the FLUTE processing unit 220, the control signal processing unit 222, the service package unit 224, the browser 226, and the streaming processing unit 227 in the receiving device 20 are realized under programs executed by a CPU (CPU 901 in FIG. 71), for example.

The storage 221 contained in the configuration of the receiving device 20 as a built-in unit as illustrated in FIG. 9 may be an external storage.

(Details of Filtering)

Filtering of respective packets performed by the Demux 213 (FIG. 9) in the FLUTE transmission method is hereinafter detailed with reference to FIG. 10.

Figure 10:
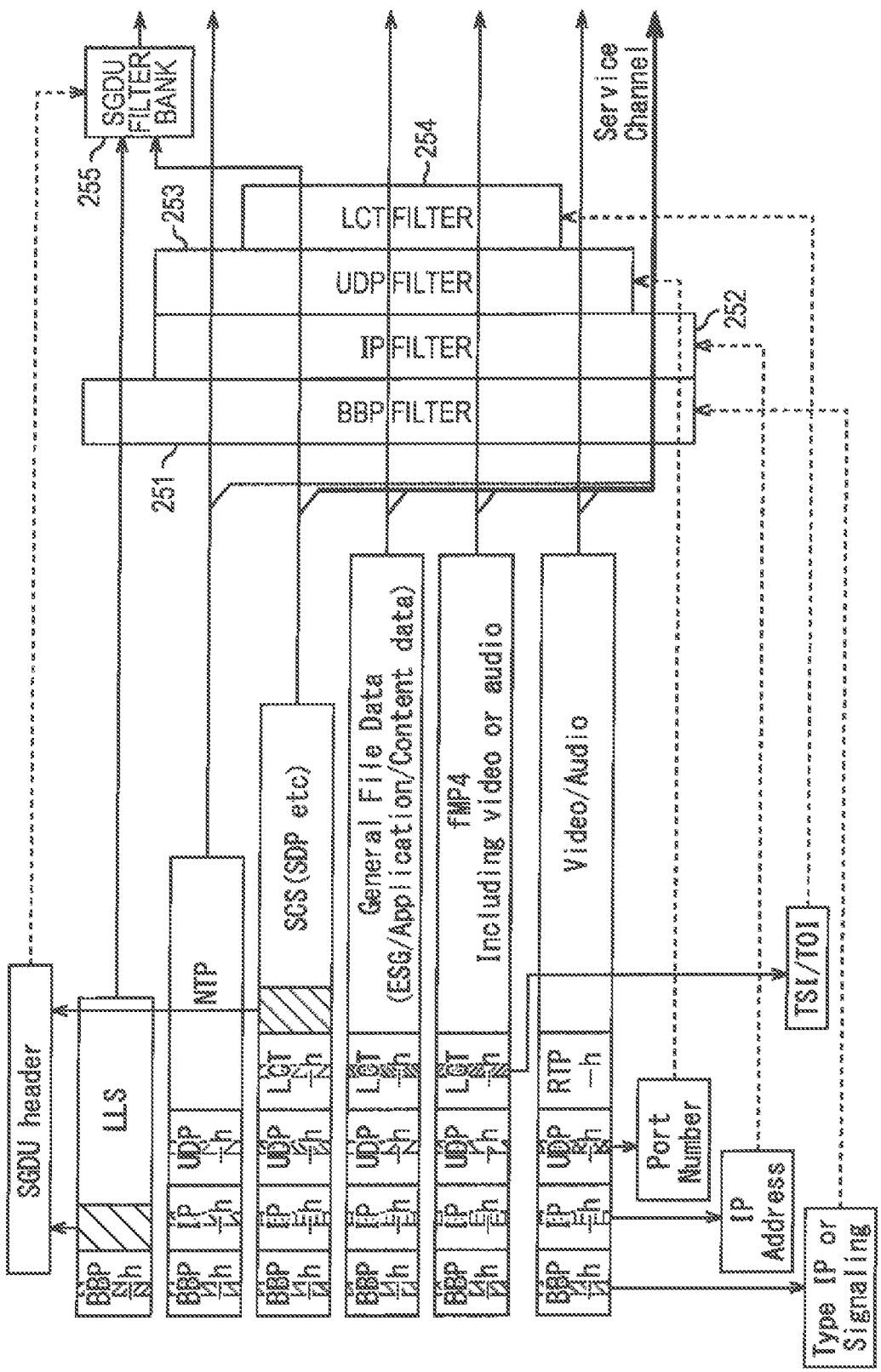
FIG. 10 is a view illustrating details of filtering of respective packets by Demux in the FLUTE transmission method.

As illustrated in FIG. 10, the Demux 213 receives various types of header information, and respective packets containing LLS, NTP, SCS, and various types of file data or video data and audio data as payloads.

A BBP header contains type information indicating IP or signaling. The BBP filter 251 performs filtering based on the type information contained in the BBP header. According to the example illustrated in FIG. 10, signaling is indicated only by the type information contained in the packet of LLS, while IP is indicated by each type information contained in the other packets. Accordingly, only the packet of LLS is supplied to the SGDU filter bank 255.

An IP header contains an IP address. The IP filter 252 performs filtering based on the IP address contained in the IP header. In the respective packets to each of which the IP header is added in the example illustrated in FIG. 10, only a packet of NTP has a different IP address, while the other packets have an identical IP address.

A UDP header contains a port number. The UDP filter 253 performs filtering based on the port number contained in the UDP header. According to the example illustrated in FIG. 10, port numbers of the UDP headers added to respective packets differ from each other. An LCT header is added to each of packets transmitted by FLUTE session, while an RTP header is added to each of packets transmitted by RTP session. After the IP filter 252 and the UDP filter 253 perform filtering based on the IP address and the port numbers, a packet of NTP to which the LCT header is not added is output to the clock generator 214. The packets of video data and audio data to which the RTP header is added are output to the video decoder 215 and the audio decoder 217, respectively.

Each LCT header contains Transport Session Identifier (TSI) and Transport Object Identifier (TOI). In case of Flute session, a specific file is designated based on these identification information. The LCT filter 254 performs filtering based on the TSI and TOI contained in each LCT header. According to the example illustrated in FIG. 10, the LCT filter 254 supplies the packet of SCS (SDP and the like) to the SGDU filter bank 255 at the time of designation of TSI and TOI specifying this SCS (SDP and the like). The LCT filter 254 also outputs packets of various types of file data to the FLUTE processing unit 220 in accordance with the TSI and TOI contained in each LCT header.

The SGDU filter bank 255 receives the packet of LLS and the packet of SCS. The SGDU filter bank 255 performs filtering based on SGDU headers added to these packets. In this case, the SGDU filter bank 255 stores only packets meeting filter conditions in a buffer memory of the SGDU filter bank 255. These stored packets are intermittently extracted by software from the CPU (CPU 901 in FIG. 71). For example, the packet of SDP may be made to pass only at the time of a version change based on the SGDU header describing version information (fragmentVersion in FIG. 14). After the filtering process, the packet of LLS is output to the control signal processing unit 222, while the packet of SCS is output to the FLUTE processing unit 220. However, the packet of SCS may be output directly to the control signal processing unit 222 without passing through the FLUTE processing unit 220.

Concerning packets of SCS (SDP and the like), respective file data, video data, and audio data corresponding to an identical service channel to which the identical IP address is added, the IP filter 252 can output these packets to the service package unit 224 together with the packet of NTP. Then, the service package unit 224 can package the components (audio/video), time information (NTP), control signals (SCS and the like), and others in units of service channel (service). According to this example, NTP common to a plurality of service channels is given. In this case, NTP has an IP address different from the IP address of the other packets. However, packaging with only two IP addresses is at least realizable.

(Signaling System in FLUTE Transmission Method)

A signaling system in the FLUTE transmission method is hereinafter described with reference to FIGS. 11 through 13.

(Basic Signaling System)

Figure 11:
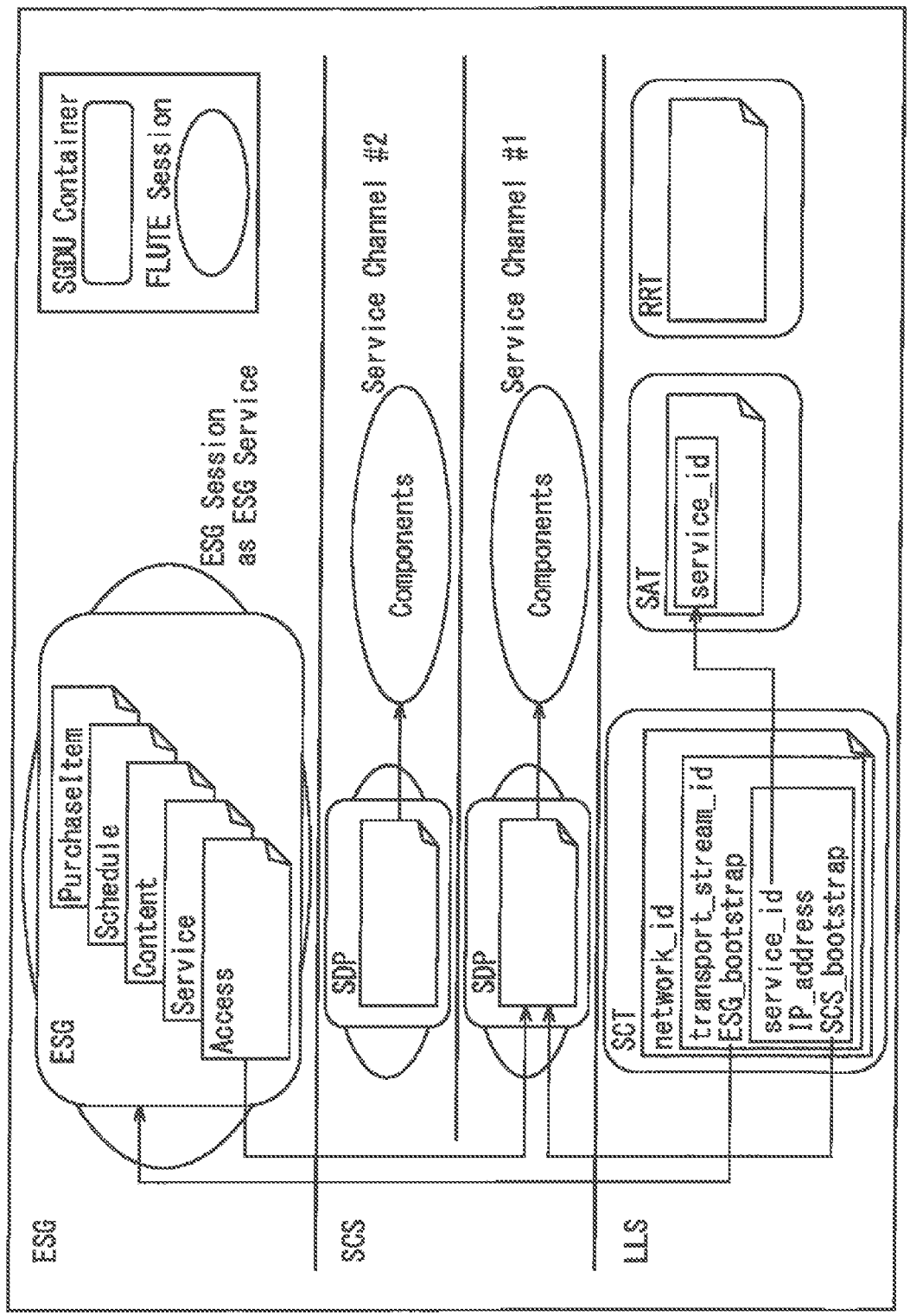
FIG. 11 is a view illustrating basic signaling system in the FLUTE transmission method.

FIG. 11 is a view illustrating a basic signaling system in the FLUTE transmission method.

As illustrated in FIG. 11, LLS contains SCT, SAT, and RRT. The SCT having a transmission cycle of one second, for example, is acquired by initial scan, or from a dedicated server (not shown) provided on the Internet 90. The SAT having a transmission cycle of 100 milliseconds is acquired at the time of channel selection of a service.

The SCT has a triplet structure including a transport stream (BBP stream) configuration and a service configuration within a broadcasting network. The SCT contains network_id, and a transport stream loop identified by transport_stream_id. The transport stream loop contains ESG_bootstrap information, and a service loop identified by service_id. The service loop contains an IP address and SCS_bootstrap information for a corresponding service. While not shown in the figure, the SCT contains information and the like concerning a physical layer to be used as channel selection information.

The SAT indicates a service currently on the air. The SCT and the SAT can be linked with each other by service_id to determine whether or not a particular service is on the air. The RRT indicates a regional information table concerning classification of programs.

As illustrated in FIG. 11, the SCS contains SDP. The SDP has a transmission cycle of 100 milliseconds, for example. The SDP indicates service attributes in units of service, component configuration information, component attributes, component filter information, and component location information. The SDP is prepared for each service. According to the example illustrated in FIG. 11, the SDP is transmitted by FLUTE session. In this case, the SDP can be acquired from FLUTE session based on the IP address of the corresponding service, and the port number and Transport Session Identifier (TSI) contained in the SCS_bootstrap information for transmitting the SDP. Moreover, the SDP contains information describing acquisition of components. Accordingly, video data and audio data are acquired in units of service by accessing components based on the information contained in the SDP, for example.

According to the example illustrated in FIG. 11, ESG is transmitted by FLUTE session. The ESG is an electronic service guide constituted by Access, Service, Content, Schedule, PurchaseItem and others. The ESG can be acquired from FLUTE session based on an IP address, a port number, and Transport Session Identifier (TSI) for transmission of the ESG contained in ESG_bootstrap information in the SCT. An Access table of the ESG describes Uniform Resource Locator (URL) information in the SDP. The SDP transmitted by FLUTE session is capable of resolving the URL of the SDP. Accordingly, designation of specific SDP is allowed based on the URL information in the ESG. In this case, the ESG and the SDP are linked with each other without intervention of LLS, wherefore devices corresponding to a particular architecture are operable without LLS.

As described above, LLS (SCT, SAT, RRT) and SCS (SDP) are transmitted via an SGDU container. Similarly, ESG is transmitted via an SGDU container. Accordingly, the methods for transmitting these elements can be unified.

(Signaling System in NRT Service)

Figure 12:
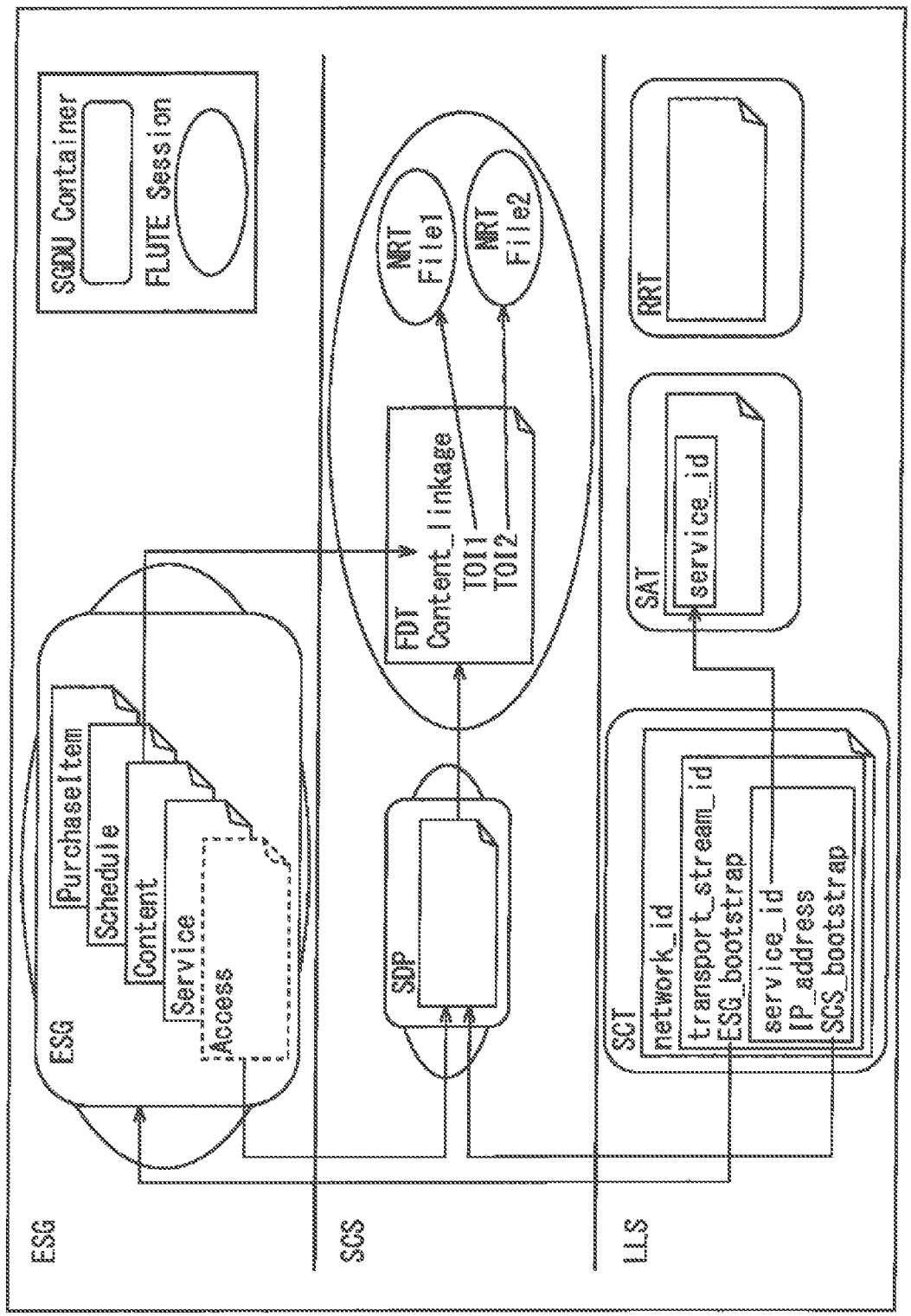
FIG. 12 is a view illustrating a signaling system in an NRT service in the FLUTE transmission method.

FIG. 12 is a view illustrating a signaling system in an NRT service in the FLUTE transmission method.

The NRT service in this context is a service for reproducing NRT content transmitted in NRT broadcasting after temporality storing the NRT content in the storage 221 of the receiving device 20.

As illustrated in FIG. 12, LLS in the NRT service contains SCT, SAT, and RRT similarly to the example illustrated in FIG. 11. According to the NRT service, SCS (SDP) and ESG are transmitted by FLUTE session similarly to the example illustrated in FIG. 11. The SDP in the NRT service contains a port number and TSI as detailed below with reference to FIGS. 55 through 62. Accordingly, acquisition of a file of particular NRT content is allowed based on the TSI with reference to index information contained in File Delivery Table (FDT) cyclically transmitted in FLUTE session and acquired.

(Signaling System in Hybrid Service)

Figure 13:
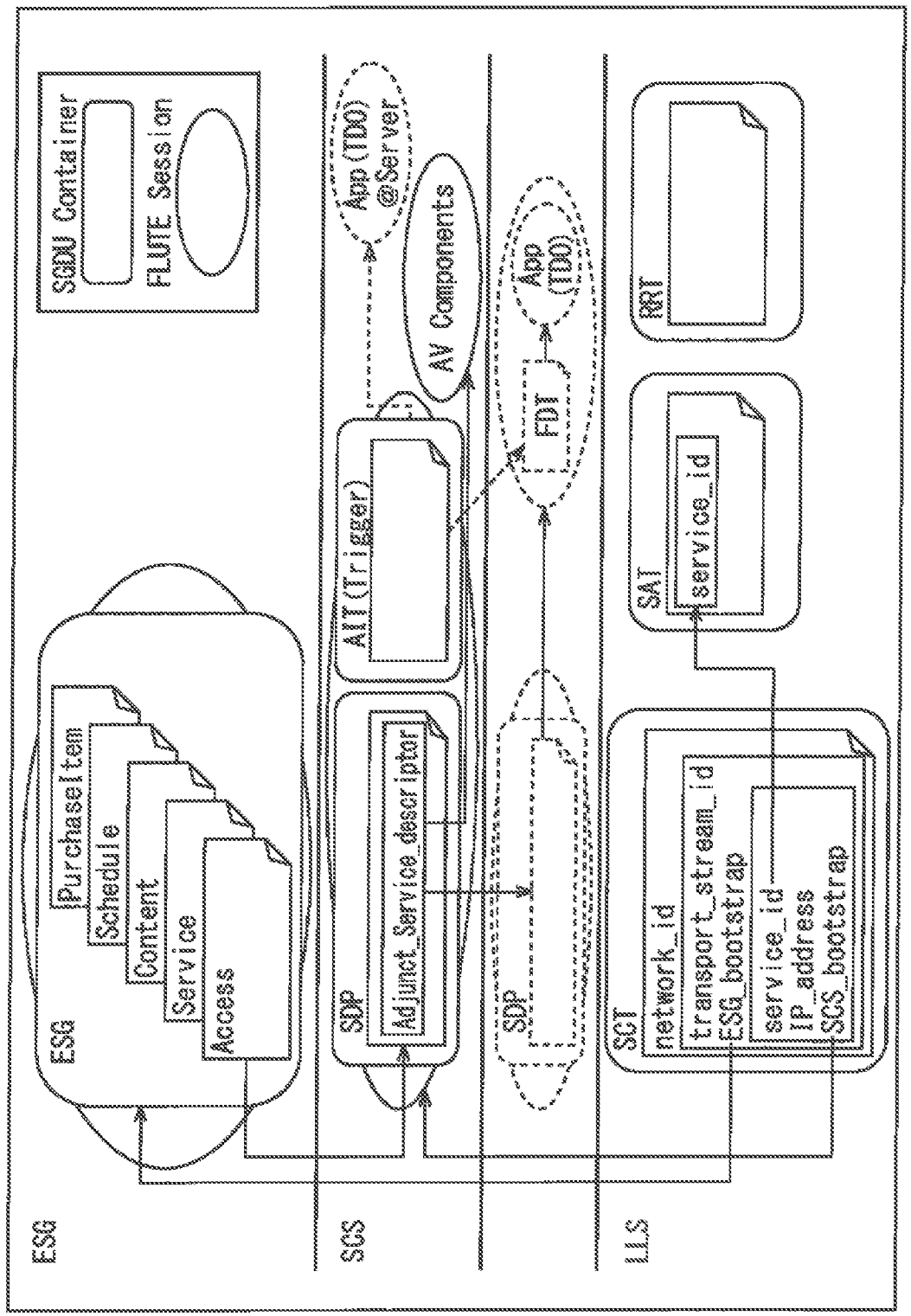
FIG. 13 is a view illustrating a signaling system in a hybrid service in the FLUTE transmission method.

FIG. 13 is a view illustrating a signaling system in a hybrid service in the FLUTE transmission method.

The hybrid service in this context is a service which uses broadcasting in the digital broadcasting field in linkage with the Internet. This hybrid service is capable of executing applications distributed via the Internet in conjunction with broadcasting content such as TV programs.

As illustrated in FIG. 13, LLS in the hybrid service contains SCT, SAT, and RRT similarly to the example illustrated in FIG. 11. According to the hybrid service, SCS and ESG are transmitted by FLUTE session similarly to the example illustrated in FIG. 11. The SCS in the hybrid service uses AIT as well as SDP as detailed below with reference to FIGS. 63 through 65. An application transmitted by FLUTE session, or an application provided by the application server 50 is acquired based on the AIT, and executed in conjunction with a TV program or the like.

As illustrated in FIG. 13, the SDP and the AIT are transmitted as SCS by the same FLUTE session. In this case, the SDP and the AIT may be individually identified based on particular TOI given to each of the SDP and AIT, or identification information (fragment TransportID in FIG. 14) contained in an SGDU header, for example.

(SGDU Structure in FLUTE Transmission Method)

FIG. 14 is a view illustrating an SGDU structure in the FLUTE transmission method.

As illustrated in FIG. 14, Service Guide Delivery Unit (SGDU) is constituted by header information (Unit_Header) and a payload (Unit_Payload). The SGDU contains extension information (extension_data) as necessary.

The header information contains fragmentTransport ID and fragmentVersion. The fragmentTransport ID indicates fragment identification. For example, SCT, SDP and the like are identified by fragmentTransportID. The fragmentVersion indicates a version number of a fragment.

The payload contains actual data of at least either an XML fragment or an SDP fragment. More specifically, the payload contains data on one or a plurality of fragments corresponding to the number designated by n_o_service_guide_fragments included in the header information. In this case, a combination of the plurality of fragments contained in the payload, such as a combination of both the XML fragment and the SDP fragment, may be arbitrarily determined. Positions of arbitrary fragments in the plurality of fragments contained in the payload may be indicated by offset in the header information.

When the XML fragment is contained, fragmentType indicating the type of the fragment is provided together with actual data. When the SDP fragment is contained, fragmentID for identifying the fragment is provided together with actual data.

When the extension information is contained, extension_type indicating the type of the extension information is provided together with extension_data. The position of the extension information may be indicated by designating extension_offset in the header information. The extension information is used not in the FLUTE transmission method, but used in the UDP transmission method described below.

This is all the description concerning the FLUTE transmission method.

<(2) UDP Transmission Method>

The UDP transmission method is hereinafter described.

(Protocol Stack)

Figure 15:
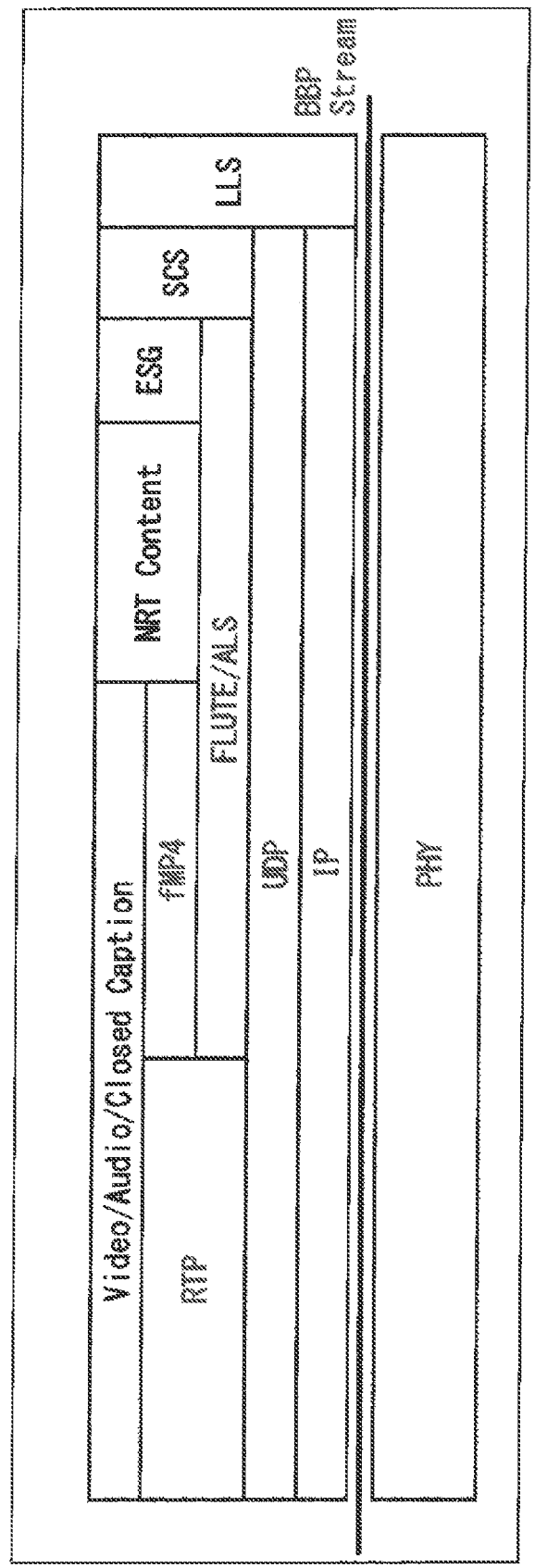
FIG. 15 is a view illustrating a protocol stack of digital broadcasting in a UDP transmission method.

FIG. 15 is a view illustrating a protocol stack in digital broadcasting in the UDP transmission method.

As illustrated in FIG. 15, a lowest layer is a physical layer. A layer immediately above the physical layer is an IP layer. A BBP stream is interposed between the physical layer and the IP layer. A layer immediately above the IP layer is an UDP layer. A layer immediately above the UDP layer contains RTP, FLUTE/ALS, and SCS.

Accordingly, the UDP transmission method is different from the FLUTE transmission method in that the SCS, which is disposed in the layer above the FLUTE/ALS in the FLUTE transmission method, is positioned in the layer above the UDP layer. However, SDP, AIT and the like are transmitted as the SCS similarly to the FLUTE transmission method. The SDP contains service attributes in units of service, component configuration information, component attributes, component filter information, and component location information, for example. The AIT is application control information in a hybrid service.

A layer disposed immediately above the FLUTE/ALS is fMP4, while a layer disposed immediately above RTP and fMP4 contains video data, audio data, caption data and others. A layer disposed immediately above the FLUTE/ALS contains NRT content and ESG. In this case, the NRT content and the ESG are transmitted by FLUTE session. Further provided is LLS indicating low layer signaling information transmitted on the BBP stream. For example, service configuration information such as SCT, SAT, and RRT is transmitted as LLS.

(ID System in UDP Transmission Method)

Figure 16:
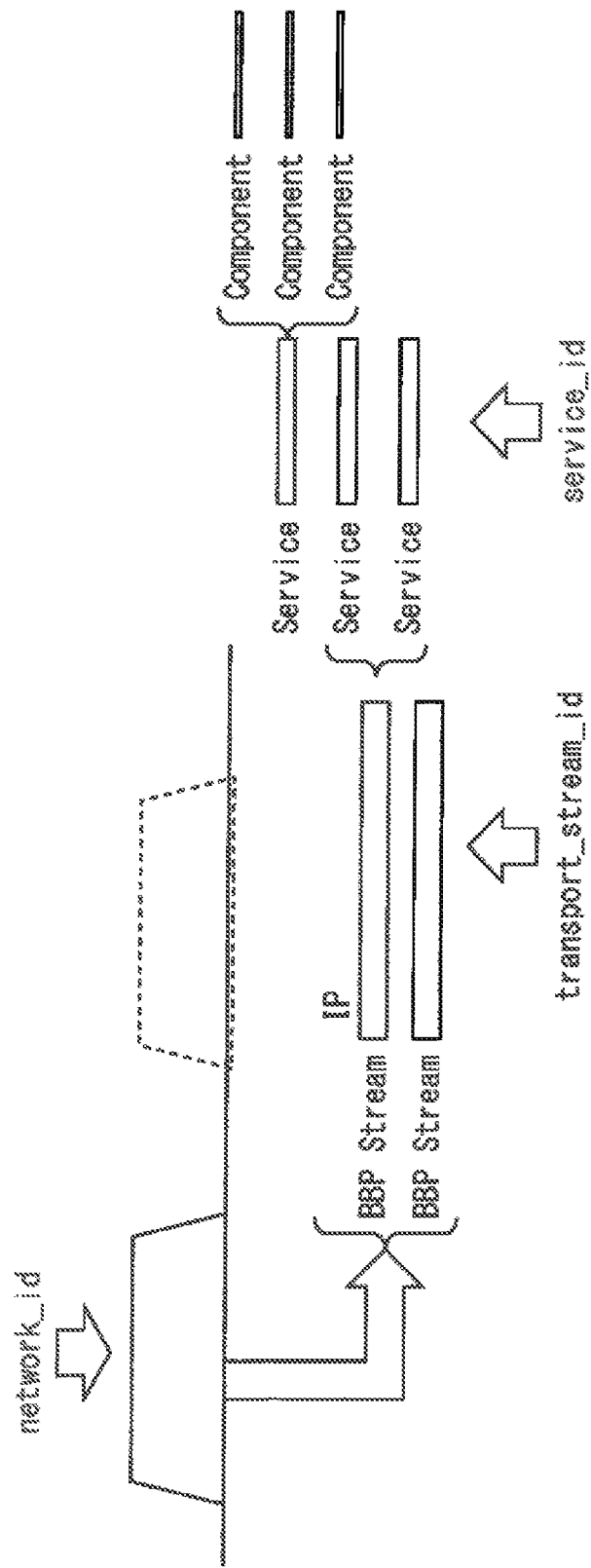
FIG. 16 is a view illustrating a relationship between a signal of a broadcasting wave and an ID system of the UDP transmission method.

FIG. 16 is a view illustrating a relationship between signals of a broadcasting wave and an ID system in the UDP transmission method.

As illustrated in FIG. 16, network_id is allocated to a broadcasting wave having a frequency band of 6 MHz. Each of the broadcasting waves contains one or a plurality of BBP streams identified by transport_stream_id. Each of the BBP streams includes a plurality of BBP packets each of which is constituted by a BBP header and a payload.

Each of the BBP streams contains a plurality of services identified by service_id. Each of the services is constituted by a plurality of components. Each of the components corresponds to information such as video data and audio data for constituting a program.

Accordingly, the ID system of the UDP transmission method adopts a triplet structure including a combination of network_id, transport_stream_id, and service_id similarly to the FLUTE transmission method.

(Configuration of Broadcasting Wave in UDP Transmission Method)

Figure 17:
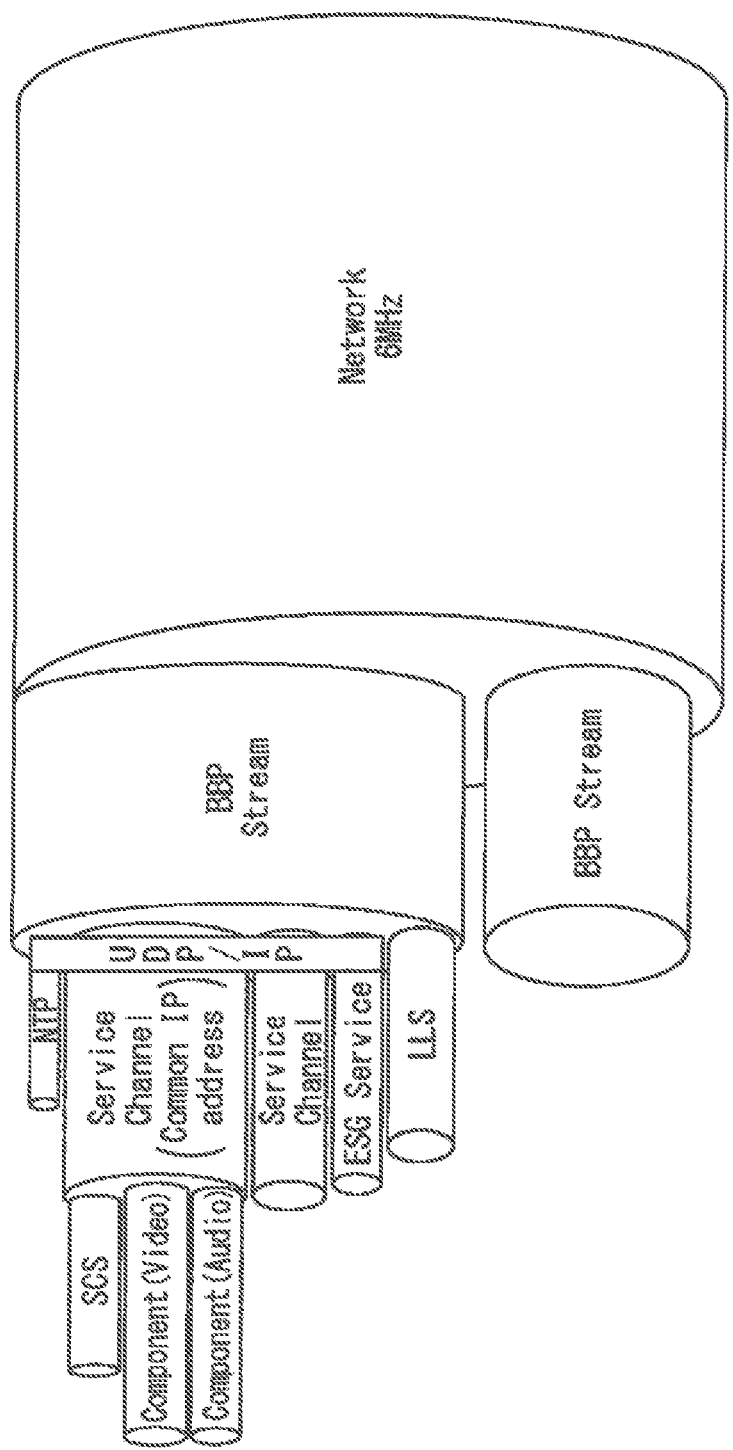
FIG. 17 is a view illustrating a configuration of a broadcasting wave of the digital broadcasting in the UDP transmission method.

FIG. 17 is a view illustrating a configuration of a broadcasting wave in digital broadcasting in the UDP transmission method.

As illustrated in FIG. 17, one or a plurality of the BBP streams can be acquired from a broadcasting wave having a frequency band of 6 MHz ("Network" in the figure). In addition, NTP, a plurality of service channels, an electronic service guide, and LLS can be acquired from each of the BBP streams. In this case, the NTP, the service channels, and the electronic service guide are transmitted under protocol of UDP/IP. However, the LLS is transmitted on the BBP stream.

Each of the service channels contains components such as video data and audio data, and SCS such as SDP and AIT. Moreover, each of the service channels is given a common IP address so that components, control signals and the like can be packaged for each service channel based on this IP address.

(Configuration of LLS)

Figure 18:
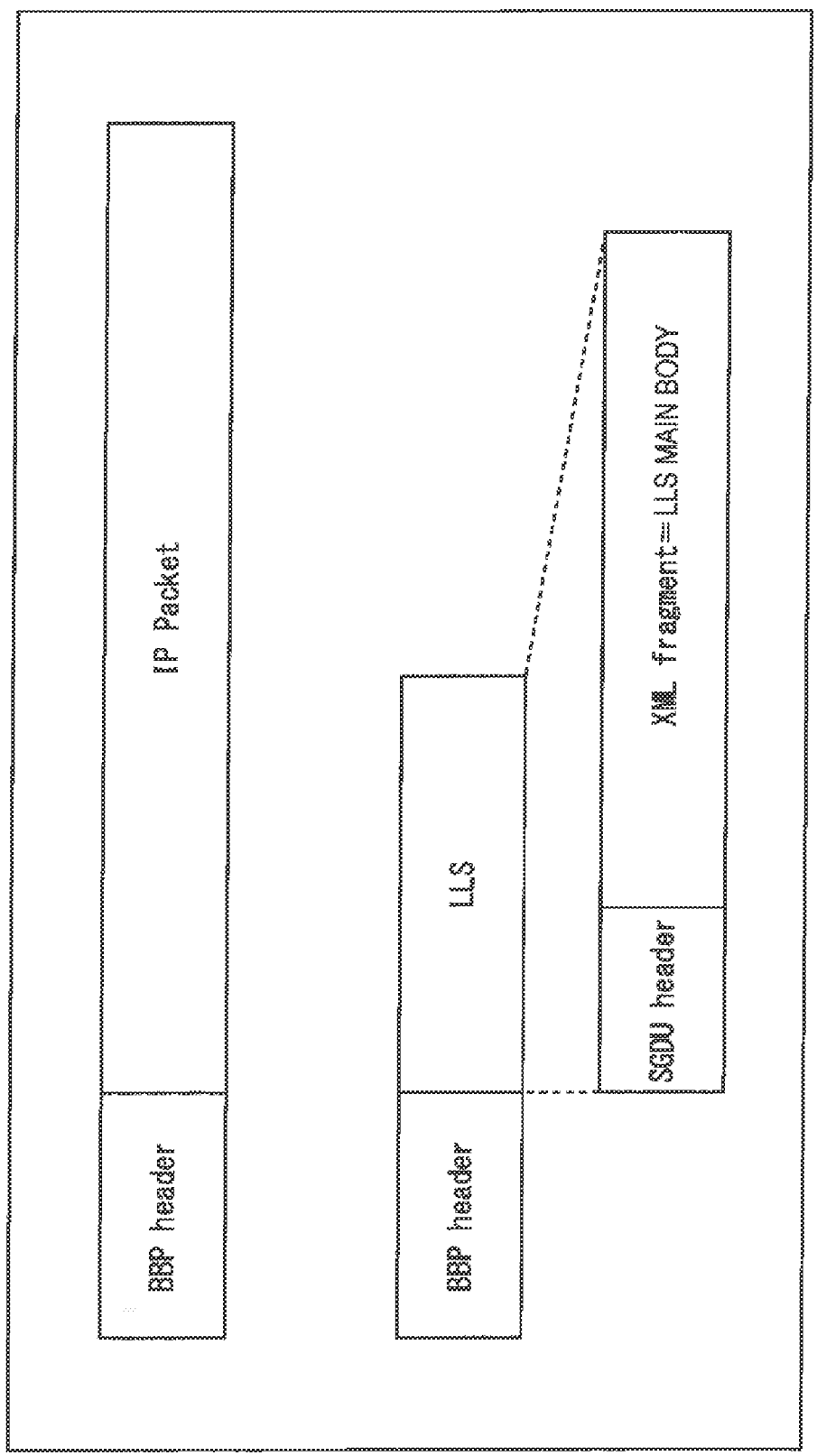
FIG. 18 is a view illustrating a configuration of LLS in the UDP transmission method.

FIG. 18 is a view illustrating a configuration of LLS in the UDP transmission method.

As illustrated in FIG. 18, a BBP packet is constituted by a BBP header and a payload. At the time of transmission of an IP packet by a BBP stream, this XP packet constitutes a payload portion.

At the time of transmission of LLS by a BBP stream, this LLS is disposed after the BBP header. The LLS contains SCT, SAT and the like. In this case, an SGDU header is added to an XML fragment corresponding to a part of LLS data and constituting the LLS main body. Accordingly, the SCT and SAT are transmitted via an SGDU container.

Accordingly, the configuration of LLS in the UDP transmission method is basically similar to the configuration of LLS in the FLUTE transmission method.

(Configuration of SCS)

Figure 19:
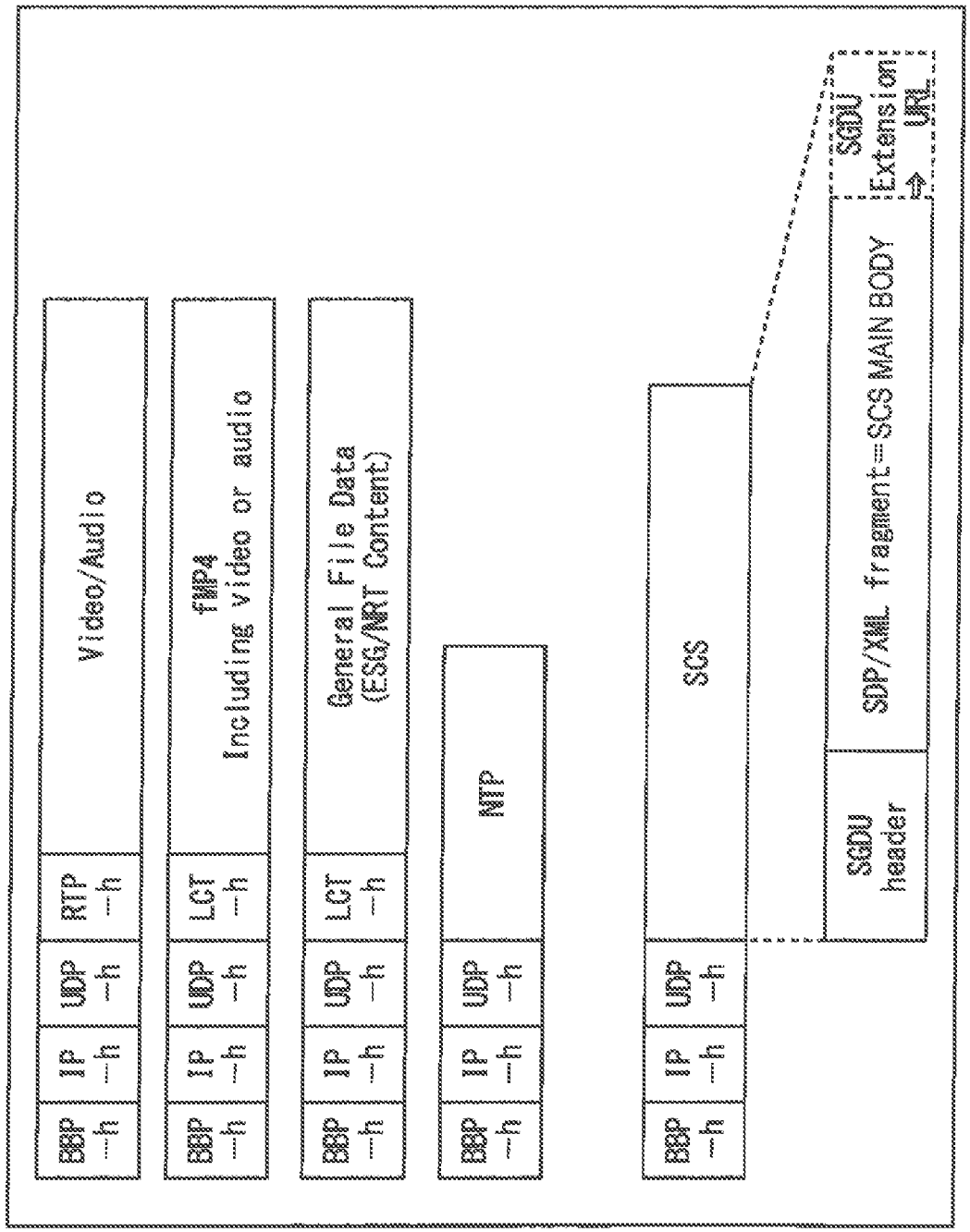
FIG. 19 is a view illustrating a configuration of SCS in the UDP transmission method.

FIG. 19 is a view illustrating a configuration of SCS in the UDP transmission method.

As illustrated in FIG. 19, RTP session is used when video data or audio data is transmitted in synchronous stream format. In this case, each header of BBP, IP, UDP, and RTP is added to the payload. On the other hand, FLUTE session is used when file data such as fMP4, ESG, and NRT content is transmitted in asynchronous file format. In this case, each header of BBP, IP, UDP, and LCT is added to the payload. In the figure, NTP provided as a layer higher than a UDP layer is disposed after each header of BBP, IP, and UDP.

The SCS transmitted not by using FLUTE session in the UDP transmission method is disposed after each header of BBP, IP, and UDP without an LCT header. The SCS includes SDP and the like described in text format, for example. In this case, an SGDU header is added to an SDP fragment corresponding to a part of SCS data and constituting the SCS main body. Accordingly, the SDP is transmitted via an SGDU container. The SGDU may contain extension information. In this case, URL information in the SDP (url_text in FIG. 24) is provided as the extension information in the SGDU (SGDU extension). When the URL information is provided, the Access table of the ESG describes URL information in the SDP. Accordingly, designation of particular SDP is allowed with reference to the Access table.

(Concept of Service Channel)

According to the UDP transmission method, a common IP address is added to each of service channels similarly to the FLUTE transmission method. In this case, components, control signals and the like can be packaged for each service channel based on the common IP address. Signals of elements constituting a service such as video data, audio data, and control signals having an identical IP address and packaged in the foregoing manner are handled in units of service channel (service). Accordingly, various operation modes such as addition of an application to a service channel are easily achievable with high flexibility.

(Configuration Example of Broadcasting System)

The UDP transmission system may adopt a configuration for transmission and reception in digital broadcasting similar to the corresponding configuration of the broadcasting system 1 (FIG. 7) used in the FLUTE transmission method. In addition, the transmitting device 10 in the UDP transmission method may have a configuration similar to the configuration illustrated in FIG. 8, while the receiving device 20 in the UDP transmission method may have a configuration similar to the configuration illustrated in FIG. 9. These configurations already discussed above in the case of adopting the FLUTE transmission method are not repeatedly described herein. However, the FLUTE transmission method and the UDP transmission method are different in the transmission method of SCS, wherefore the details of only this transmission method are given below with reference to FIGS. 20 through 24.

(Details of Filtering)

Filtering of respective packets performed by the Demux 213 (FIG. 9) in the UDP transmission method is hereinafter detailed with reference to FIG. 20.

Figure 20:
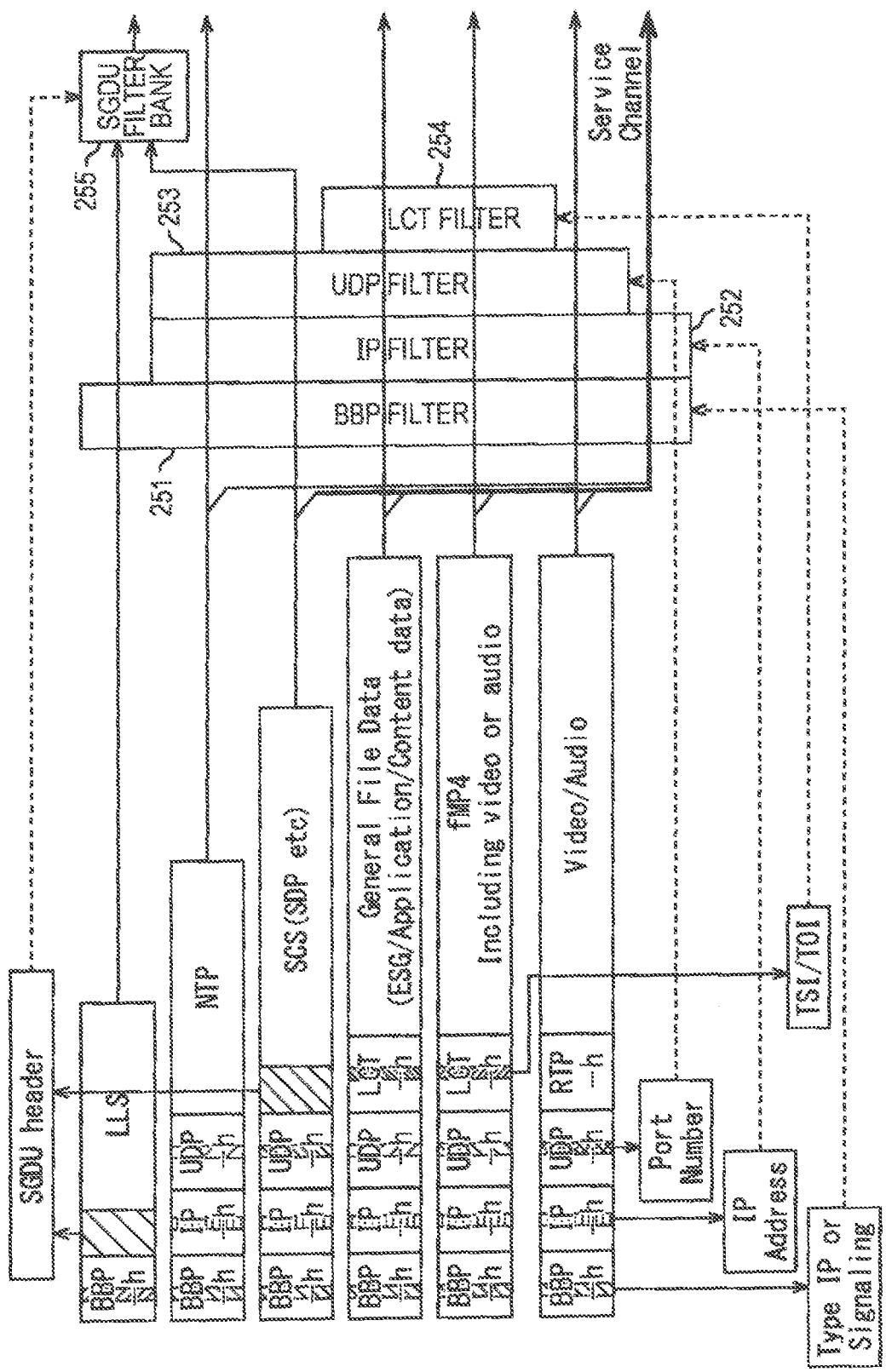
FIG. 20 is a view illustrating details of filtering of respective packets by Demux in the UDP transmission method.

As illustrated in FIG. 20, the Demux 213 receives respective header information, and packets containing LLS, NTP, SCS, respective file data, or video data and audio data as payloads.

The BBP filter 251 performs filtering based on type information contained in the BBP header, and supplies a packet of LLS to the SGDU filter bank 255.

The IP filter 252 performs filtering based on the IP address contained in the IP header. The UDP filter 253 performs filtering based on port numbers contained in the UDP headers. After the IP filter 252 and the UDP filter 253 perform filtering based on the IP address and the port numbers, a packet of NTP to which the LCT header is not added is output to the clock generator 214. The packet of SCS to which the LCT header is not added is supplied to the SGDU filter bank 255. The packets of video data and audio data to which the RTP header is added are output to the video decoder 215 and the audio decoder 217, respectively.

The LCT filter 254 performs filtering based on TSI and TOI contained in each LCT header, and supplies packets of respective file data to the FLUTE processing unit 220. The SGDU filter bank 255 receives the packet of LLS and the packet of SCS. The SGDU filter bank 255 performs filtering based on SGDU headers added to these packets. For example, the packet of SDP may be made to pass only at the time of a version change based on the SGDU header describing version information (fragmentVersion in FIG. 24). After the filtering process, the packets of LLS and SCS are output to the control signal processing unit 222.

Concerning packets of SCS (SDP), respective file data, video data, and audio data corresponding to an identical service channel to which an identical IP address is added, the IP filter 252 can output these packets to the service package unit 224 together with the packet of NTP. Then, the service package unit 224 can package the components (audio/video), time information (NTP), control signals (SCS), and others in units of service channel (service). According to this example, NTP common to a plurality of service channels is given. In this case, NTP has an IP address different from the IP address of the other packets. However, packaging with only two IP addresses is at least realizable.

(Signaling System in UDP Transmission Method)

A signaling system in the UDP transmission method is hereinafter described with reference to FIGS. 21 through 23.

(Basic Signaling System)

Figure 21:
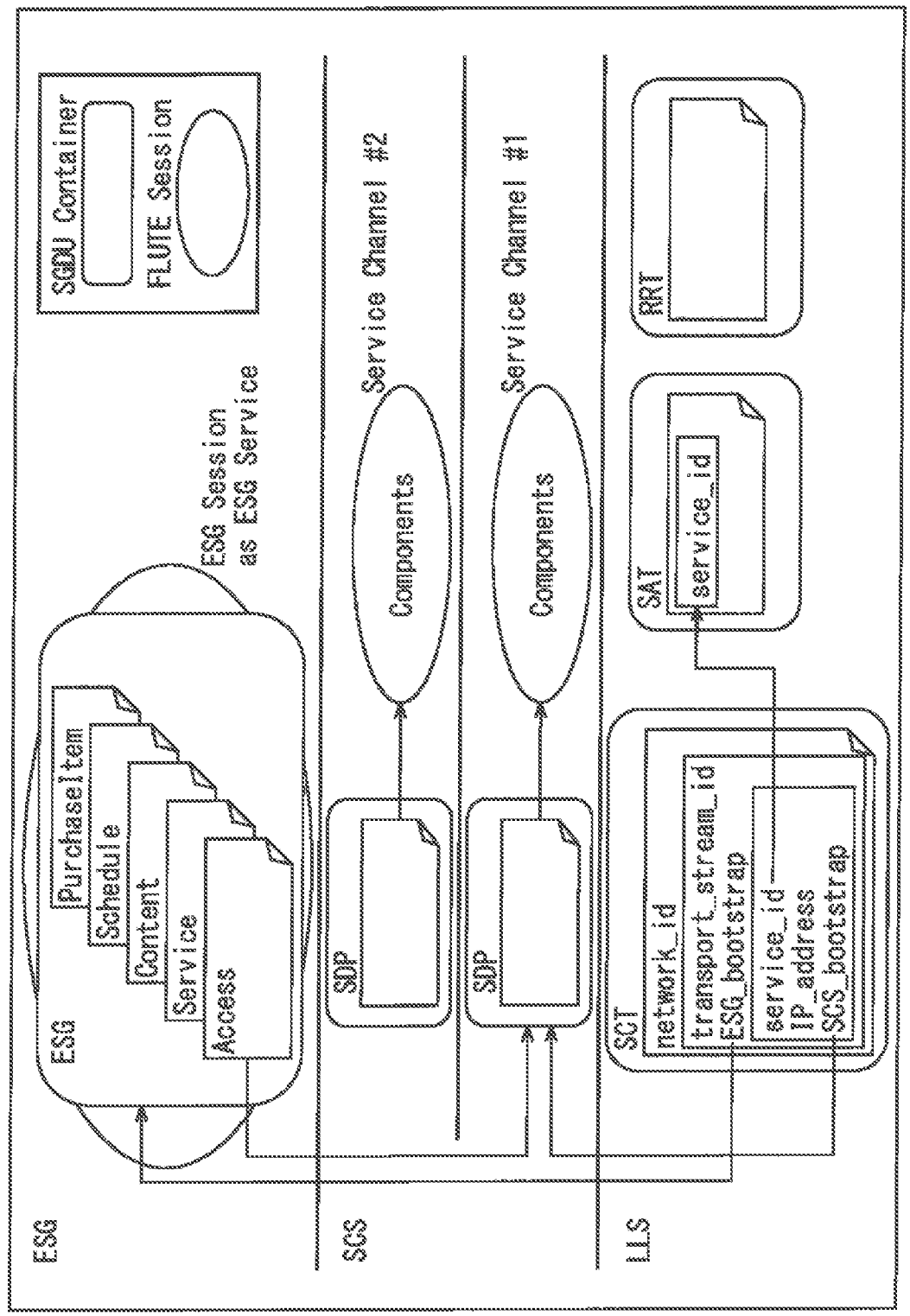
FIG. 21 is a view illustrating basic signaling system in the UDP transmission method.

FIG. 21 is a view illustrating a basic signaling system in the UDP transmission method.

As illustrated in FIG. 21, LLS contains SCT, SAT, and RRT. The SCT having a transmission cycle of one second, for example, is acquired by initial scan, for example. The SAT having a transmission cycle of 100 milliseconds is acquired at the time of channel selection of a service.

The SCT contains network_id, and a transport stream loop identified by transport_stream_id. The transport stream loop contains ESG_bootstrap information, and a service loop identified by service_id. The service loop contains an IP address and SCS_bootstrap information for a corresponding service. The SCT and SAT can be linked with each other by service_id to determine whether or not a particular service is currently on the air.

As illustrated in FIG. 21, SCS contains SDP. The SDP has a transmission cycle of 100 milliseconds, for example. According to the example illustrated in FIG. 21, the SDP is transmitted by UDP. In this case, the SDP transmitted by UDP can be acquired based on an IP address of a corresponding service, and a port number contained in the SCS_bootstrap information for transmitting the SDP. Moreover, the SDP contains information describing acquisition of components. Accordingly, video data and audio data are acquired in units of service by accessing components based on the information contained in the SDP, for example.

According to the example illustrated in FIG. 21, ESG is transmitted by FLUTE session. The ESG can be acquired from FLUTE session based on an IP address, a port number, and TSI contained in ESG_bootstrap information in the SCT for transmission of the ESG. An Access table of the ESG describes URL information in the SDP. The SDP is transmitted via an SGDU container. However, when the SDP and the URL information are acquired and stored beforehand, for example, the particular SDP can be designated with reference to the Access table of the ESG based on the URL information (url_text in FIG. 24) in the SDP provided as extension information in the SGDU. In other words, the UDP transmission method does not transmit the SDP by FLUTE session, but is capable of accessing particular SDP with reference to the Access table of the ESG. In addition, the ESG and the SDP are linked with each other without intervention of LLS, wherefore devices corresponding to a particular architecture are operable without LLS.

As described above, LLS (SCT, SAT, RRT) and SCS (SDP) are transmitted via an SGDU container. Similarly, ESG is transmitted via an SGDU container. Accordingly, the methods for transmitting these elements can be unified.

(Signaling System in NRT Service)

Figure 22:
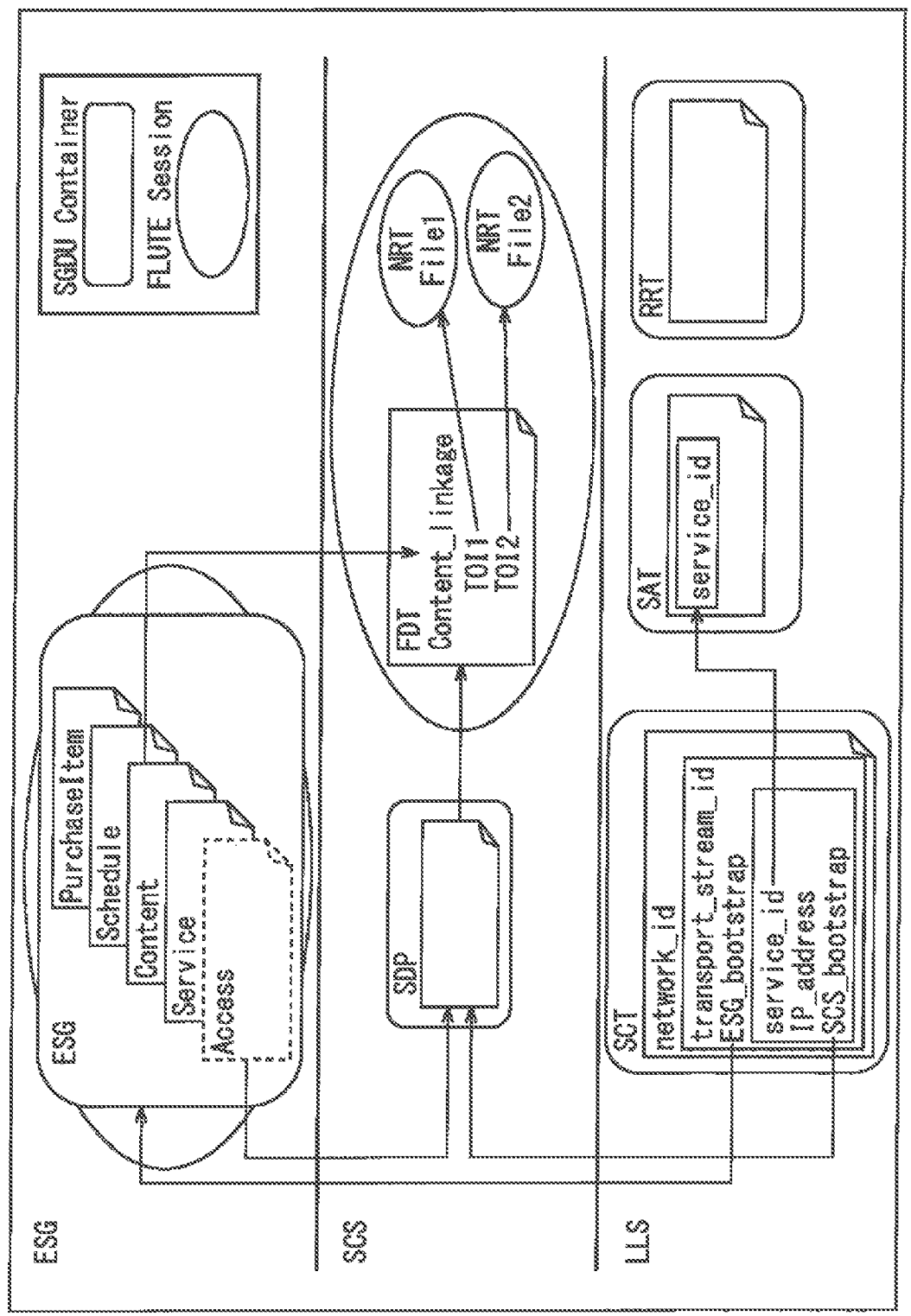
FIG. 22 is a view illustrating a signaling system in an NRT service in the UDP transmission method.

FIG. 22 is a view illustrating a signaling system in an NRT service in the UDP transmission method.

As illustrated in FIG. 22, LLS contains SCT, SAT, and RRT in an NRT service similarly to the example illustrated in FIG. 21. According to the NRT service, ESG is transmitted by FLUTE session similarly to the example illustrated in FIG. 21. However, SCS (SDP) is not transmitted by FLUTE session in the UDP transmission method, wherefore SDP transmitted by UDP is acquired based on an IP address and a port number. The SDP in the NRT service contains a port number and TSI as detailed below with reference to FIGS. 55 through 62. Accordingly, acquisition of a file of particular NRT content is allowed based on the TSI with reference to index information contained in File Delivery Table (FDT) cyclically transmitted in FLUTE session and acquired.

(Signaling System in Hybrid Service)

Figure 23:
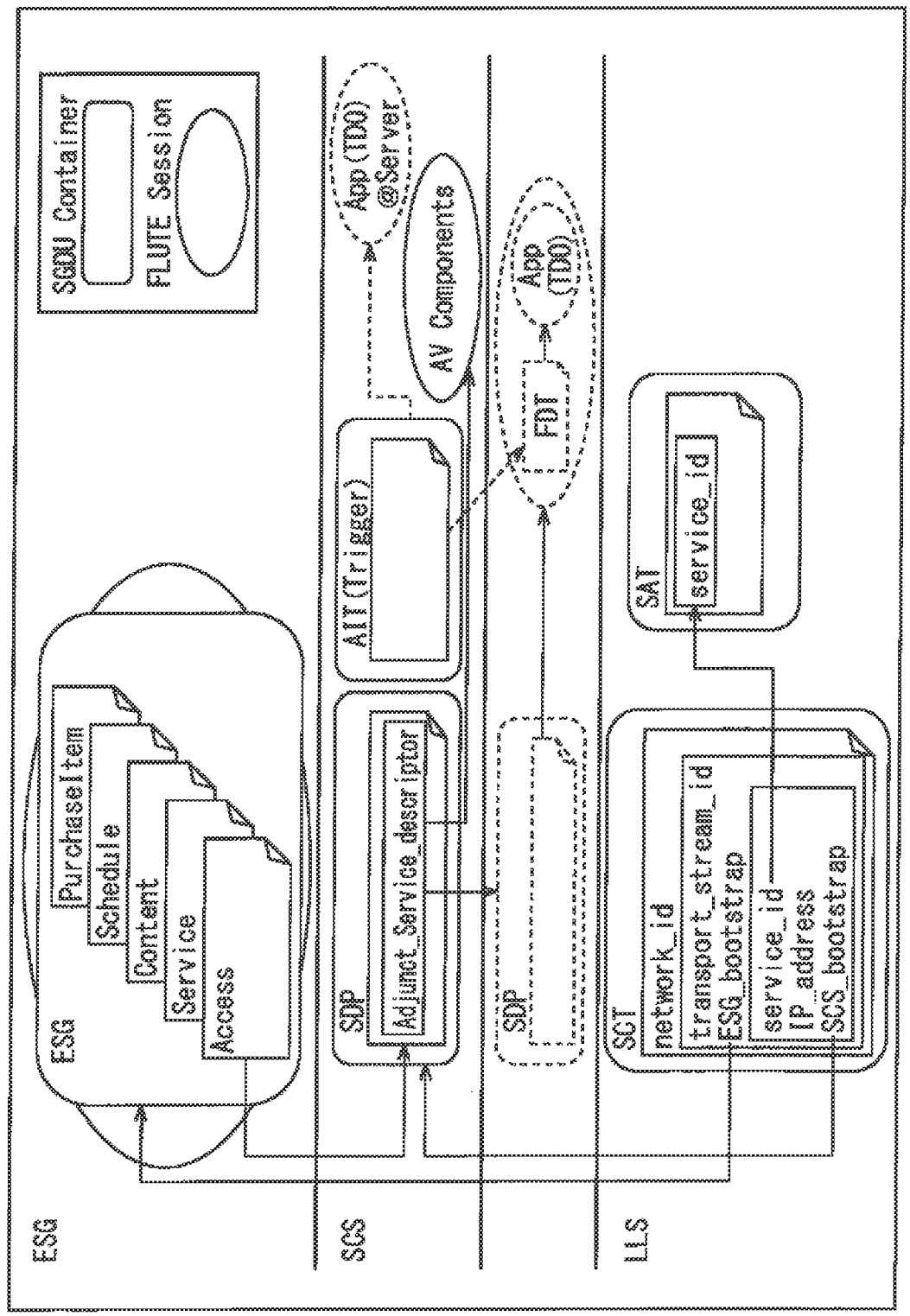
FIG. 23 is a view illustrating a signaling system in a hybrid service in the UDP transmission method.

FIG. 23 is a view illustrating a signaling system in a hybrid service in the UDP transmission method.

As illustrated in FIG. 23, LLS in the hybrid service contains SCT, SAT, and RRT similarly to the example illustrated in FIG. 21. According to the hybrid service, ESG is transmitted by FLUTE session similarly to the example illustrated in FIG. 21. However, SCS (SDP) is not transmitted by FLUTE session in the UDP transmission method, wherefore SDP transmitted by UDP is acquired based on an IP address and a port number. The SCS in the hybrid service contains AIT as well as SDP as detailed below with reference to FIGS. 63 through 65. An application transmitted by FLUTE session, or an application provided by the application server 50 is acquired based on the AIT, and executed in conjunction with a TV program or the like.

(SGDU Structure in UDP Transmission Method)

FIG. 24 is a view illustrating an SGDU structure in the UDP transmission method.

As illustrated in FIG. 24, Service Guide Delivery Unit (SGDU) is constituted by header information (Unit_Header) and a payload (Unit_Payload). The SGDU contains extension information (extension_data) as necessary.

The header information contains fragmentTransport ID and fragmentVersion. The fragmentTransport ID indicates fragment identification. For example, SCT, SDP and the like are identified by fragmentTransportID. The fragmentVersion indicates a version number of a fragment.

The payload contains actual data of at least either an XML fragment or an SDP fragment. More specifically, the payload contains data on one or a plurality of fragments corresponding to the number designated by n_o_service_guide_fragments included in the header information. In this case, a combination of the plurality of fragments contained in the payload, such as a combination of both the XML fragment and the SDP fragment, may be arbitrarily determined. Positions of arbitrary fragments in the plurality of fragments contained in the payload may be indicated by offset in the header information.

When the XML fragment is contained, fragmentType indicating the type of the fragment is provided together with actual data. When the SDP fragment is contained, fragmentID for identifying the fragment is provided together with actual data.

According to the UDP transmission method, extension information (extension_data) is given unlike the FLUTE transmission method. As this extension information, URL information in the SDP is contained in url_text together with extension_type indicating a type of extension information. A URL length is indicated by url_length. The position of the extension information may be indicated by designating extension_offset in the header information.

This is all the description concerning the UDP transmission method.

2. Signaling Information

Hereinafter described is signaling information transmitted in digital broadcasting using the IP transmission method according to the present technology. While the FLUTE transmission method and the UDP transmission method are different in the transmission method of SCS, contents of signaling information to be transmitted are the same for both the methods.

<(1) Structure Details of LLS (SCT, SAT, RRT)>

(SCT Data Structure)

FIG. 25 is a view illustrating a data structure of SCT. According to elements and attributes illustrated in FIG. 25, "@" is given to the attributes. Indented elements and attributes are child elements contained in high-order parent elements( )

As illustrated in FIG. 25, sct element contains network_id attribute, name attribute, and BBP_stream element. In the figure, network_id attribute designates an identifier of a broadcaster for each physical channel. In the figure, name attribute designates a name of a broadcaster for each physical channel.

In the figure, BBP_stream element is a child element of sct element, and designates information concerning a BBP stream. This BBP stream element contains transport_stream_id attribute, payload_type attribute, name attribute, ESG_bootstrap element, and service element.

In the figure, transport_stream_id attribute designates an identifier of a BBP stream. When a plurality of BBP streams are provided, each of the BBP streams is identified by transport_stream_id. In the figure, payload_type attribute designates a payload type of a BBP stream. For example, IPv4, IPv6, MPEG2-TS are designated as the payload type. In the figure, name attribute designates a name of a BBP stream.

In the figure, ESG_bootstrap element is a child element of BBP_stream, and designates access information about access to ESG. This ESG_bootstrap element contains source_IP_address attribute, destination_IP_address attribute, UDP_port_num attribute, and TSI attribute.

In the figure, source_IP_address attribute and destination_IP_address attribute designate IP addresses of a transmission source (source) and a transmission destination (destination) for transmission of ESG, respectively. In the figure, UDP_port_num attribute designates a port number for transmission of ESG. In the figure, TSI attribute designates TSI in FLUTE session for transmission of ESG.

In the figure, service element is a child element of BBP_stream element, and designates information concerning a service. This service element contains service_id attribute, service_type attribute, and SCS_bootstrap element.

In the figure, service_id attribute designates an identifier of a service. When a plurality of services are provided, each of the services is identified by service_id attribute. In the figure, service_type attribute designates type information indicating a type of a service. This type information designates TV, audio, data, NRT, ESG and the like.

In the figure, SCS_bootstrap element is a child element of service element, and designates information about access to a service channel. This SCS_bootstrap element contains source_IP_address attribute, destination_IP_address attribute, port_num attribute, and TSI attribute.

In the figure, source_IP_address attribute and destination_IP_address attribute designate IP addresses of a transmission source (source) and a transmission destination (destination) for transmission of a service, respectively. In the figure, port_num attribute designates a port number for transmission of SCS. In the figure, TSI attribute designates TSI in FLUTE session for transmitting SCS.

The data structure of SCT described with reference to FIG. 25 is presented only by way of example. Other data structures may be adopted instead of the data structure shown herein. In addition, SCT is described in a markup language such as XML. FIGS. 26 and 27 illustrate description examples of SCT.

(SAT Data Structure)

FIG. 28 is a view illustrating a data structure of SAT. According to elements and attributes illustrated in FIG. 28, "@" is given to the attributes. Indented elements and attributes are child elements contained in high-order parent elements.

As illustrated in FIG. 28, sat element contains service element. This service element contains service_id attribute. This service_id attribute designates an identifier of a service currently on the air. When a plurality of services on the air are present, a plurality of pieces of service_id corresponding to the respective services are given.

The data structure of SAT described with reference to FIG. 28 is presented only by way of example. Other data structures may be adopted instead of the data structure shown herein. In addition, SAT is described in a markup language such as XML. FIG. 29 illustrates description examples of SAT.

(RRT Data Structure)

FIG. 30 is a view illustrating a data structure of RRT. According to elements and attributes illustrated in FIG. 30, "@" is given to the attributes. Indented elements and attributes are child elements contained in high-order parent elements.

As illustrated in FIG. 30, rrt element contains rating_region attribute, name attribute, and dimension element. In the figure, rating_region attribute designates a rating region. In the figure, name attribute designates a name of a rating region.

In the figure, dimension element is a child element of rrt element, and contains name attribute, graduated_scale attribute, and rating_value element. In the figure, rating_value element contains abbrev_rating_value attribute, and rating_value. These elements and attributes indicate regional information concerning classification of programs.

The data structure of PRT described with reference to FIG. 30 is presented only by way of example. Other data structures may be adopted instead of the data structure shown herein.

<(2) Structure Details of SCS(SDP)

(Outline of SDP)

An outline of SDP is hereinafter described with reference to FIGS. 31 through 35.

Figure 31:
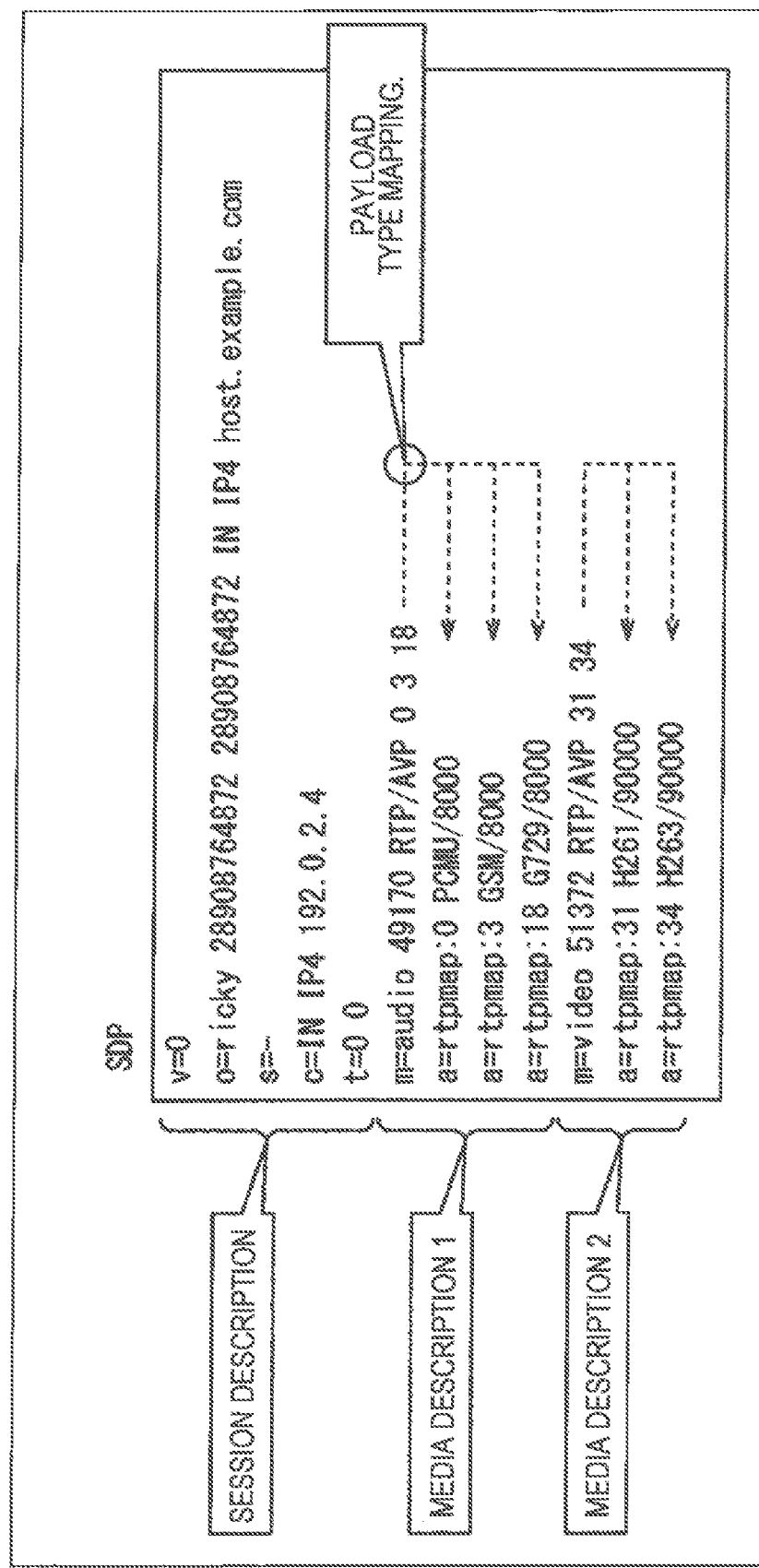
FIG. 31 is a view illustrating an example of SDP description document.

As illustrated in FIG. 31, SDP is described in text format. In this case, SDP description document is constituted by session description and media descriptions. Each of the media descriptions can describe a plurality of sets of media information transmitted by RTP session, such as audio data and video data. FIG. 32 defines data structures of the session description and the media description. FIG. 33 defines attribute types of media.

More specifically, concerning origin (o), connection data (c), media announcements (m) as typical examples, origin (o) designates user name (username), session ID (sess-id), session version (sess-version), network type (nettype), address type (addrtype), unicast address (unicast-address), and other information as illustrated in FIG. 34.

On the other hand, connection data (c) designates network type (nettype), address type (addrtype), connection address (connection-address), and other information as illustrated in FIG. 34. Furthermore, media announcements (m) designates media type (media), port number (port), protocol (proto), format (fmt), and other information.

More specifically, the SDP description document illustrated in FIG. 31 designates protocol version as "0", origin (o) as "ricky 28908764872 28908764872 IN IP4 host.example.com", connection data (c) as "IN IP4 192.0.2.4", and timing (t) as "0 0" in the session description.

Figure 35:
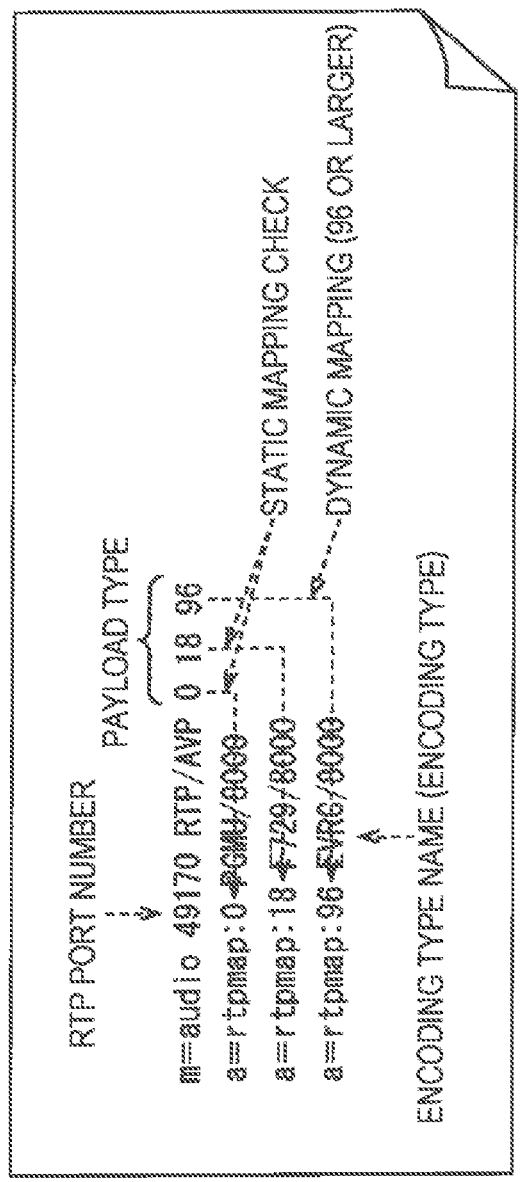
FIG. 35 is a view illustrating a dynamic mapping of codec parameters.

In the SDP description document illustrated in FIG. 31, media announcements (m) designates "audio 49170 RTP/AVP 0 3 18" in the first media description. As illustrated in FIG. 33, a row starting with "a=" indicates an attribute of a corresponding medium. More specifically, each row of "a=rtpmap" maps an encoding type to a payload type of a row of "m-audio" as illustrated in FIG. 35. Similarly, each row of "a=rtpmap" in the second media description of the SDP description document illustrated in FIG. 31 maps an encoding type to a payload.

SDP Description Example

Hereinafter described are SDP description examples with reference to FIGS. 36 through 38.

Figure 36:
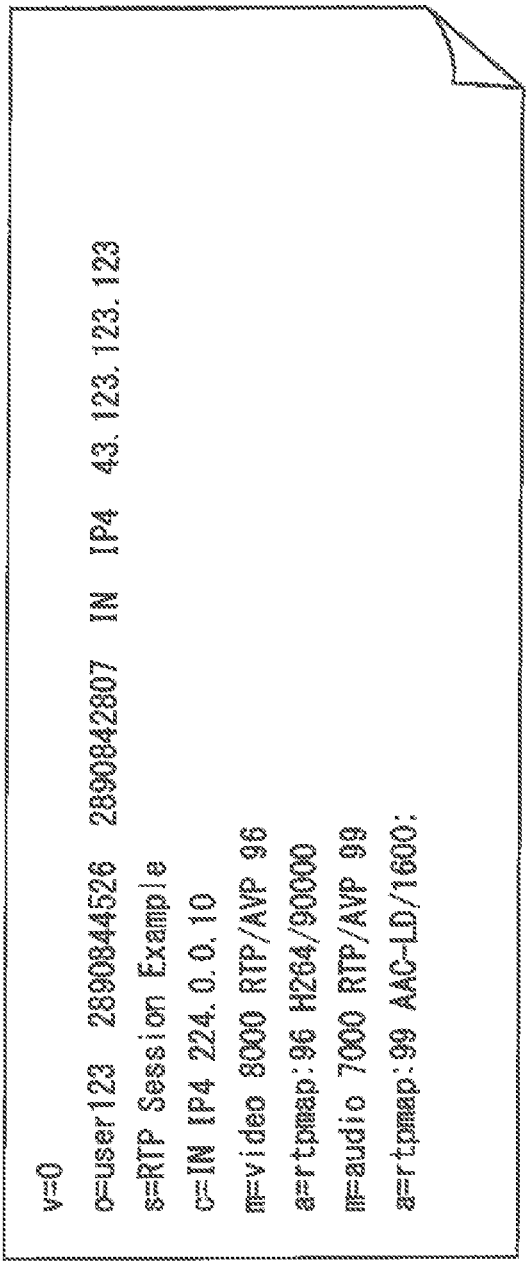
FIG. 36 is a view illustrating a description example of SDP.

FIG. 36 illustrates a description example of SDP in a service including video data and audio data each constituted by one stream and transmitted by RTP session. More specifically, according to the description example illustrated in FIG. 36, an "m=video" row indicates that a port number of video data transmitted by RTP session is 8000. Moreover, "a=rtpmap" in a subsequent row maps an encoding type to a payload type, and indicates a state that video data is encoded by H.264. In this case, the time scale of RTP time stamp is 90000 in the video data.

According to the description example illustrated in FIG. 36, an "m-audio" row indicates that a port number of audio data transmitted by RTP session is 7000. Moreover, "a-rtpmap" in a subsequent row maps an encoding type to a payload type, and indicates a state that audio data is encoded by AAC-LD (Advanced Audio Codec Low Delay). In this case, the time scale of RTP time stamp is 1600 in the audio data.

FIG. 37 illustrates another description example of SDP in RTP session. FIG. 38 illustrates a description example of SDP in FLUTE session.

3. Specific Operation Examples

Specific operation examples of the receiving device according to the present technology are hereinafter described. In these operation examples, transmission by the FLUTE transmission method is chiefly discussed as an example of the IP transmission method, and transmission by the UDP transmission method is finally touched upon. The operation examples are described in the following order.

(1) Basic Operation
(1-1) Scan
(1-2) Channel Selection
(1-3) Recording (2) NRT Service Handling
(2-1) NRT-ESG Acquisition
(2-2) NRT Content Acquisition and Reproduction
(2-3) NRT Content Acquisition and Display
(3) Hybrid Service Handling
(3-1) Application Acquisition and Display
(4) UDP Transmission Method
<(1) Basic Operation>

A basic operation of the receiving device 20 is hereinafter described with reference to FIGS. 39 through 54. Signaling in the basic operation of the FLUTE transmission method is similar to the signaling discussed above with reference to FIG. 11.

(1-1) Scan
(1-11) Initial Scan

Figure 39:
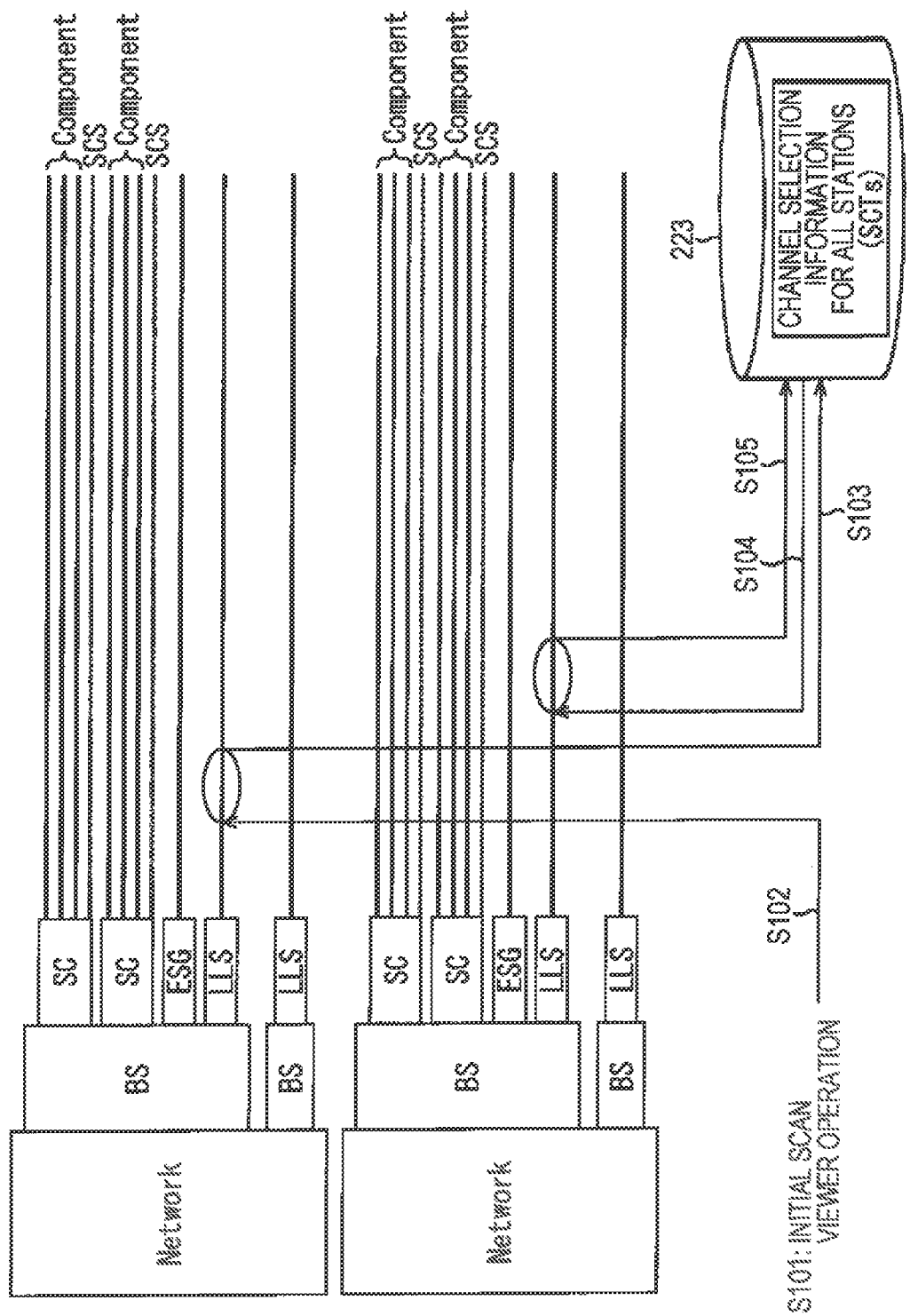
FIG. 39 is a view illustrating an initial scan process.
Figure 40:
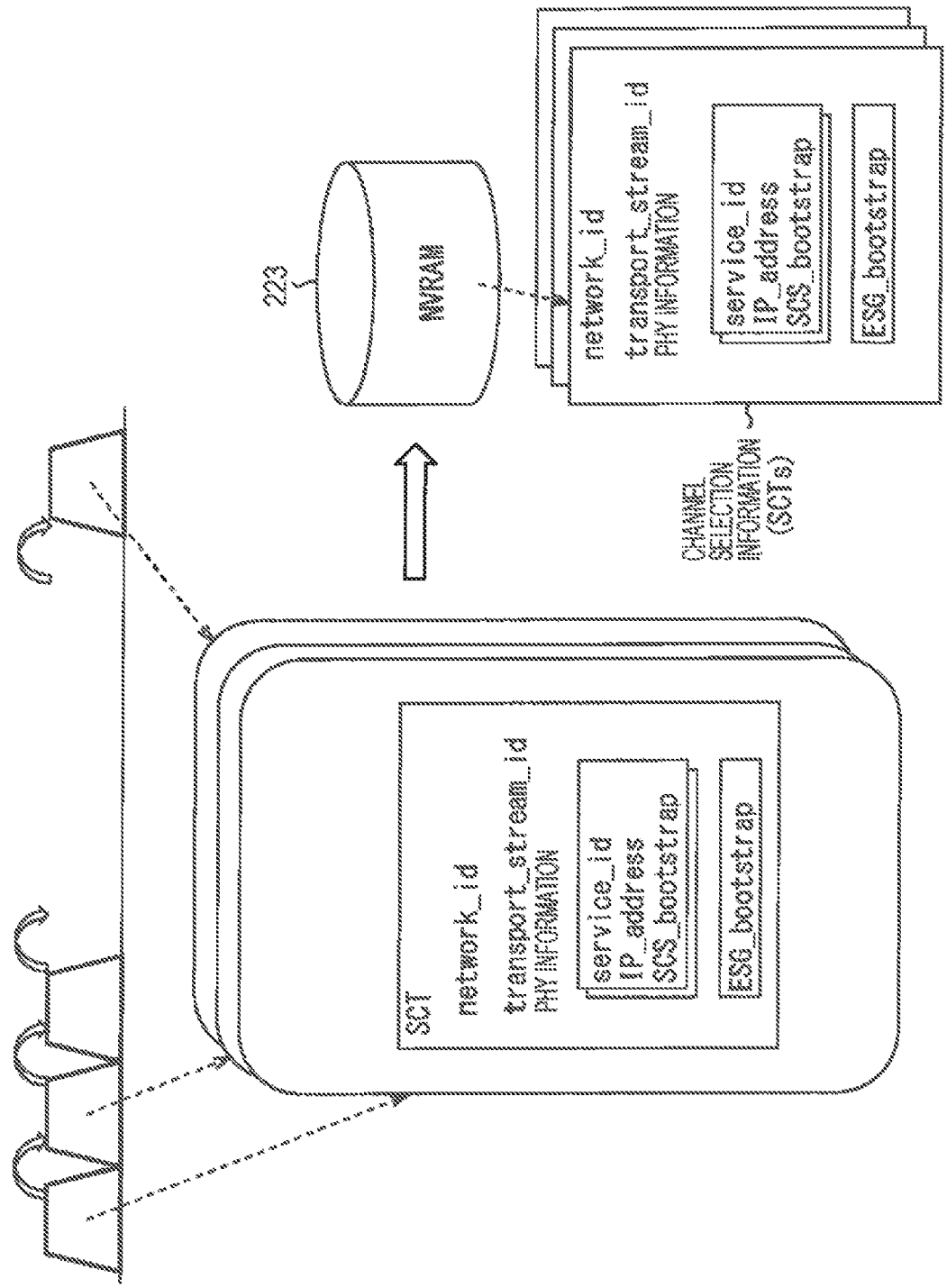
FIG. 40 is a view illustrating a flow of information acquired at the time of initial scan.
Figure 41:
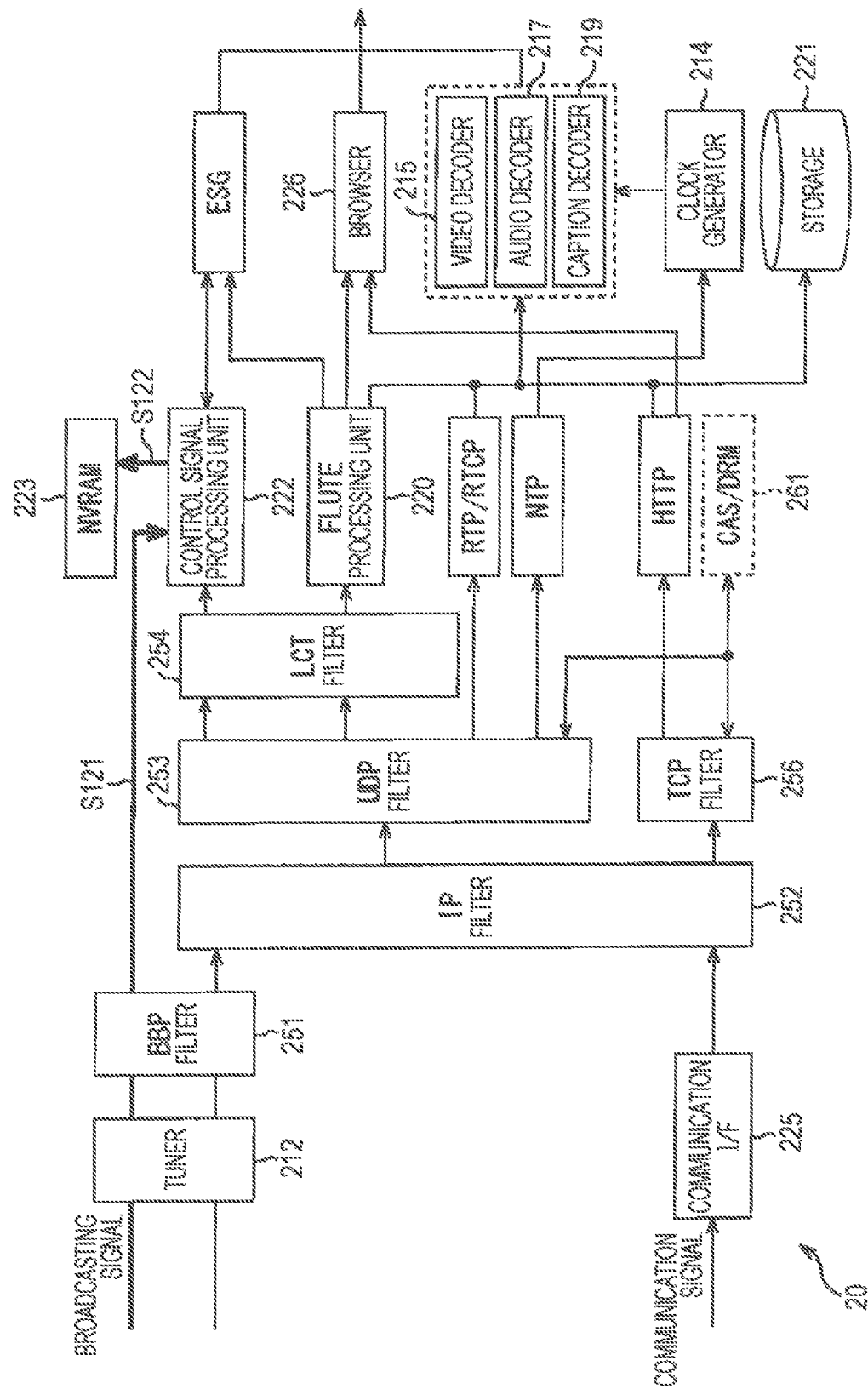
FIG. 41 is a view illustrating operation of the receiving device at the time of initial scan.

Discussed hereinbelow with reference to FIGS. 39 through 41 is an initial scan process performed when the receiving device 20 is initially started for setting a receivable channel, for example.

FIG. 39 is a view illustrating the initial scan process.

When the receiving device 20 detects an initial scan start instruction based on operation by a viewer as illustrated in FIG. 39 (S101), for example, the receiving device 20 acquires SCT transmitted as LLS in a predetermined transmission cycle (S102), and records the SCT in the NVRAM 223 as channel selection information (S103). This scan process is repeated for each broadcasting network to record channel selection information for all stations (SCTs) in the NVRAM 223 (S104, S105). Accordingly, in a state that entire information about a particular broadcasting network has been transmitted by each SCT, only LLS (SCT) in a default BBP stream (BS) needs to be acquired for each broadcasting network.

More specifically, SCT contains a transport stream (BBP stream) configuration and a service configuration within the broadcasting network as illustrated in FIG. 40. These configurations are identified based on a triplet. The SCT indicates a setting of an IP address of a corresponding transport stream. Accordingly, in the structure determining a common IP address for respective services, the SCT acquired as channel selection information designates an IP address corresponding to each service_id. While not all elements are described in the example illustrated in FIG. 40, information about a physical layer, ESG_bootstrap information, SCS_bootstrap information in units of service, and other information are contained in the SCT.

As described above, the initial scan process for acquiring SCT in units of broadcasting network achieves acquisition of channel selection information for all of the stations, and records the acquired information in the NVRAM 223.

FIG. 41 is a view illustrating operation of the receiving device 20 at the time of the initial scan.

As illustrated in FIG. 41, the tuner 212 of the receiving device 20 at the time of the initial scan extracts and demodulates broadcasting signals of a first channel, and supplies data thus obtained to the BBP filter 251 (S121). The BBP filter 251 and the SGDU filter bank 255 (not shown) perform filtering to extract SCT from the data in the tuner 212, and supply the extracted SCT to the control signal processing unit 222 as channel selection information (S121). The control signal processing unit 222 records the channel selection information (SCT) in the NVRAM 223 (S122).

As a result, the SCT (channel selection information) of the first broadcasting network is recorded in the NVRAM 223. The processes in S121 through S122 in FIG. 41 are repeated to sequentially record channel selection information acquired from the second through Nth (N:1 or larger integer) broadcasting networks in the NVRAM 223, and store channel selection information (SCTs) for all receivable stations.

A TCP filter 256 illustrated in FIG. 41 is a filter for Transmission Control Protocol (TCP). A CAS/DRM 261 performs processing associated with copyright of content.

(1-12) ESG Acquisition

Figure 42:
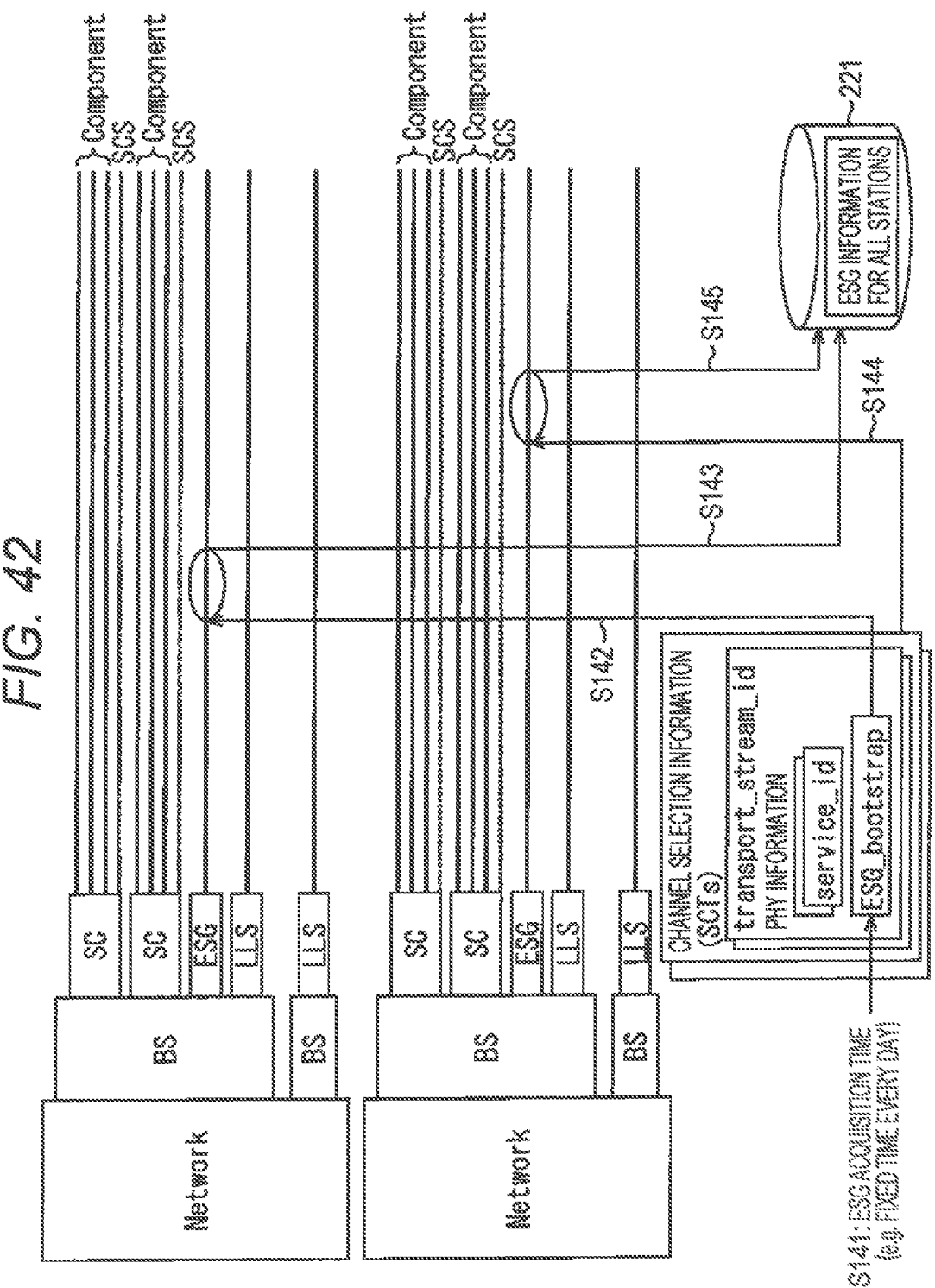
FIG. 42 is a view illustrating an ESG acquisition process.
Figure 43:
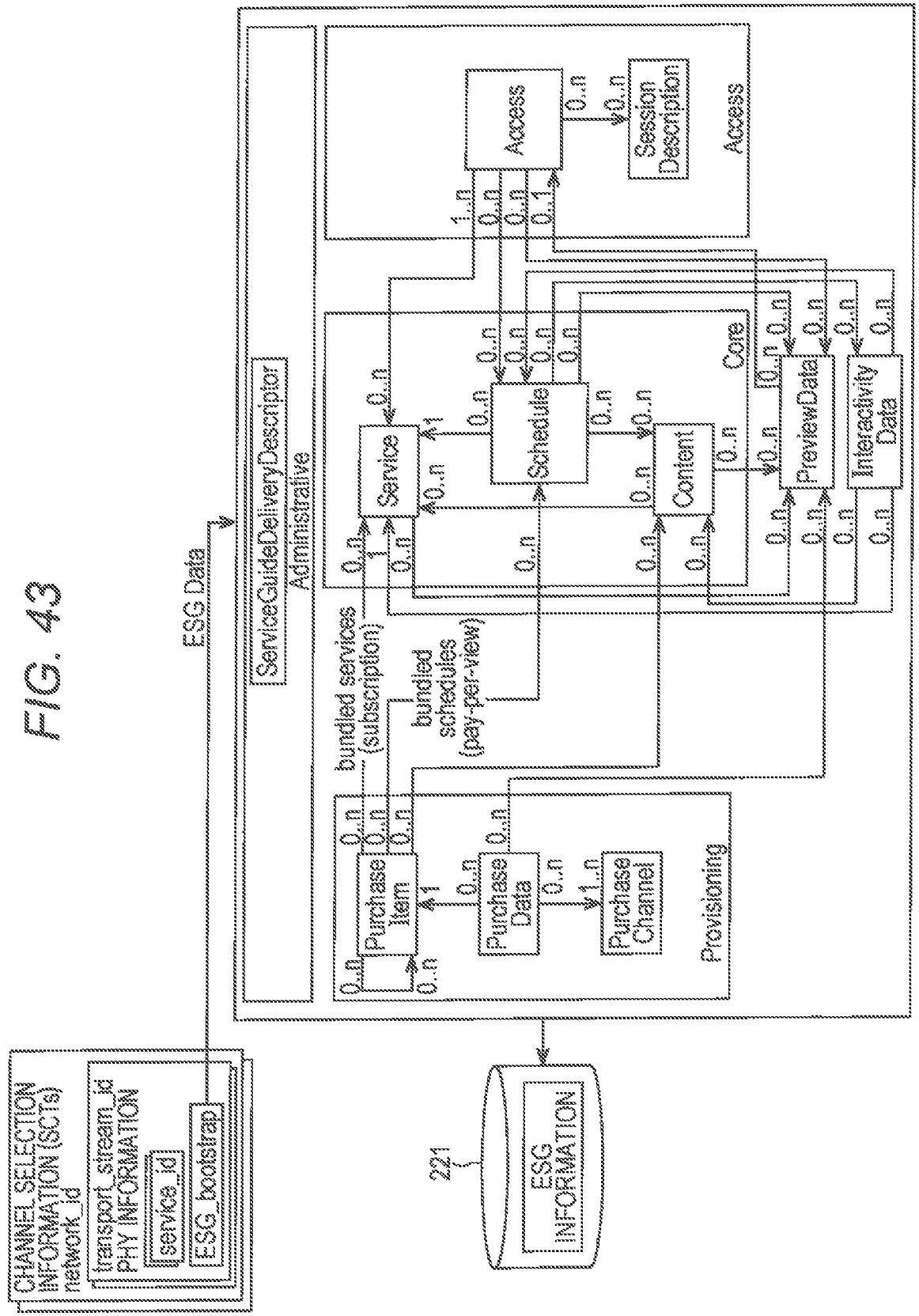
FIG. 43 is a view illustrating a flow of information acquired at the time of ESG acquisition.
Figure 44:
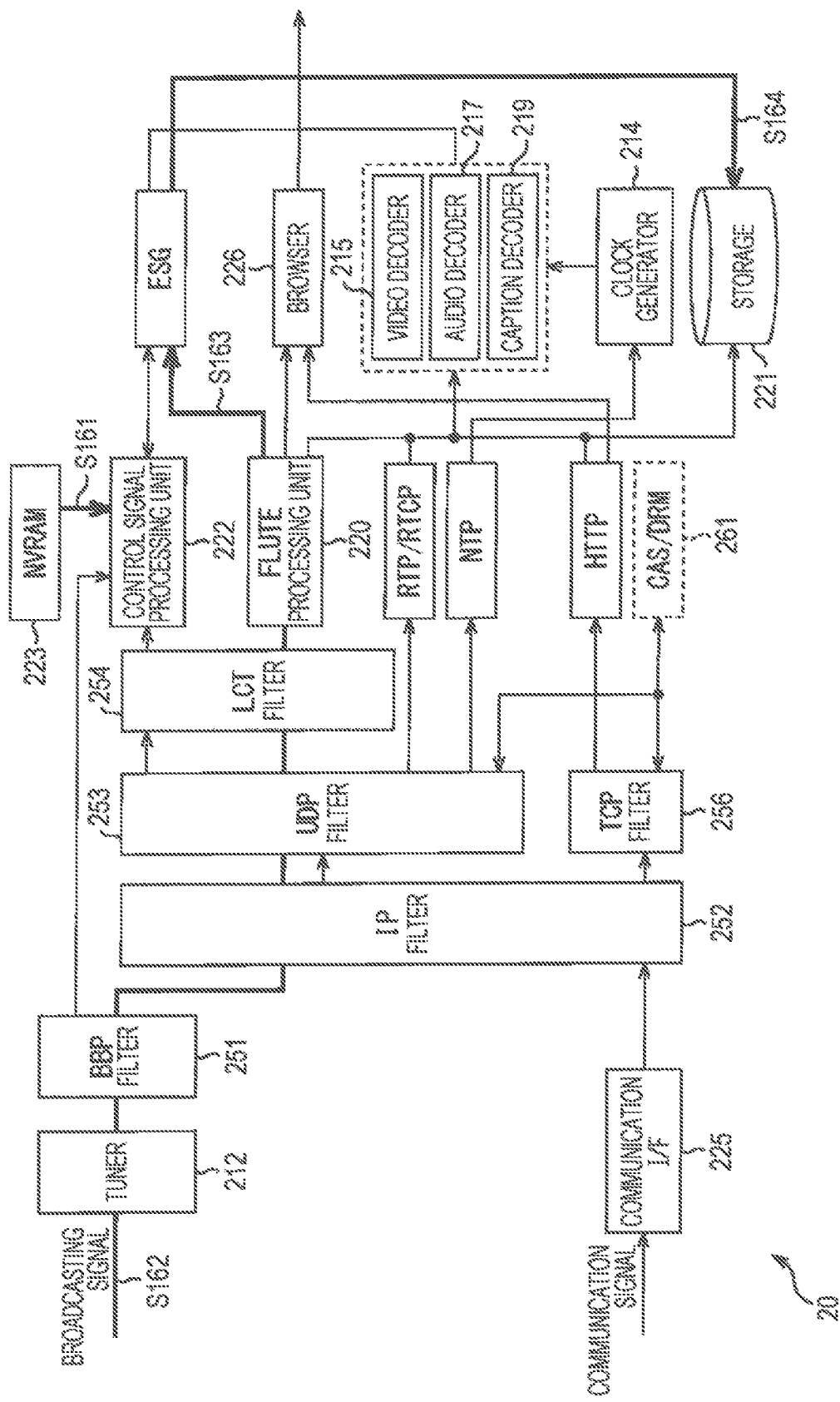
FIG. 44 is a view illustrating operation of the receiving device at the time of ESG acquisition.

Discussed hereinbelow with reference to FIGS. 42 through 44 is an ESG acquisition process performed when power of the receiving device 20 is turned off to acquire ESG (electronic service guide), for example.

FIG. 42 is a view illustrating the ESG acquisition process.

As illustrated in FIG. 42, the receiving device 20 reads selection channel information (SCT) recorded in the NVRAM 223 when a fixed ESG acquisition time passes every day, for example (S141). The channel selection information contains ESG_bootstrap information, wherefore ESG information is acquired by accessing ESG session in FLUTE session based on the ESG_bootstrap information, and recorded in the storage 221 (S142, S143). This ESG acquisition process is repeated for each broadcasting network to record ESG information for all of the stations in the storage 221 (S144, S145). Accordingly, in a state that each ESG contains entire information about a particular broadcasting network, only ESG in a default BBP stream (BS) needs to be acquired for each broadcasting network.

According to FLUTE session, a particular file is designated based on two types of identification information of Transport Session Identifier (TSI) and Transport Object Identifier (TOI). In this case, FDT cyclically transmitted can be acquired based on TSI contained in ESG_bootstrap information. More specifically, File Delivery Table (FDT) transmitted for each TSI as a file in a state of TOI=0 describes index information for each TSI. Accordingly, ESG information constituted by Service, Schedule, Content, Access and others is generated based on a file transmitted by ESG session with reference to index information in FDT, and can be recorded in the storage 221 as illustrated in FIG. 43.

FIG. 44 is a view illustrating operation of the receiving device 20 at the time of ESG acquisition.

As illustrated in FIG. 44, the control signal processing unit 222 of the receiving device 20 at the time of ESG acquisition reads channel selection information (SCT) recorded in the NVRAM 223, and acquires TSI and the like contained in ESG_bootstrap information as ESG session information (S161). The FLUTE processing unit 220 acquires FDT based on the ESG session information received from the control signal processing unit 222, and acquires a file transmitted by ESG session with reference to index information contained in the FDT (S162). The FLUTE processing unit 220 generates ESG information from the file transmitted by ESG session (S163), and records the ESG information in the storage 221 (S164).

As a result, the ESG information for the first broadcasting network is recorded in the storage 221. Similarly, the processes in S161 through S164 in FIG. 44 are repeated to store ESG information for all of the designatable stations based on channel selection information (SCT) recorded in the NVRAM 223.

(1-2) Channel Selection
(1-21) Direct Channel Selection

Figure 45:
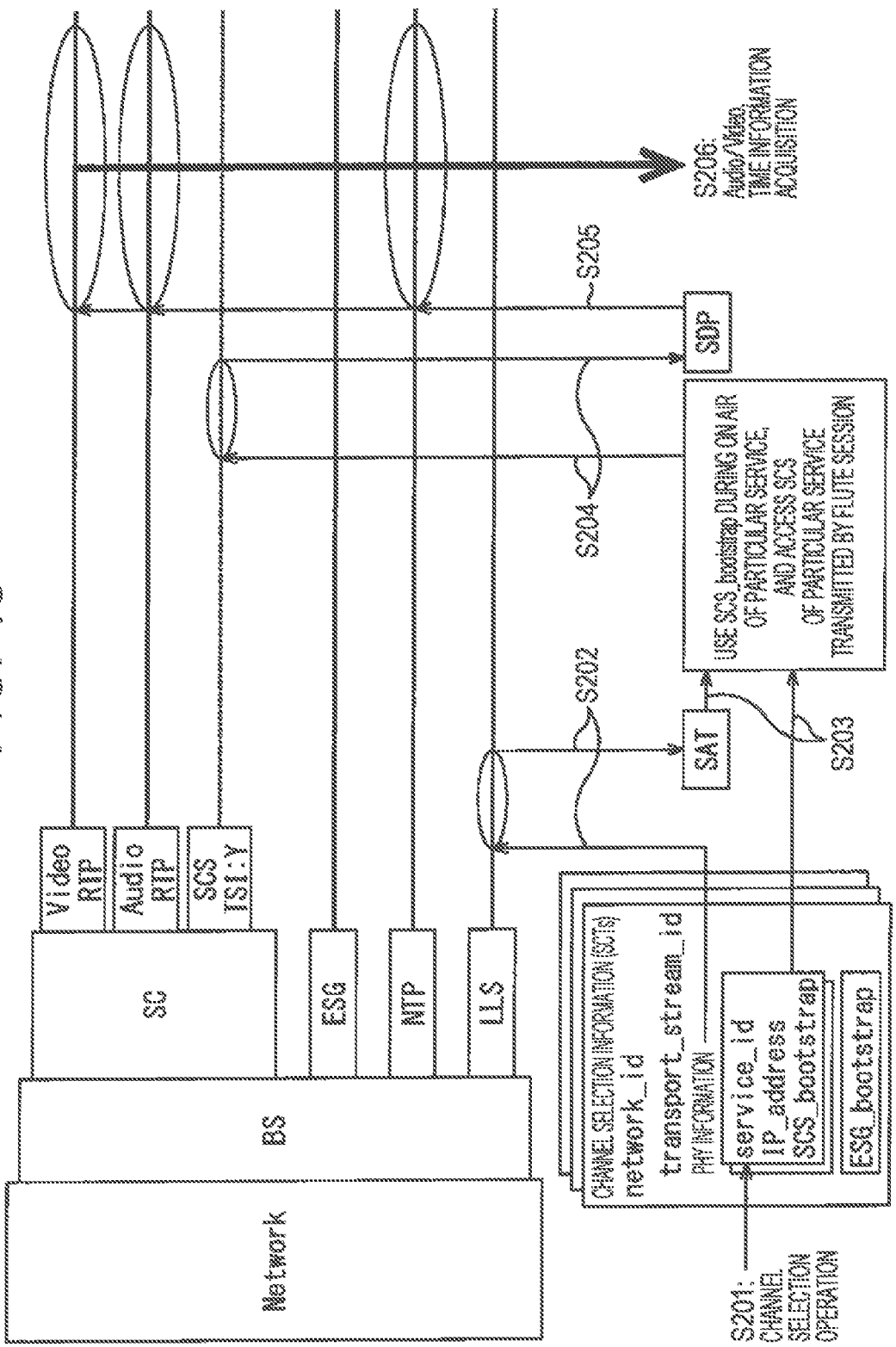
FIG. 45 is a view illustrating a direct channel selection process.
Figure 46:
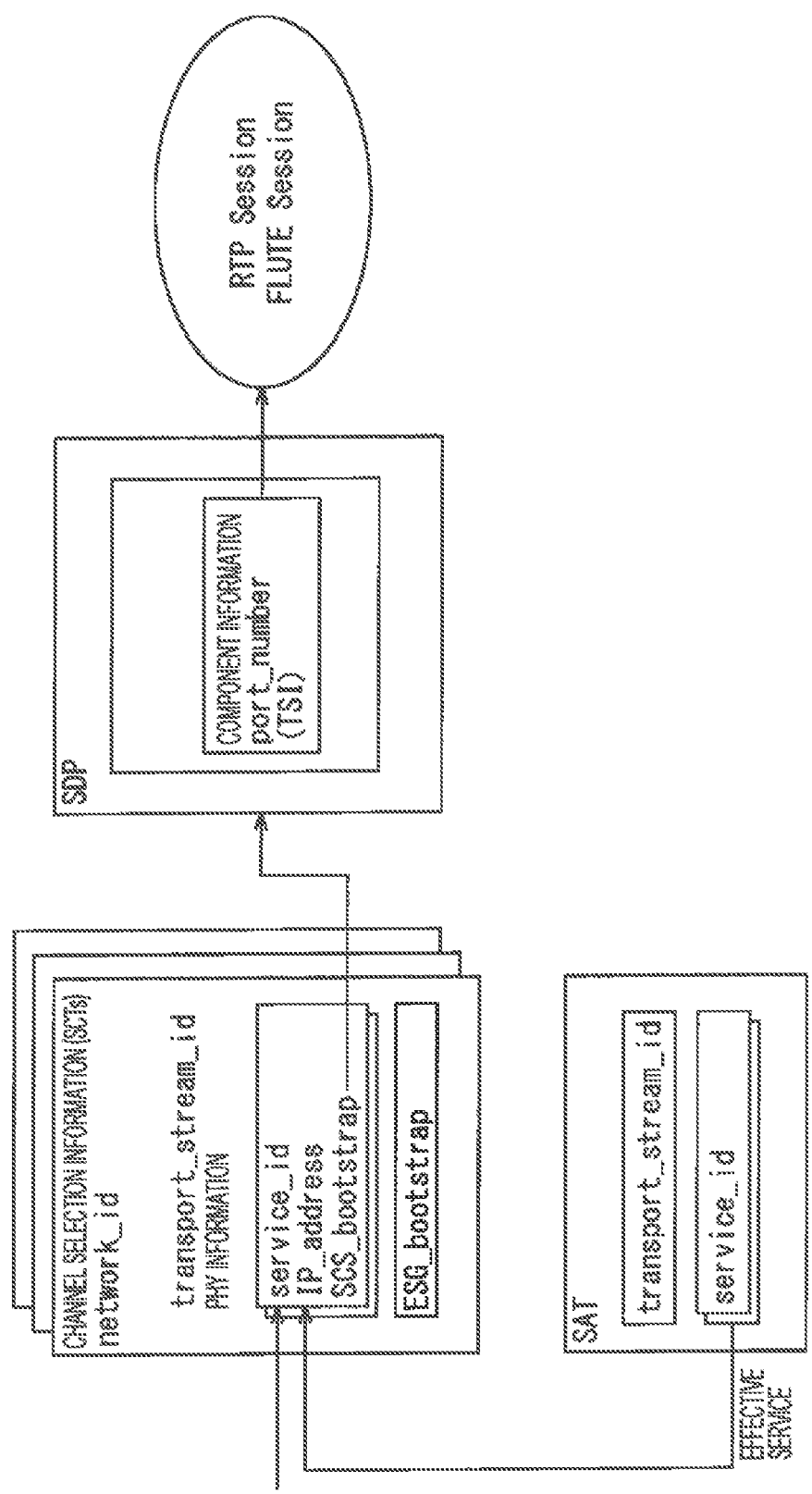
FIG. 46 is a view illustrating a flow of information acquired at the time of direct channel selection.
Figure 47:
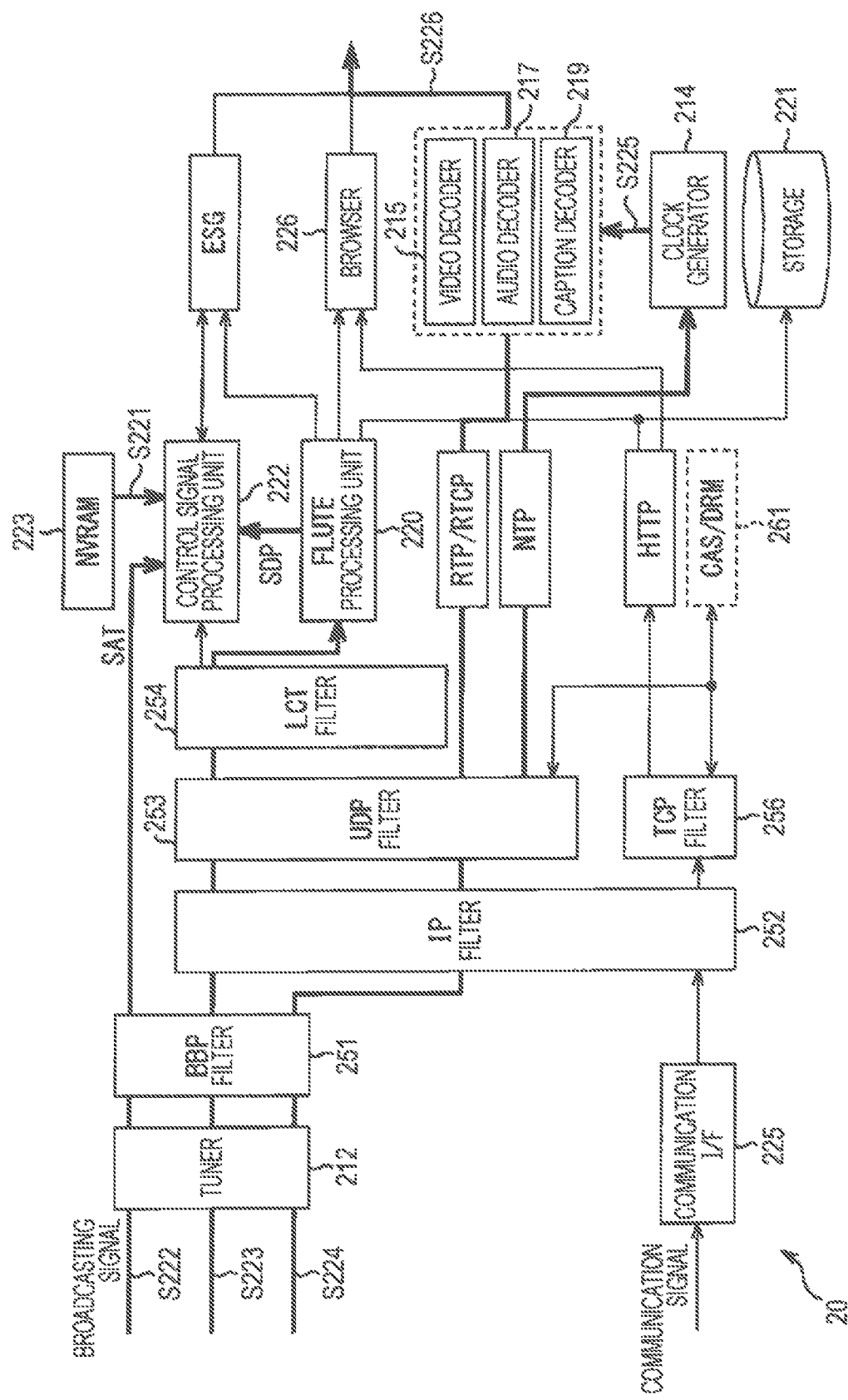
FIG. 47 is a view illustrating operation of the receiving device at the time of direct channel selection.

Discussed hereinbelow with reference to FIGS. 45 through 47 is a direct channel selection process performed when a particular channel (service) is directly selected based on operation of a remote controller by a viewer.

FIG. 45 is a view illustrating the direct channel selection process.

When the receiving device 20 detects channel selection operation input by the viewer, the receiving device 20 reads channel selection information (SCT) recorded in the NVRAM 223 as illustrated in FIG. 45 (S201). The receiving device 20 further acquires SAT transmitted as LLS in a predetermined transmission cycle (S202). Then, the receiving device 20 compares service_id of the particular service selected by the viewer and service_id contained in the SAT to determine whether or not a particular service is currently on the air (S203).

When the particular service is on the air, the receiving device 20 acquires SDP by accessing SDP of the particular service transmitted by FLUTE session based on SCS_bootstrap information corresponding to service_id of the selected particular service contained in the channel selection information (SCT) (S204).

The SDP contains component attributes and configuration information such as port numbers and TSI of respective components. Accordingly, components of the particular service can be acquired from RTP session or FLUTE session by filtering based on the port numbers and TSI contained in the SDP. In addition, time information (NTP) common to a plurality of services can be acquired by filtering based on an IP address for NTP. According to the example illustrated in FIG. 45, video data and audio data are acquired as components from RTP session (S205, S206). The video data and audio data thus acquired are decoded in accordance with a clock signal corresponding to the NTP.

More specifically, service_id of the particular service selected based on operation of the remote controller or the like and service_id of the service contained in the SAT are compared as illustrated in FIG. 46. When the particular service is on the air, SDP transmitted by FLUTE session is acquired based on SCS_bootstrap information of the particular service. Then, components of the particular service are acquired from RTP session or FLUTE session based on component information contained in the SDP.

FIG. 47 is a view illustrating operation of the receiving device 20 at the time of direct channel selection.

As illustrated in FIG. 47, the control signal processing unit 222 of the receiving device 20 at the time of direct channel selection reads channel selection information (SCT) recorded in the NVRAM 223 (S221). The tuner 212 performs the channel selection process in accordance with the channel selection information under control by the control signal processing unit 222. The control signal processing unit 222 also acquires SAT extracted by filtering performed by the BBP filter 251 and the SGDU filter bank 255 (not shown) to determine whether or not a particular service selected by the viewer is currently on the air (S222).

When the particular service is on the air, the FLUTE processing unit 220 acquires SDP from FLUTE session in accordance with filtering performed by the IP filter 252 through the SGDU filter bank 255 based on an IP address, port numbers, TSI and the like (S223). Then, the control signal processing unit 222 acquires SDP from the FLUTE processing unit 220. According to the example illustrated in FIG. 47, components are transmitted by RTP session. Accordingly, the IP filter 252 and the UDP filter 253 perform filtering based on the IP address and the port numbers, and supply NTP, video data, and audio data to the clock generator 214, the video decoder 215, and the audio decoder 217, respectively (S224).

The clock generator 214 generates a clock signal based on the NTP received from the UDP filter 253, and supplies the clock signal to the video decoder 215 and the audio decoder 217 (S225). The video decoder 215 decodes video data received from the UDP filter 253 in accordance with the clock signal received from the clock generator 214, and supplies the decoded video data to the not-shown video output unit 216 (S226). The audio decoder 217 decodes the audio data received from the UDP filter 253 in accordance with the clock signal received from the clock generator 214, and supplies the decoded audio data to the not-shown audio output unit 218 (S226). As a result, images of a TV program corresponding to the particular service directly selected by the viewer are displayed on the display unit, while voices corresponding to the images are output from the speaker.

(1-22) ESG Channel Selection

Figure 48:
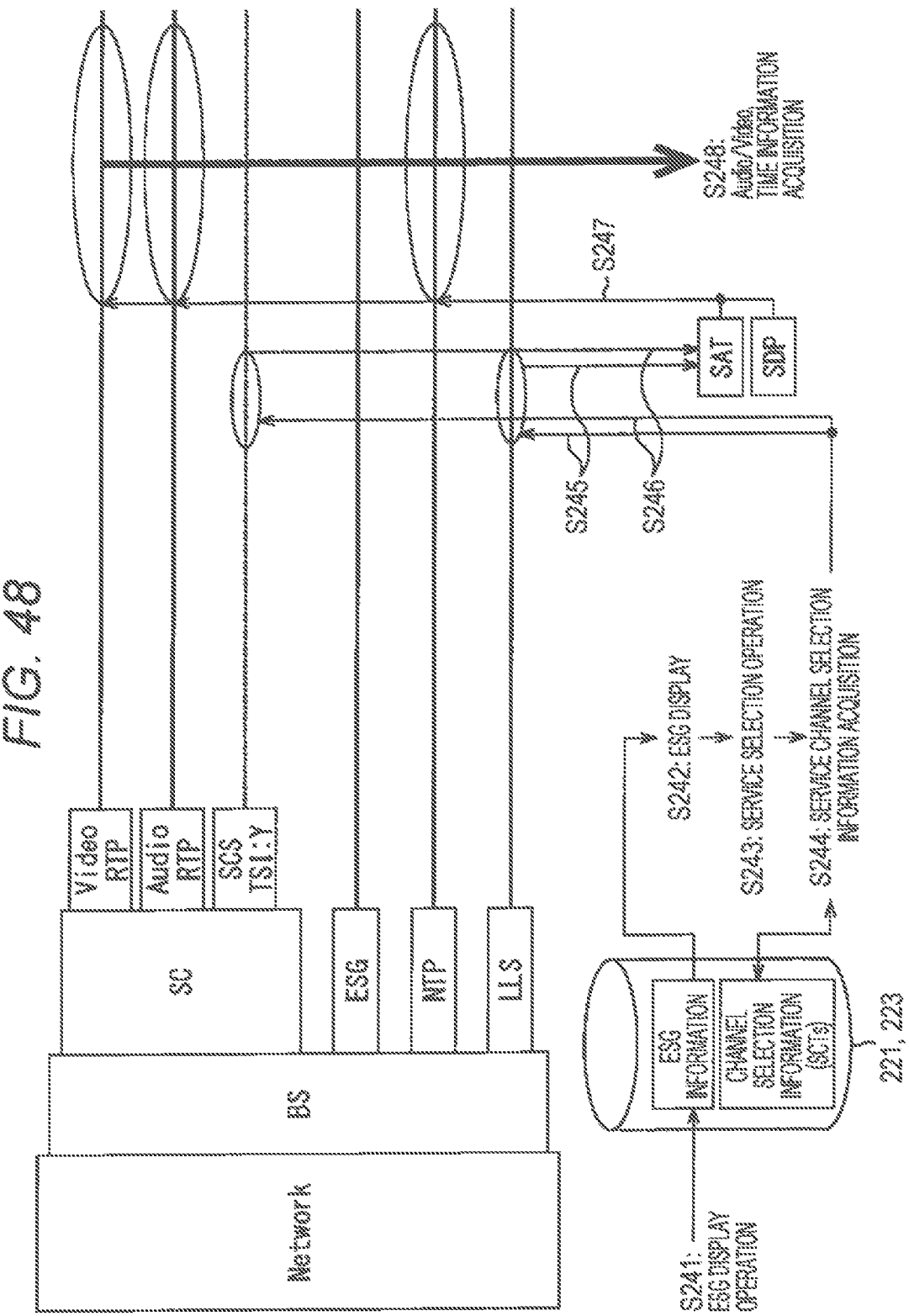
FIG. 48 is a view illustrating an ESG channel selection process.
Figure 49:
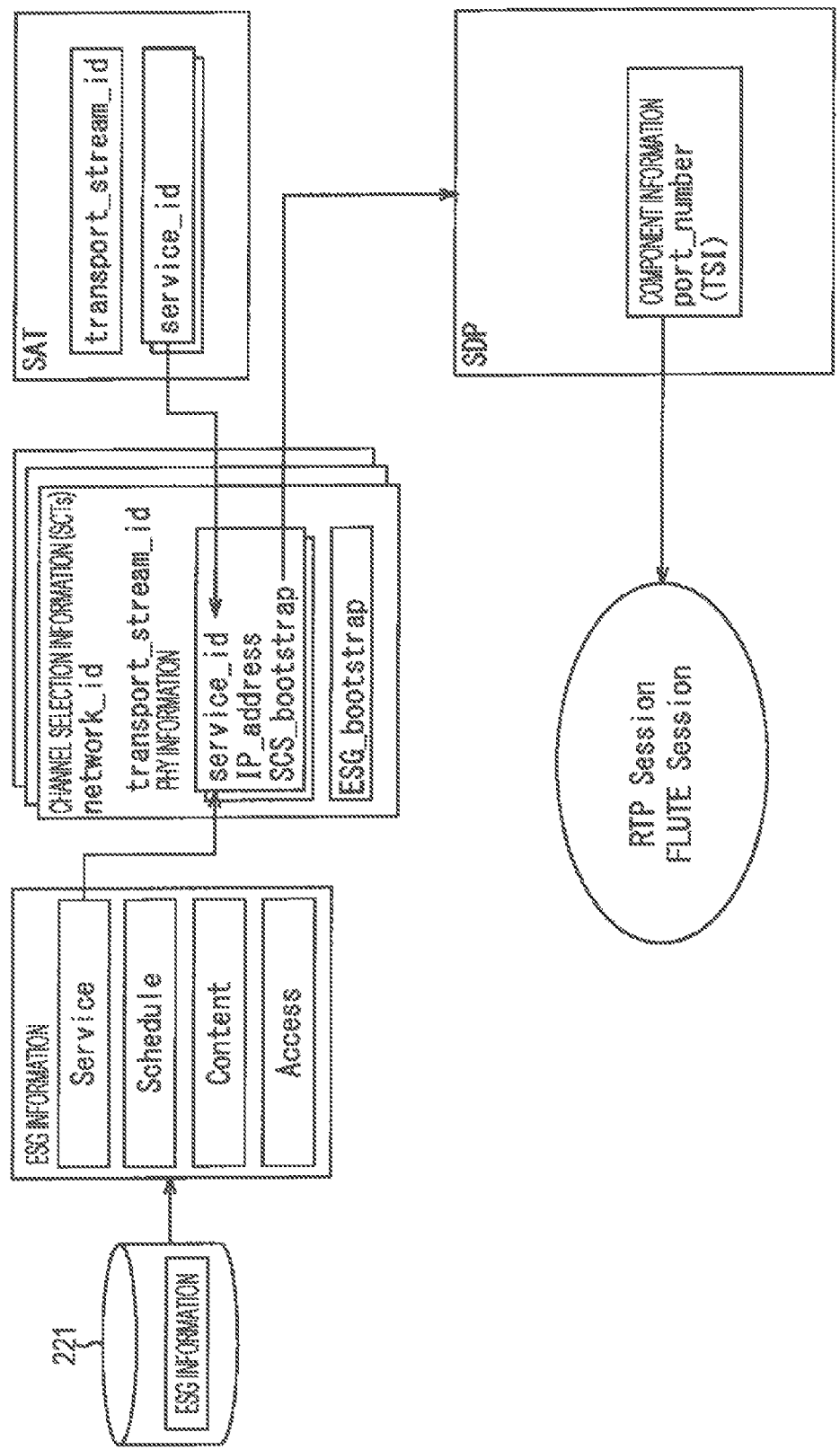
FIG. 49 is a view illustrating a flow of information acquired at the time of ESG channel selection.
Figure 50:
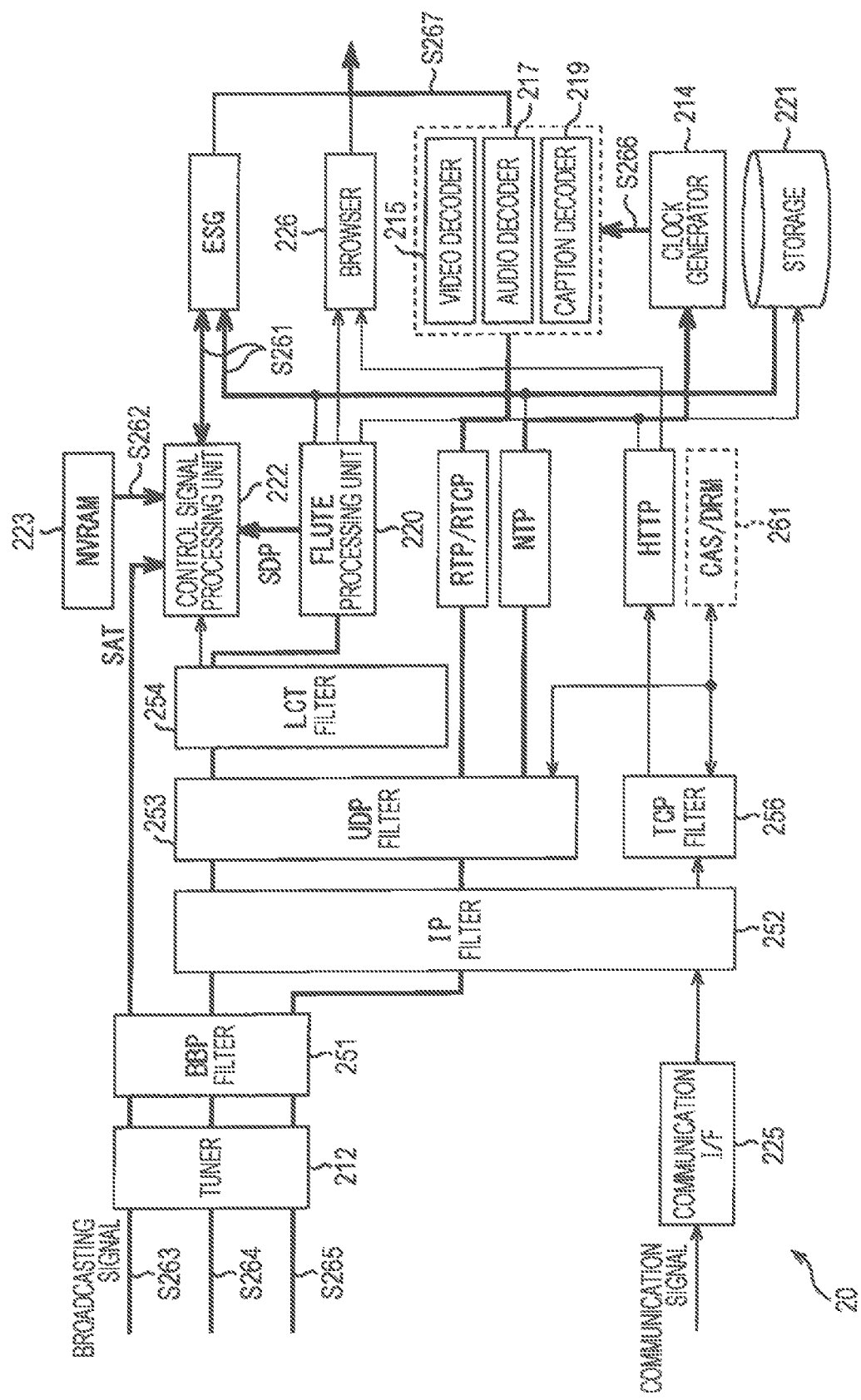
FIG. 50 is a view illustrating operation of the receiving device at the time of ESG channel selection.

Discussed hereinbelow with reference to FIGS. 48 through 50 is an ESG channel selection process performed when a particular service is selected from electronic service guide (ESG) based on operation of the remote controller by a viewer.

FIG. 48 is a view illustrating the ESG channel selection process.

When the receiving device 20 detects ESG display operation input by the viewer, the receiving device 20 reads ESG information from the storage 221 (S241), and displays the ESG information on the display unit (S242) as illustrated in FIG. 48. Then, the viewer selects a particular service for viewing from a service list displayed on the display unit. When the receiving device 20 detects selection operation input by the viewer for selecting a particular service (S243), the receiving device 20 reads channel selection information from the NVRAM 223, and performs the channel selection process (S244).

Similarly to the direct channel selection process discussed above, the receiving device 20 acquires SAT transmitted as LLS in a predetermined transmission cycle (S245). Then, the receiving device 20 compares service_id of the particular service selected by the viewer and service_id of the service contained in the SAT to determine whether or not the particular service is currently on the air. When the particular service is on the air, an IP address, port numbers, and TSI contained in SCS_bootstrap information are specified with reference to service_id of the selected service based on channel selection information (SCT). Then, SDP transmitted by FLUTE session is acquired by filtering based on the specified IP address and the like (S246).

The SDP contains component attributes and configuration information such as port numbers and TSI of respective components. Accordingly, components of the particular service can be acquired from RTP session or FLUTE session by filtering based on the port numbers, TSI and the like contained in the SDP. In addition, time information (NTP) or the like common to a plurality of services can be acquired by filtering based on an IP address for NTP or the like. According to the example illustrated in FIG. 48, video data and audio data are acquired as components from RTP session (S248). The video data and audio data thus acquired are decoded in accordance with a clock signal corresponding to the NTP.

More specifically, service_id of the particular service selected based on ESG information and service_id of the service contained in the SAT are compared as illustrated in FIG. 49. When the particular service is on the air, SDP of the particular service transmitted by FLUTE session is acquired based on SCS_bootstrap information about the particular service. Then, components of the particular service are acquired from RTP session or FLUTE session based on component information contained in the SDP.

FIG. 50 illustrates operation of the receiving device 20 at the time of ESG channel selection.

As illustrated in FIG. 50, the receiving device 20 at the time of ESG channel selection reads ESG information from the storage 221, and displays the ESG information on the display unit (S261). When the control signal processing unit 222 detects selection operation input by the viewer for selecting a particular service for ESG information, the control signal processing unit 222 reads channel selection information (SCT) recorded in the NVRAM 223 (S262). The tuner 212 performs the channel selection process in accordance with the channel selection information under control by the control signal processing unit 222. The control signal processing unit 222 also acquires SAT extracted by filtering performed by the BBP filter 251 and the SGDU filter bank 255 (not shown) to determine whether or not the particular service selected by the viewer is currently on the air (S263).

When the particular service is on the air, the FLUTE processing unit 220 acquires SDP from FLUTE session by filtering performed by the IP filter 252 through the SGDU filter bank 255 based on an IP address, port numbers, TSI and the like (S264). Then, the control signal processing unit 222 acquires SDP from the FLUTE processing unit 220. According to the example illustrated in FIG. 50, components are transmitted by RTP session. Accordingly, the IP filter 252 and the UDP filter 253 perform filtering based on the IP address and the port numbers, and supply NTP, video data, and audio data to the clock generator 214, the video decoder 215, and the audio decoder 217, respectively (S265).

The clock generator 214 generates a clock signal based on the NTP received from the UDP filter 253, and supplies the clock signal to the video decoder 215 and the audio decoder 217 (S266). The video decoder 215 decodes video data received from the UDP filter 253 in accordance with the clock signal received from the clock generator 214, and supplies the decoded video data to the not-shown video output unit 216 (S267). The audio decoder 217 decodes the audio data received from the UDP filter 253 in accordance with the clock signal received from the clock generator 214, and supplies the decoded audio data to the not-shown audio output unit 218 (S267). As a result, images of a TV program corresponding to the particular service selected by the viewer from a service list of the electronic service guide are displayed on the display unit, while voices corresponding to the images are output from the speaker.

(1-3) Recording (1-31) ESG Recording Reservation and Execution

Figure 51:
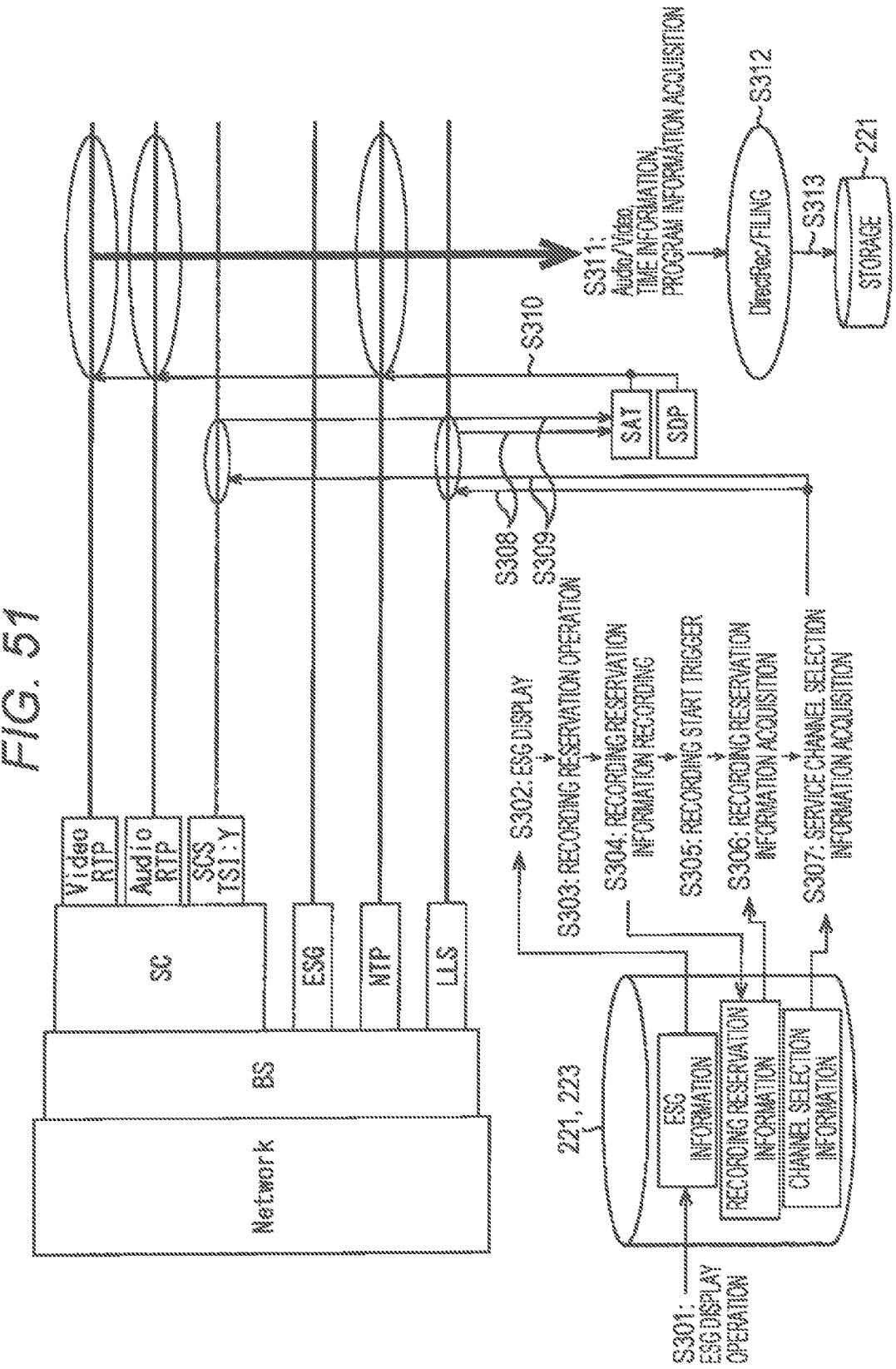
FIG. 51 is a view illustrating an ESG recording reservation and execution process.
Figure 52:
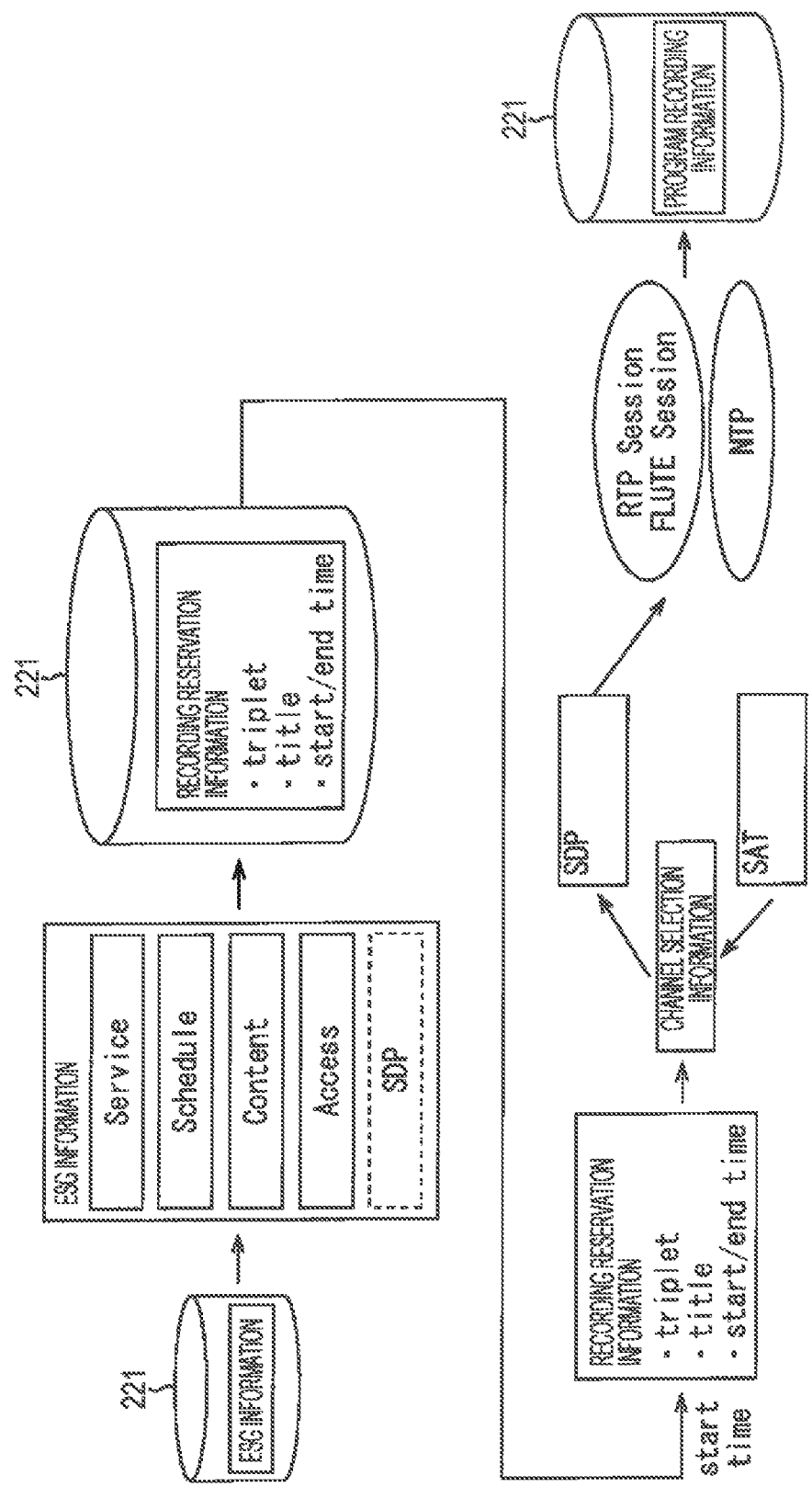
FIG. 52 is a view illustrating a flow of information acquired at the time of ESG recording reservation and execution.
Figure 53:
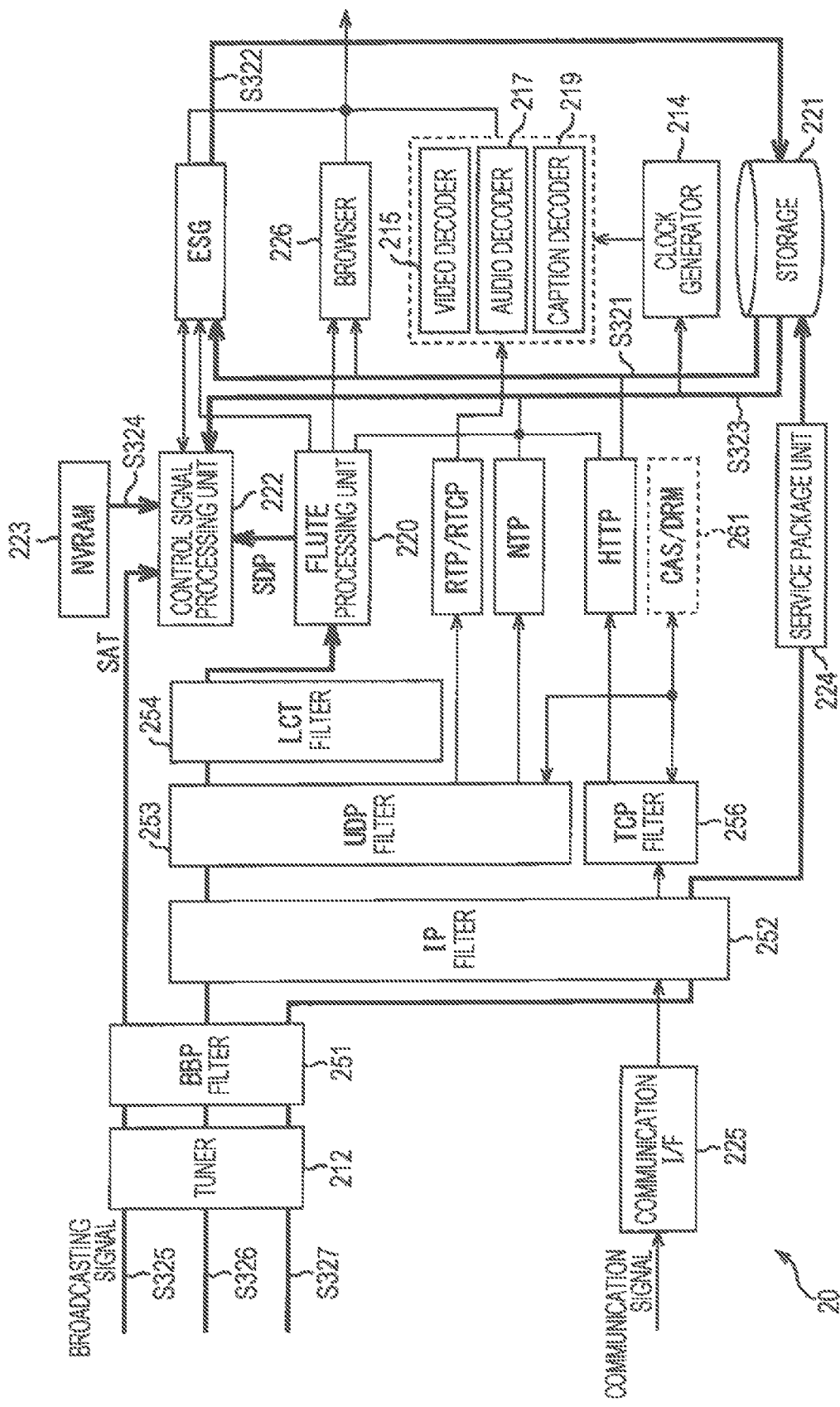
FIG. 53 is a view illustrating operation of the receiving device at the time of ESG recording reservation and execution.

Discussed hereinbelow with reference to FIGS. 51 through 53 is an ESG recording reservation and execution process performed when recording reservation of a particular service is executed based on electronic service guide (ESG) by operation of the remote controller or the like by a viewer.

FIG. 51 is a view illustrating the ESG recording reservation and execution process.

When the receiving device 20 detects display operation input by the viewer for displaying an electronic service guide, the receiving device reads ESG information from the storage 221 (S301), and displays a service list (ESG information) for the electronic service guide on the display unit (S302) as illustrated in FIG. 51. Then, the viewer selects a particular service for recording reservation from the service list displayed on the display unit. When the receiving device 20 detects selection operation input by the viewer for selecting a particular service, the receiving device 20 records recording reservation information corresponding to the selection operation in the storage 221 (S303, S304).

Then, the receiving device 20 is notified about a recording start trigger immediately before a start time of recording reservation of the particular service (S305). The receiving device 20 reads recording reservation information and channel selection information about the particular service from the storage 221 and the NVRAM 223 in response to the recording start trigger, and performs the channel selection process (S306, S307).

Similarly to the direct channel selection process and other processes discussed above, the receiving device 20 acquires SAT transmitted as LLS in a predetermined transmission cycle (S308). Then, service_id of the particular service reserved by the viewer for recording and service_id of the service contained in the SAT are compared to determine whether or not the particular service is on the air. When the particular service is on the air, an IP address, port numbers, and TSI contained in SCS_bootstrap information are specified with reference to service_id of the selected service based on the channel selection information (SCT). Accordingly, SDP transmitted by FLUTE session is acquired by filtering based on the specified IP address, port numbers, and TSI (S309).

The SDP contains component attributes and configuration information such as port numbers and TSI of respective components. Accordingly, components of the particular service can be acquired from RTP session or FLUTE session by filtering based on the port numbers, TSI and the like contained in the SDP (S310, S311). In addition, time information (NTP) common to a plurality of services can be acquired by filtering based on an IP address for NTP. The components, control signals (SDP), time information (NTP) and other information thus acquired are packaged in units of service, and recorded in the storage 221 as program recording information corresponding to the particular service (S312, S313). However, the program recording information may be recorded in the storage 221 as it is, or may be recorded after filing.

More specifically, when the particular service is selected from the ESG information, a triplet, a title of the recording program, recording start time (start time), recording end time (end time) and the like of the service are recorded in the storage 221 as recording reservation information as illustrated in FIG. 52. At the recording start time, the recording reservation information and the channel selection information (SCT) about the particular service are acquired, and the channel selection process is initiated. In addition, SAT transmitted as LLS in the predetermined transmission cycle is acquired to determine whether or not the particular service is on the air. When the particular service is on the air, SDP transmitted by FLUTE session is acquired based on SCS_bootstrap information about the particular service.

Moreover, components of the particular service can be acquired from RTP session by filtering based on the IP address. In this example, video data and audio data are acquired as components. Furthermore, NTP is acquired by filtering based on an IP address for NTP specified in accordance with the channel selection information. The components (audio/video), time information (NTP), control signals (SCS (SDP)) and the like acquired by filtering based on the IP address are packaged in units of service, and recorded in the storage 221 as program recording information corresponding to the particular service.

FIG. 53 is a view illustrating operation of the receiving device 20 at the time of ESG recording reservation and execution.

As illustrated in FIG. 53, the receiving device 20 at the time of ESG recording reservation and execution reads ESG information from the storage 221, and displays a service list of an electronic service guide on the display unit (S321). When a particular service is selected by the viewer from the service list displayed on the display unit, the receiving device 20 records recording reservation information corresponding to the selection operation in the storage 221 (S322).

When the control signal processing unit 222 is notified about a recording start trigger in a subsequent step, the control signal processing unit 222 reads recording reservation information and channel selection information about the particular service from the storage 221 and the NVRAM 223 (S323, S324). Then, the tuner 212 performs the channel selection process in accordance with the recording reservation information and the channel selection information about the particular service under control by the control signal processing unit 222. The control signal processing unit 222 also acquires SAT extracted by filtering performed by the BBP filter 251 and the SGDU filter bank 255 (not shown) to determine whether or not the particular service selected by the viewer is on the air (S325).

When the particular service is on the air, the FLUTE processing unit 220 acquires SDP from FLUTE session by filtering performed by the IP filter 252 and the SGDU filter bank 255 based on an IP address, port numbers, TSI and the like (S326). Then, the control signal processing unit 222 acquires SDP from the FLUTE processing unit 220.

Moreover, components (audio/video), time information (NTP), and control signals (SCS (SDP)) of the particular service are extracted by filtering performed by the IP filter 252 based on the IP address, and supplied to the service package unit 224. Then, the service package unit 224 packages the components, time information, and control signals received from the IP filter 252 in units of service, and records the packaged components and the like in the storage 221 as program recording information corresponding to the particular service (S327).

Accordingly, the ESG recording reservation and execution process can extract components constituting a particular service reserved by the viewer for recording, and information such as control signals by filtering based on an IP address, and package these components and information in units of service.

(1-32) Recorded Program Reproduction

Described hereinbelow is a recorded program reproduction process performed when program recording information recorded in the storage 221 by the ESG recording reservation and execution process discussed above is reproduced.

Figure 54:
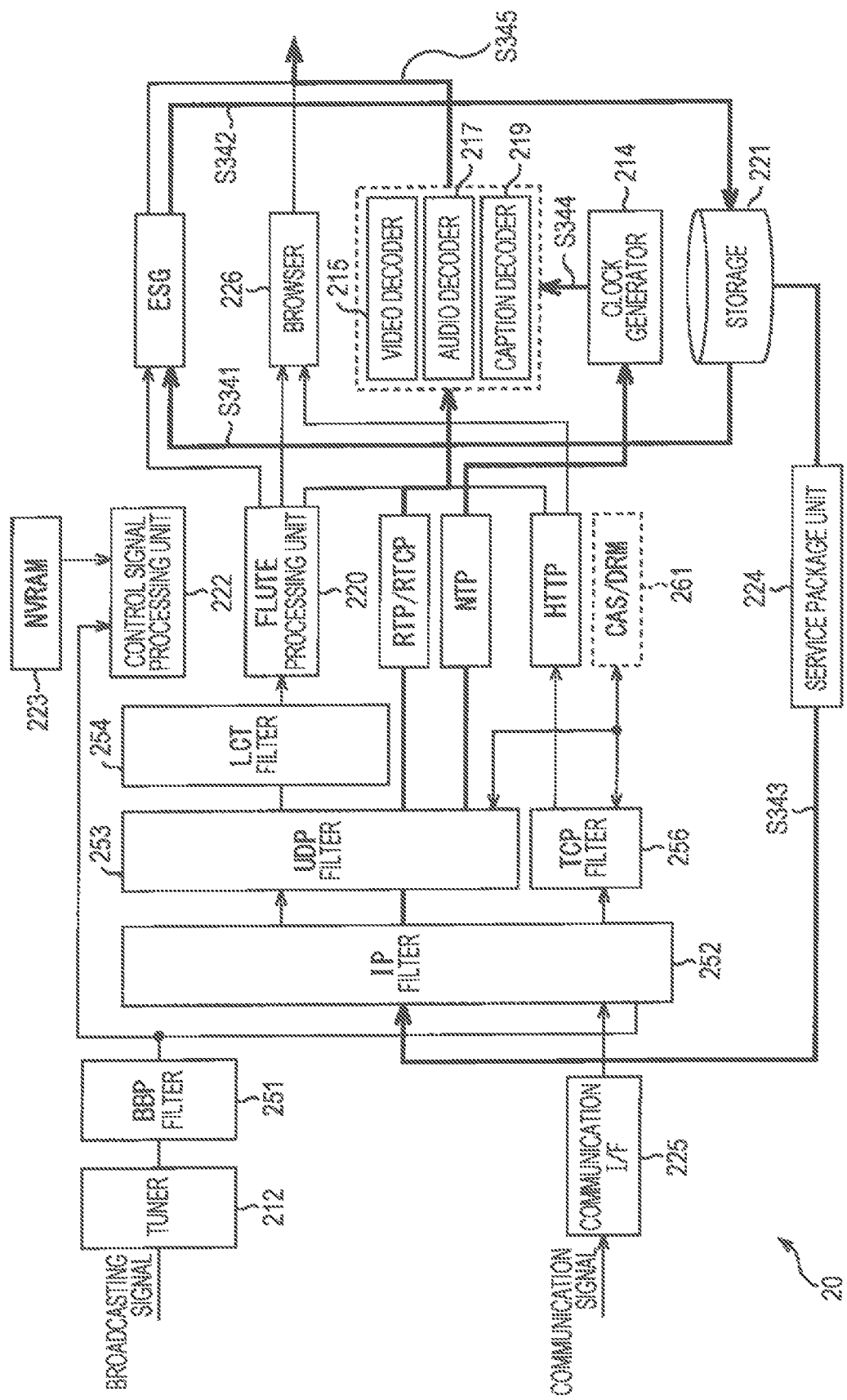
FIG. 54 is a view illustrating operation of the receiving device at the time of recorded program reproduction.

FIG. 54 is a view illustrating operation of the receiving device 20 at the time of recorded program reproduction.

The receiving device 20 at the time of recorded program reproduction reads ESG information from the storage 221, and displays a service list corresponding to recorded program recording information on the display unit (S341). When a particular service is selected by the viewer from the service list, the service package unit 224 reads program recording information corresponding to the particular service from the storage 221 in accordance with the selection operation (S342, S343).

The service package unit 224 depackages the program recording information corresponding to the particular service and read from the storage 221 to acquire components (audio/video), time information (NTP), and control signals (SCS (SDP)) packaged in units of service (S343). These information is supplied to the IP filter 252.

According to the example illustrated in FIG. 54, components are transmitted by RTP session. Accordingly, the IP filter 252 and the UDP filter 253 perform filtering based on an IP address and port numbers, and supply NTP, video data, and audio data to the clock generator 214, the video decoder 215, and the audio decoder 217, respectively (S343).

The clock generator 214 generates a clock signal based on the NTP received from the UDP filter 253, and supplies the clock signal to the video decoder 215 and the audio decoder 217 (S344). The video decoder 215 decodes video data received from the UDP filter 253 in accordance with the clock signal received from the clock generator 214, and supplies the decoded video data to the not-shown video output unit 216 (S345). The audio decoder 217 decodes the audio data received from the UDP filter 253 in accordance with the clock signal received from the clock generator 214, and supplies the decoded audio data to the not-shown audio output unit 218 (S345).

As a result, images of a TV program corresponding to the particular service selected by the viewer from the service list are displayed on the display unit, while voices corresponding to the images are output from the speaker.

Accordingly, a particular service is reproducible by the recorded program reproduction process based on components, control information and the like packaged in units of service by the ESG recording reservation and execution process.

<(2) NRT Service Handling>

Operation of the receiving device 20 for handling an NRT service is hereinafter described with reference to FIGS. 55 through 62. Signaling in an NRT service in the FLUTE transmission method is similar to the signaling discussed above with reference to FIG. 12.

(2-1) NRT-ESG Acquisition

Figure 55:
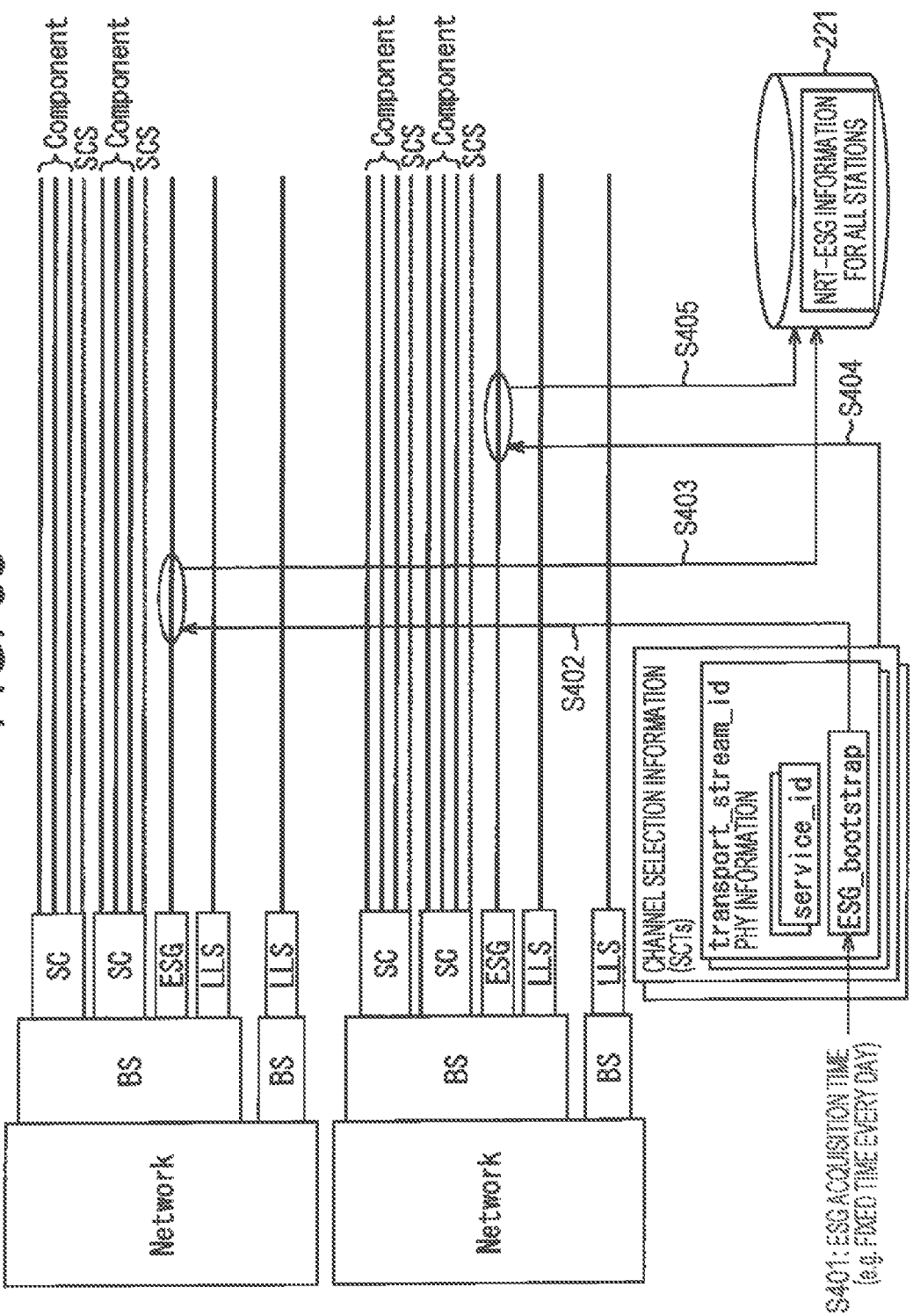
FIG. 55 is a view illustrating an NRT-ESG acquisition process.
Figure 56:
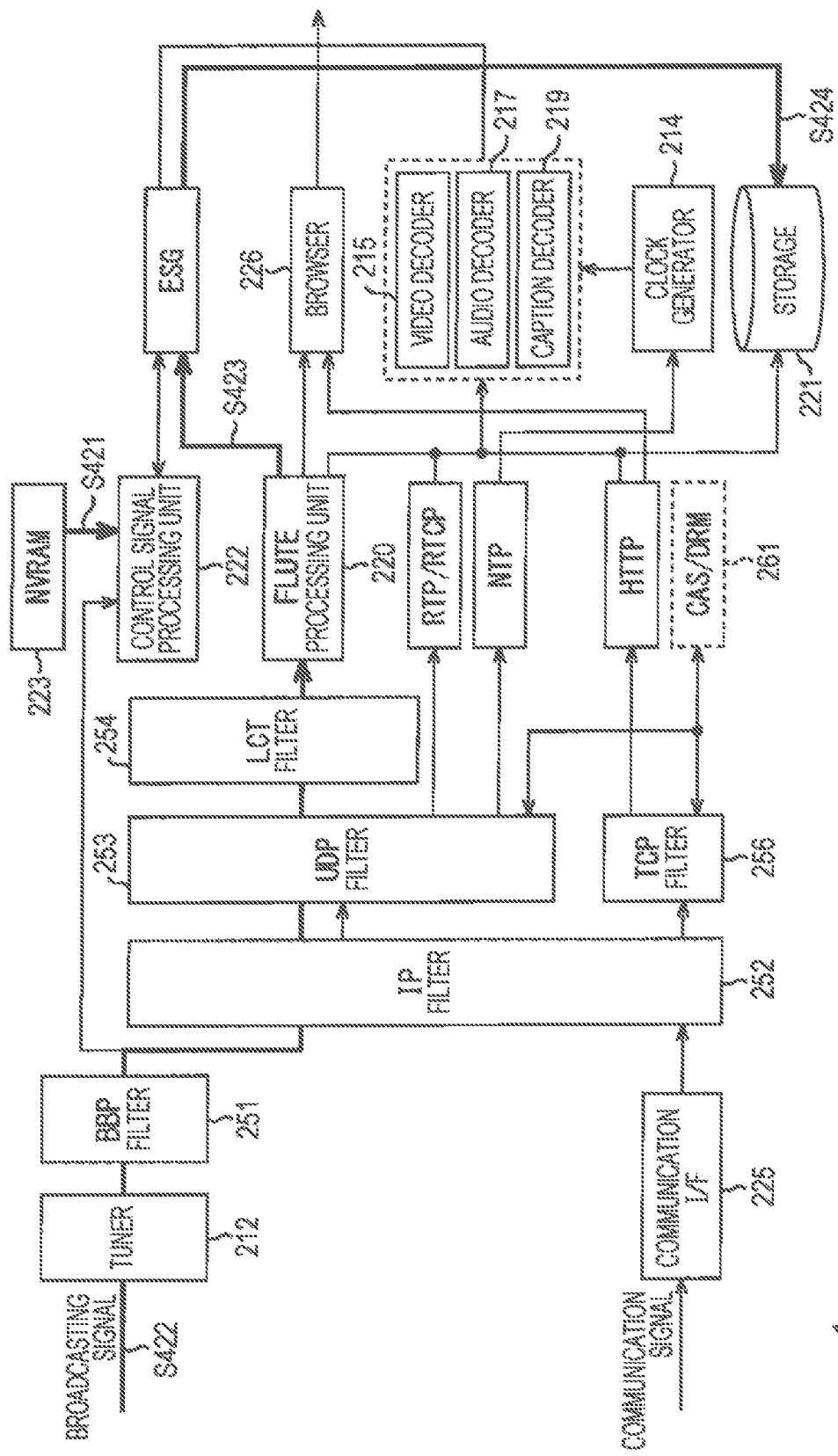
FIG. 56 is a view illustrating operation of the receiving device at the time of NRT-ESG acquisition.

Described hereinbelow with reference to FIGS. 55 and 56 is an NRT-ESG acquisition process performed when power of the receiving device 20 is turned off to acquire ESG information containing NRT information (hereinafter referred to as "NRT-ESG information"), for example.

FIG. 55 is a view illustrating the NRT-ESG acquisition process.

As illustrated in FIG. 55, the receiving device 20 reads selection channel information (SCT) recorded in the NVRAM 223 when ESG acquisition time such as a fixed time passes every day, for example (S401). The channel selection information contains ESG_bootstrap information, wherefore NRT-ESG information is acquired by access to ESG session in FLUTE session based on the ESG_bootstrap information, and recorded in the storage 221 (S402, S403). This NRT-ESG acquisition process is repeated for respective broadcasting networks to record NRT-ESG information for all of the stations in the storage 221 (S404, S405). Accordingly, in a state that each NRT-ESG contains entire information about a particular broadcasting network, only NRT-ESG in a default BBP stream (BS) needs to be acquired for each broadcasting network.

FIG. 56 is a view illustrating operation of the receiving device 20 at the time of NRT-ESG acquisition.

As illustrated in FIG. 56, the control signal processing unit 222 of the receiving device 20 at the time of NRT-ESG acquisition reads channel selection information recorded in the NVRAM 223, and acquires TSI contained in ESGbootstrap information as ESG session information (S421). The FLUTE processing unit 220 acquires FDT based on the ESG session information received from the control signal processing unit 222, and acquires a file transmitted by ESG session with reference to index information contained in the FDT (S422). The FLUTE processing unit 220 generates NRT-ESG information from the file transmitted by ESG session, and records the NRT-ESG information in the storage 221 (S423, S424).

As a result, the NRT-ESG information for the first broadcasting network is recorded in the storage 221. Similarly, the processes in S421 through S424 in FIG. 56 are repeated to store NRT-ESG information for all of the designatable channels based on channel selection information recorded in the NVRAM 223.

(2-2) NRT Content Acquisition and Reproduction

An NRT-content acquisition and reproduction process is hereinafter described with reference to FIGS. 57 through 59. There are three types of methods in the NRT service, i.e., a browse and download method, a push method, and a portal method. This NRT content acquisition and reproduction process is applicable to the browse and download method and the push method.

The browse and download method (browse and download) sets reception reservation based on a downloadable content list, and initiates a reception and accumulation process when reservation start time comes. The push method (push) displays a push service list and registers a service, and performs a reception and accumulation process when distribution of registered service content starts. The portal method (portal) selects a channel (service) dedicated for NRT broadcasting, receives NRT content corresponding to the selected channel, and displays the received NRT content. The browse and download method is now chiefly touched upon with reference to FIGS. 57 through 59.

Figure 57:
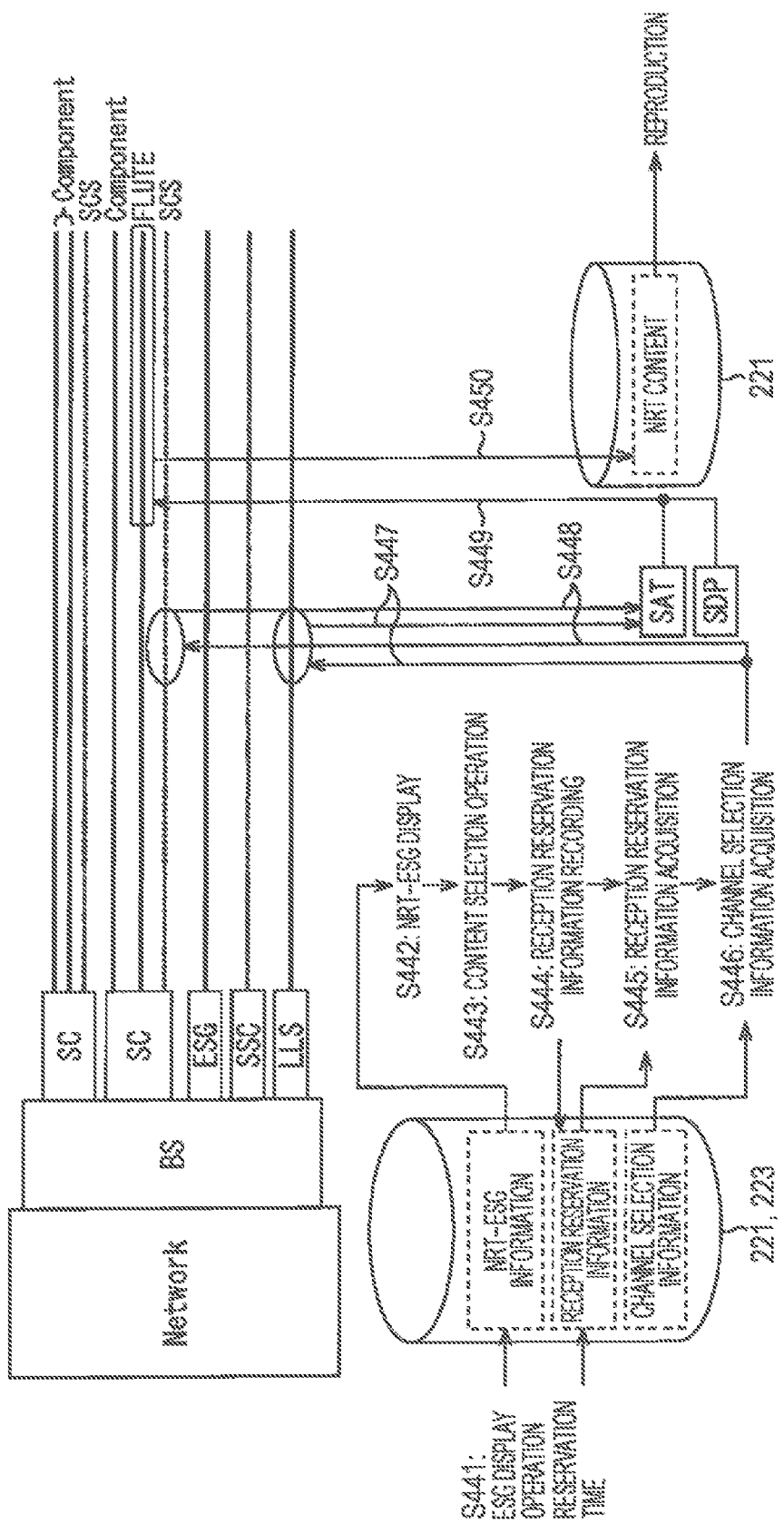
FIG. 57 is a view illustrating an NRT content acquisition and reproduction process.

FIG. 57 is a view illustrating the NRT content acquisition and reproduction process.

When the receiving device 20 detects display operation input by a viewer for displaying NRT-ESG, the receiving device 20 reads NRT-ESG information from the storage 221 (S441), and displays NRT-ESG information on the display unit (S442) as illustrated in FIG. 57. Then, the viewer selects particular content from a downloadable content list displayed on the display unit. When the receiving device 20 detects selection operation for selecting particular content, the receiving device 20 records reception reservation information corresponding to the selection operation in the storage 221 (S443, S444). Then, the receiving device 20 waits until reception reservation start time of content reserved for reception comes.

At the reception reservation start time of the content reserved for reception, the receiving device 20 reads reception reservation information and channel selection information about the particular content from the storage 221 and the NVRAM 223, and performs the channel selection process (S445, S446). When the particular service is on the air, the receiving device 20 acquires SDP transmitted by FLUTE session based on SCS_bootstrap information (S447, S448) similarly to the direct channel selection process and other processes discussed above. Then, the receiving device 20 acquires particular NRT content transmitted by FLUTE session based on TSI and the like contained in SDP, and records the acquired NRT content in the storage 221 (S449, S450).

Figure 58:
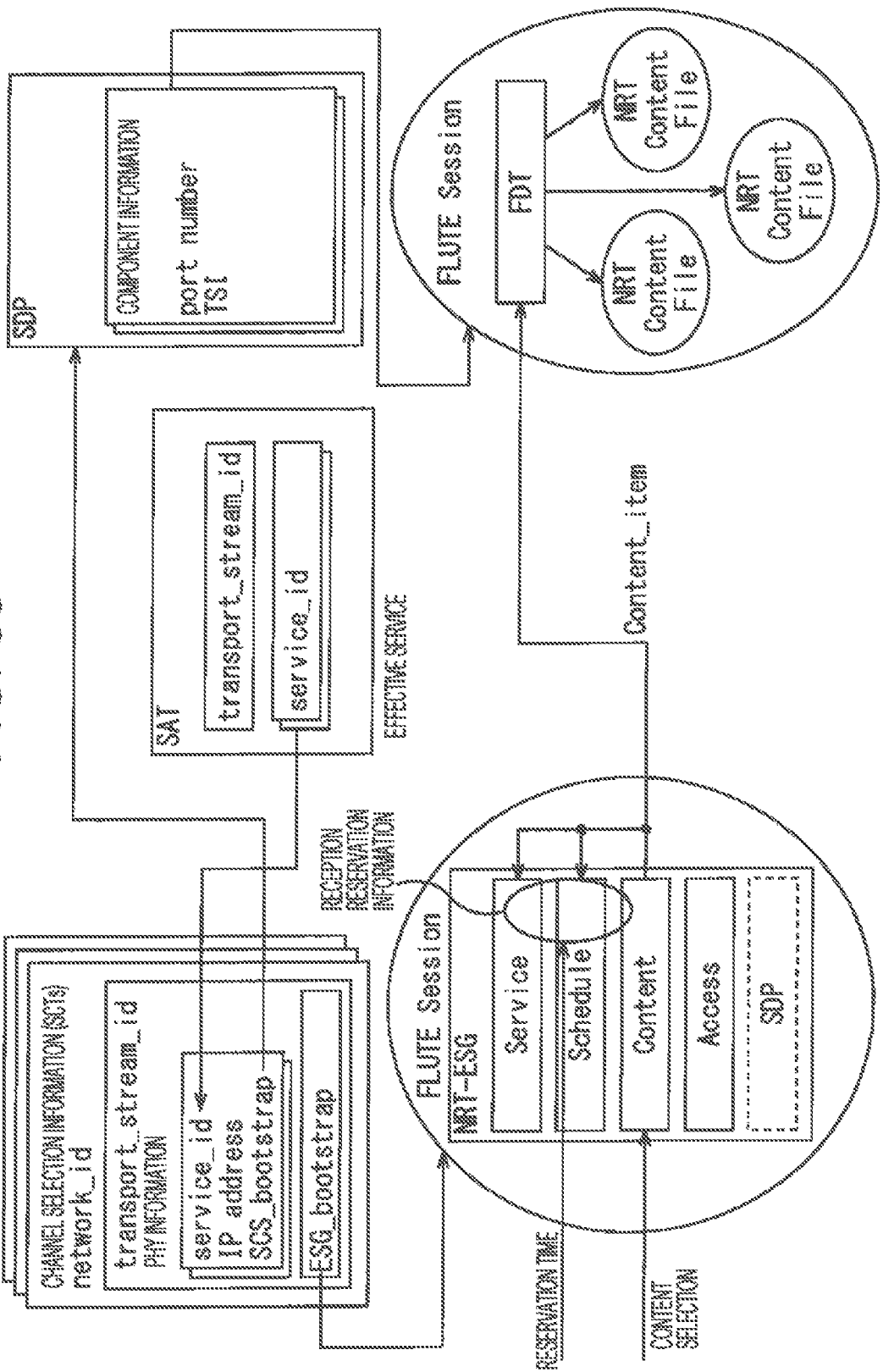
FIG. 58 is a view illustrating a flow of information acquired at the time of NRT content acquisition and reproduction.

More specifically, NRT-ESG information is acquired from FLUTE session based on ESG_bootstrap information contained in channel selection information (NRT-ESG acquisition process illustrated in FIG. 55 and FIG. 56) as illustrated in FIG. 58. When particular content is selected based on NRT-ESG information, a part of the NRT-ESG information such as Service and Schedule is recorded in the storage 221 as reception reservation information. At the reception reservation start time, reception reservation information and channel selection information about a particular service are acquired, and the channel selection process is performed. In addition, SAT transmitted as LLS in the predetermined transmission cycle is acquired to determine whether or not the particular service is on the air. When the particular service is on the air, SDP transmitted by FLUTE session is acquired based on SCS_bootstrap information contained in the channel selection information.

Then, FLUTE session is specified based on component information (port numbers and TSI) acquired from the SDP, and FDT cyclically transmitted by this FLUTE session can be acquired. For example, FDT contains Content_item as index information, wherefore only a file corresponding to particular NRT content can be acquired from FLUTE session by comparison between Content_item contained in the FDT and Content_item contained in the reception reservation information acquired from the NRT-ESG information. In this case, NRT content is constituted by one or a plurality of files.

The NRT content thus acquired is recorded in the storage 221. When operation is performed by the viewer for selecting particular NRT content from the accumulated NRT content list, for example, the particular NRT content recorded in the storage 221 is read therefrom and reproduced.

Figure 59:
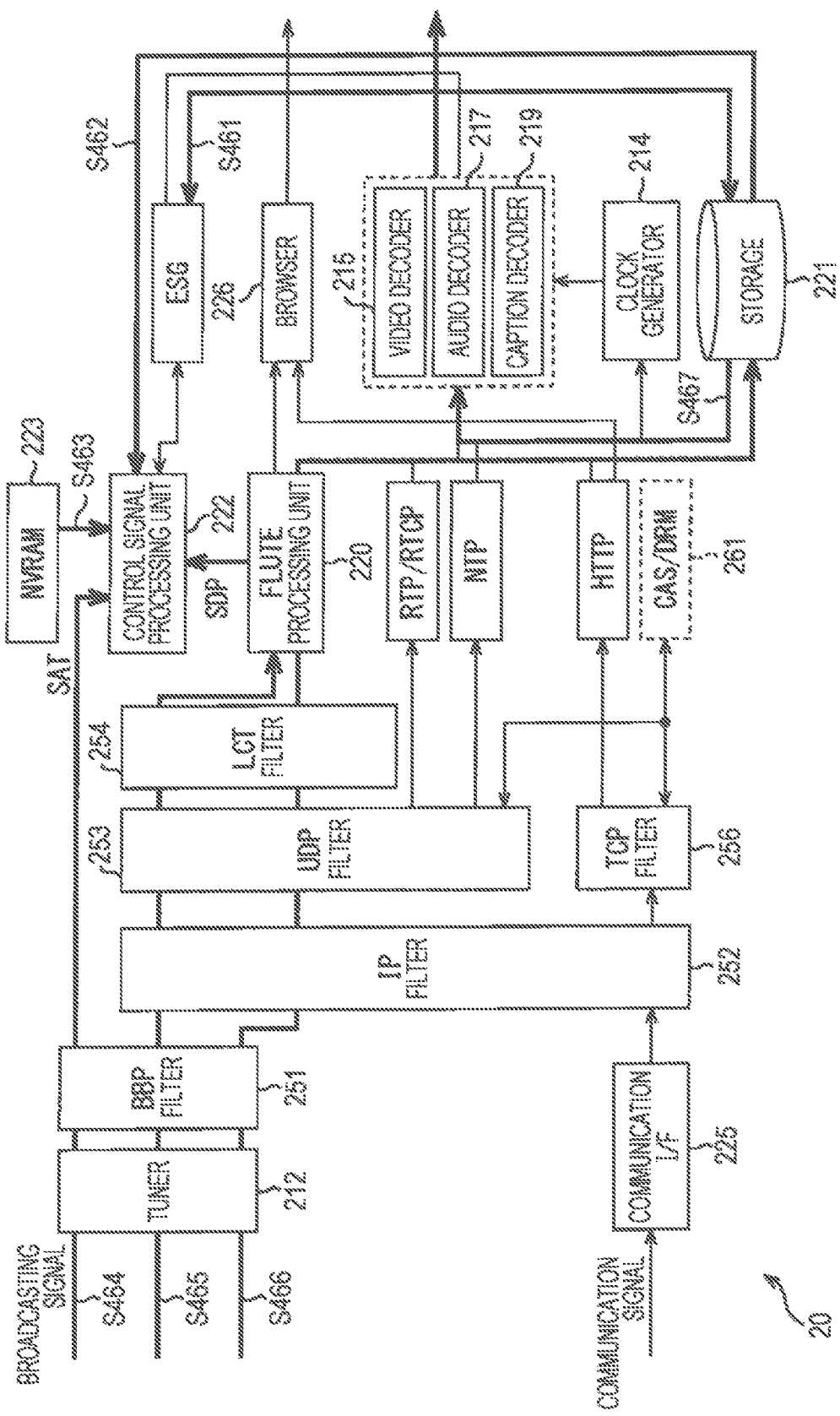
FIG. 59 is a view illustrating operation of the receiving device at the time of NRT content acquisition and reproduction.

FIG. 59 is a view illustrating operation of the receiving device 20 at the time of NRT content acquisition and reproduction.

As illustrated in FIG. 59, the receiving device 20 at the time of NRT content acquisition and reproduction reads NRT-ESG information from the storage 221, and displays the NRT-ESG information on the display unit (S461). When particular content is selected by the viewer from a downloadable content list displayed on the display unit, the receiving device 20 records reception reservation information corresponding to the selection operation in the storage (S461).

At the reception reservation start time of the content reserved for reception, the control signal processing unit 222 reads reception reservation information and channel selection information about the particular content from the storage 221 and the NVRAM 223 (S462, S463). Then, the tuner 212 performs the channel selection process in accordance with the reception reservation information and the channel selection information about the particular content under control by the control signal processing unit 222.

The control signal processing unit 222 acquires SAT extracted by filtering performed by the BBP filter 251 and the SGDU filter bank 255 (not shown) to determine whether or not the particular service is on the air (S464). When the particular service is on the air, the FLUTE processing unit 220 acquires SDP from FLUTE session by filtering performed by the IP filter 252 through the SGDU filter bank 255 based on an IP address, port numbers, TSI and the like (S465). Then, the control signal processing unit 222 acquires SDP from the FLUTE processing unit 220.

Moreover, the IP filter 252 through the LCT filter 254 perform filtering based on the IP address, port numbers, TSI and the like, while the FLUTE processing unit 220 further performs the Content_item comparison process based on the FDT. As a result, a file corresponding to the particular NRT content is acquired from FLUTE session, and recorded (accumulated) in the storage 221 (S466).

When operation is performed by the viewer for selecting particular NRT content from the accumulated NRT content list, data on the particular NRT content recorded in the storage 221 is read from the storage 221. Then, this data is decoded by the video decoder 215 and the audio decoder 217 to reproduce the NRT content (S467).

While the browse and download method has been chiefly described with reference to FIGS. 57 through 59, the NRT content acquisition and reproduction process is applicable to the push method as noted above. More specifically, a reception reservation list of registered services is created instead of registering reception reservation information about particular NRT content. In this case, NRT content can be received and accumulated when distribution of NRT content of the registered services is started, similarly to the NRT content acquisition and reproduction process illustrated in FIGS. 57 through 59.

(2-3) NRT Content Acquisition and Display

An NRT content acquisition and display process is hereinafter described with reference to FIGS. 60 through 62. This NRT content acquisition and display process is only applicable to the portal method.

Figure 60:
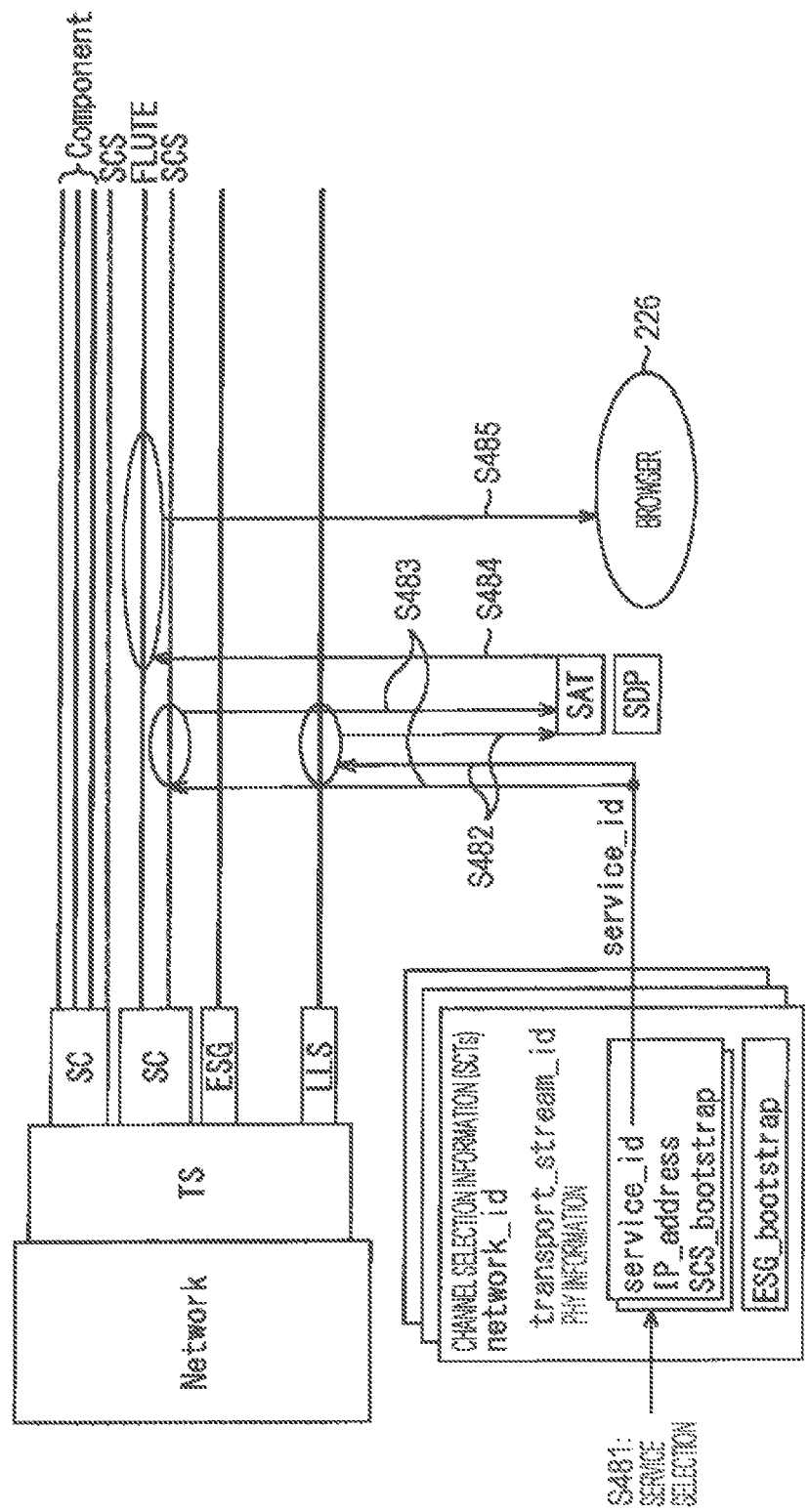
FIG. 60 is a view illustrating an NRT content acquisition and display process.

FIG. 60 is a view illustrating the NRT content acquisition and display process.

When a portal service (such as weather forecast and latest news) is selected based on operation of the remote controller input by a viewer, for example, the receiving device 20 reads channel selection information from the NVRAM 223, and performs the channel selection process (S481) as illustrated in FIG. 60. When a particular service is currently on the air, the receiving device 20 acquires SDP transmitted by FLUTE session based on SCS_bootstrap information (S482, S483) similarly to the direct channel selection process and other processes discussed above. Then, the receiving device 20 acquires particular NRT content transmitted by FLUTE session based on TSI and the like contained in the SDP, and displays the particular NRT content by using the browser 226 (S484, S485).

Figure 61:
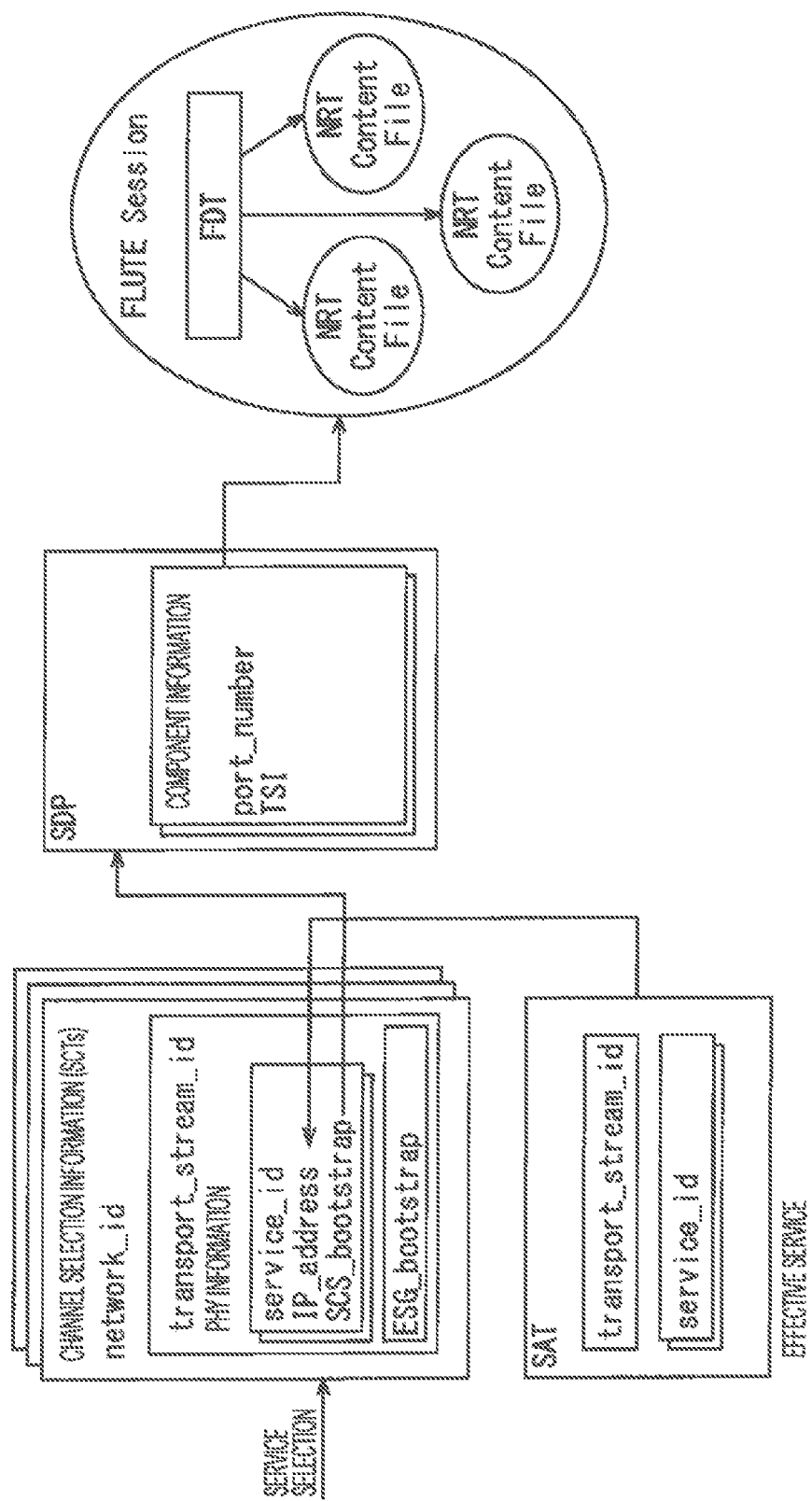
FIG. 61 is a view illustrating a flow of information acquired at the time of NRT content acquisition and display.

More specifically, whether or not the selected particular service is on the air is determined based on SAT transmitted as LLS in a predetermined transmission cycle as illustrated in FIG. 61. When the particular service is on the air, SDP transmitted by FLUTE session is acquired based on SCS_bootstrap information contained in the channel selection information (SCT).

Then, a file corresponding to the particular NRT content is acquired from FLUTE session based on component information (port numbers and TSI) acquired from the SDP, whereafter the file is displayed by the browser 226. In this case, the NRT content is constituted by HyperText Markup Language (HTML) document describing information about weather forecast, latest news or the like. For example, a file of index.html can be initially acquired and supplied to the browser 226 to obtain other associated files such as image files.

Figure 62:
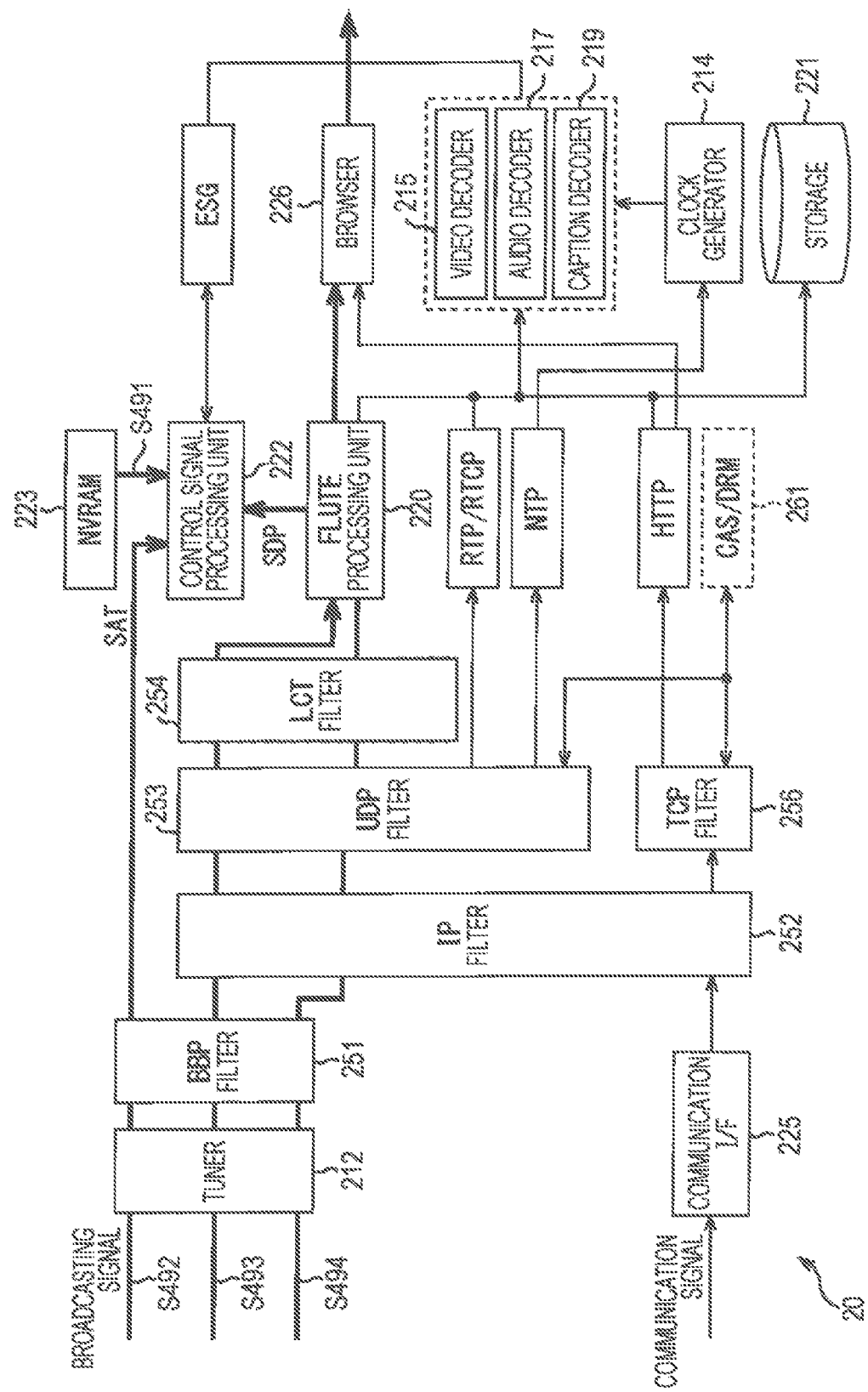
FIG. 62 is a view illustrating operation of the receiving device at the time of NRT content acquisition and display.

FIG. 62 is a view illustrating operation of the receiving device 20 at the time of NRT content acquisition and display.

When a portal service is selected by the viewer, the control signal processing unit 222 of the receiving device 20 at the time of NRT content acquisition and display reads channel selection information from the NVRAM 223 (S491) as illustrated in FIG. 62. Then, the tuner 212 performs the channel selection process corresponding to the channel selection information under control by the control signal processing unit 222. The control signal processing unit 222 acquires SAT extracted by filtering performed by the BBP filter 251 and the SGDU filter bank 255 (not shown) to determine whether or not the particular service is on the air (S492). When the particular service is on the air, the FLUTE processing unit 220 acquires SDP from FLUTE session by filtering performed by the IP filter 252 through the SGDU filter bank 255 based on an IP address, port numbers, TSI and the like (S493). Then, the control signal processing unit 222 acquires SDP from the FLUTE processing unit 220.

Moreover, the FLUTE processing unit 220 acquires a file corresponding to the particular NRT content from FLUTE session by filtering performed by the IP filter 252 through the LCT filter 254 based on the IP address, port numbers, TSI and the like, and displays the acquired file by the browser 226 (S494).

<3. Hybrid Service Handling>

Finally, operation of the receiving device 20 for handling a hybrid service is hereinafter described with reference to FIGS. 63 through 65. Signaling in the hybrid service in the FLUTE transmission method is similar to the signaling discussed above with reference to FIG. 13.

(3-1) Application Acquisition and Display

Figure 63:
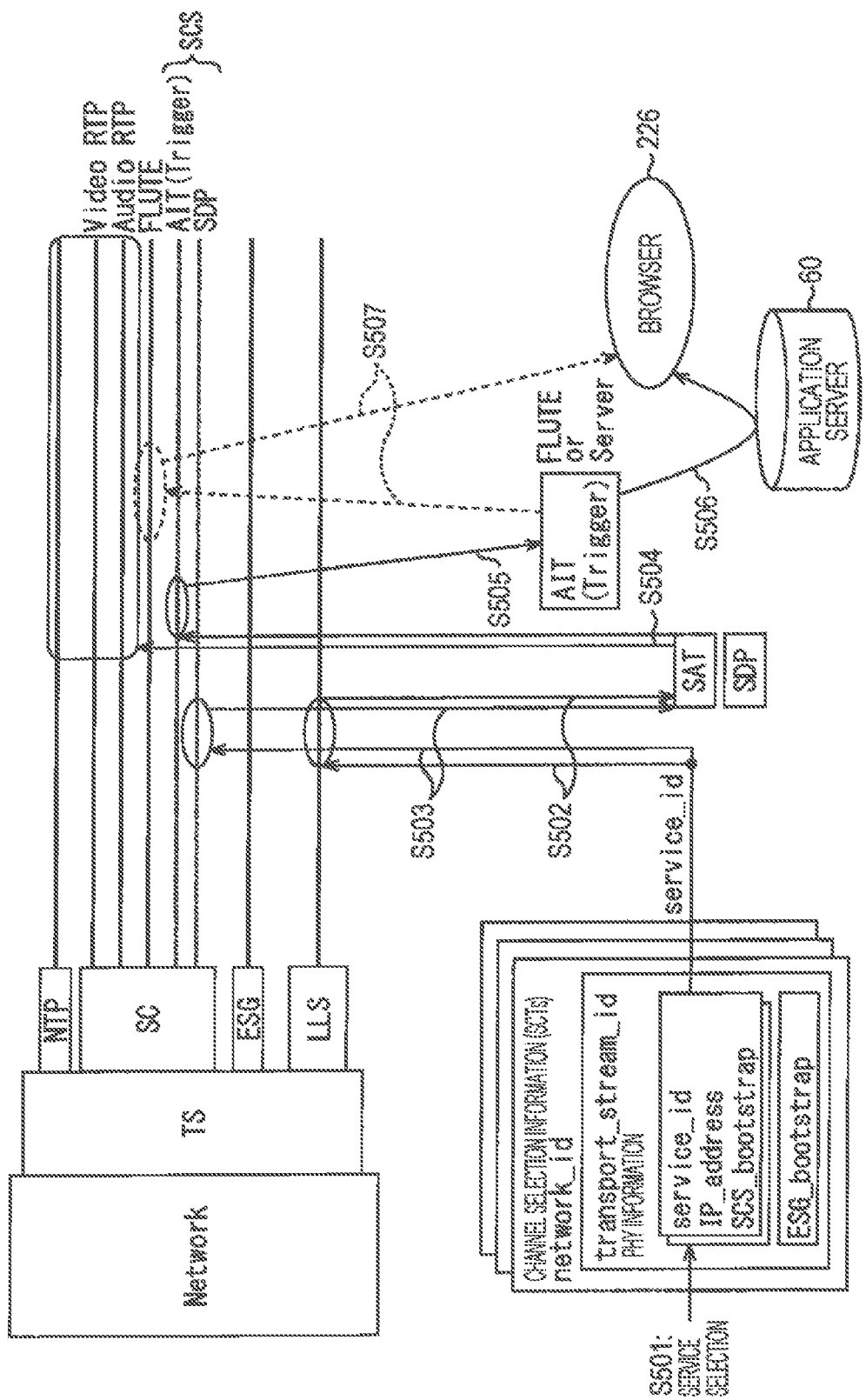
FIG. 63 is a view illustrating an application acquisition and display process.

FIG. 63 is a view illustrating an application acquisition and display process.

When a particular service is selected based on operation of the remote controller by a viewer, for example, the receiving device 20 reads channel selection information (SCT) from the NVRAM 223, and performs the channel selection process (S501) as illustrated in FIG. 63. In addition, the receiving device 20 acquires SAT to determine whether or not the selected particular service is currently on the air (S502). When the particular service is on the air, SDP transmitted by FLUTE session is acquired based on SCS_bootstrap information acquired from the channel selection information (SCT) (S503).

The receiving device 20 acquires video data and audio data from RTP session based on the SDP. The receiving device 20 decodes the video data and audio data in accordance with a clock signal corresponding to NTP. As a result, images of broadcasting content corresponding to the particular service selected by the viewer are displayed on the display unit, while voices corresponding to the images are output from the speaker (S504).

The receiving device 20 further acquires application control information transmitted as SCS in a predetermined transmission cycle based on SCS_bootstrap information acquired from the channel selection information (SCT) (3505). The application control information in this context is information for controlling operation of an application executed in conjunction with broadcasting content, such as Application Information Table (AIT) and trigger information (Trigger). For example, the application control information describes identification information, an acquisition source, and definition information for defining a life cycle of the application. When URL of the application server 50 is described as an acquisition source of an application, the receiving device 20 accesses the application server 50 via the Internet 90 based on this URL to acquire the application (S506).

For example, an application is constituted by HTML document describing information associated with broadcasting content, and is displayed by the browser 226 (S506). Accordingly, the broadcasting content, and images of the application associated with the broadcasting content are simultaneously displayed on the display unit. An application may be acquired from FLUTE session instead of Internet distribution (S507).

Figure 64:
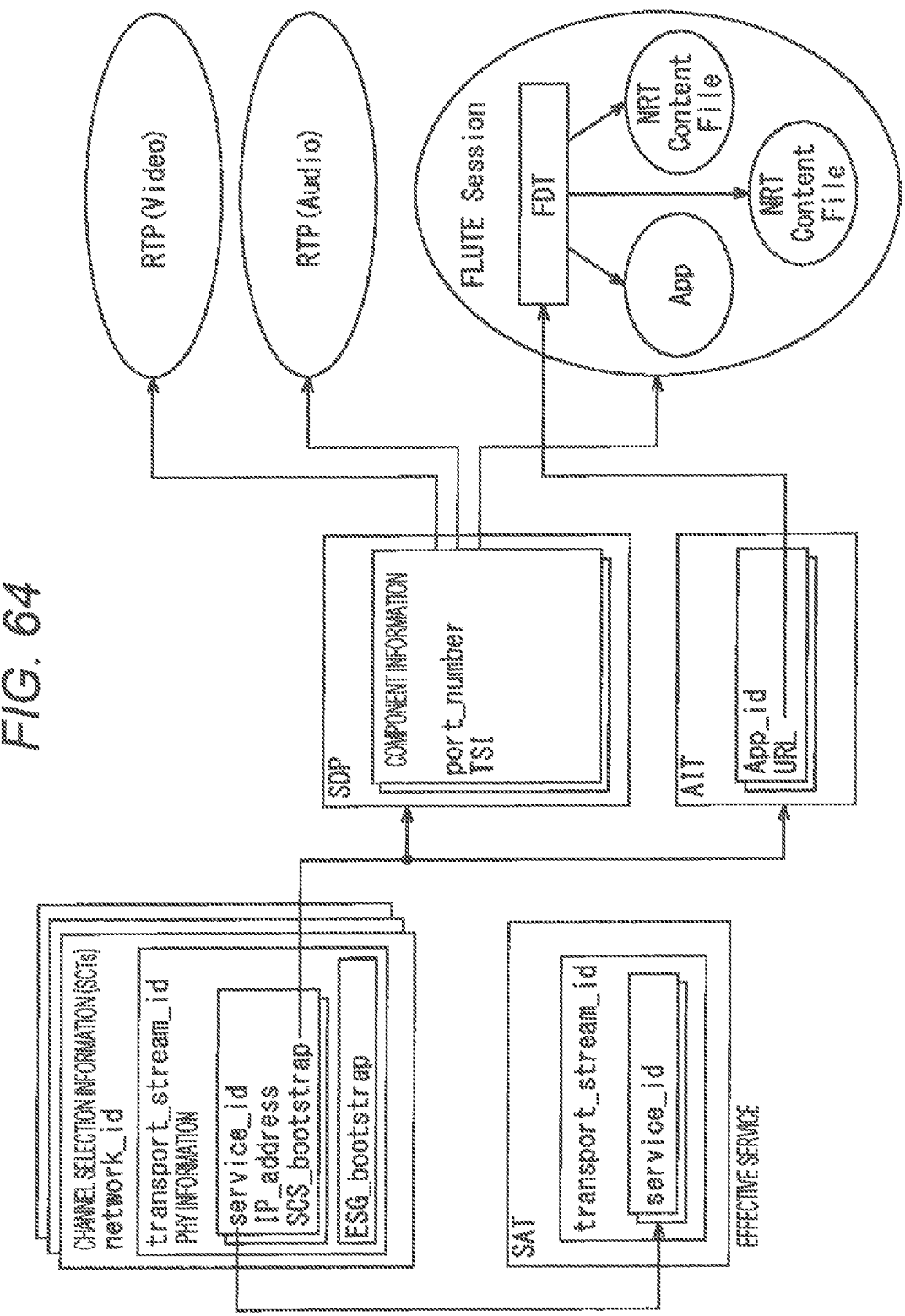
FIG. 64 is a view illustrating a flow of information acquired at the time of application acquisition and display.

More specifically, whether or not the selected particular service is currently on the air is determined based on SAT transmitted as LLS in a predetermined transmission cycle as illustrated in FIG. 64. When the particular service is on the air, SDP transmitted by FLUTE session is acquired based on SCS_bootstrap information acquired from channel selection information (SCT). Then, components of the particular service can be acquired from RTP session specified based on component information (port numbers and TSI) contained in the SDP. According to this example, video data and audio data are acquired as components, and decoded by the video decoder 215 and the audio decoder 217 in accordance with time information indicated by NTP to synchronize images and voices of the broadcasting content.

Moreover, AIT transmitted as SCS by FLUTE session in a predetermined transmission cycle is acquired based on SCS_bootstrap information. In this case, SDP and AIT transmitted by identical FLUTE session may be identified from each other based on particular TOI given to each of the SDP and AIT, or identification information of an SGDU header (fragmentTransportID in FIG. 14). The AIT describes information such as identification information (App_id) and an acquisition source (URL) of an application.

When an application is transmitted by FLUTE session, for example, the FLUTE session can be specified based on component information (port numbers and TSI) contained in the SDP to acquire FDT cyclically transmitted by the FLUTE session. The FDT contains index information, wherefore the application can be acquired from the FLUTE session based on the FDT.

Figure 65:
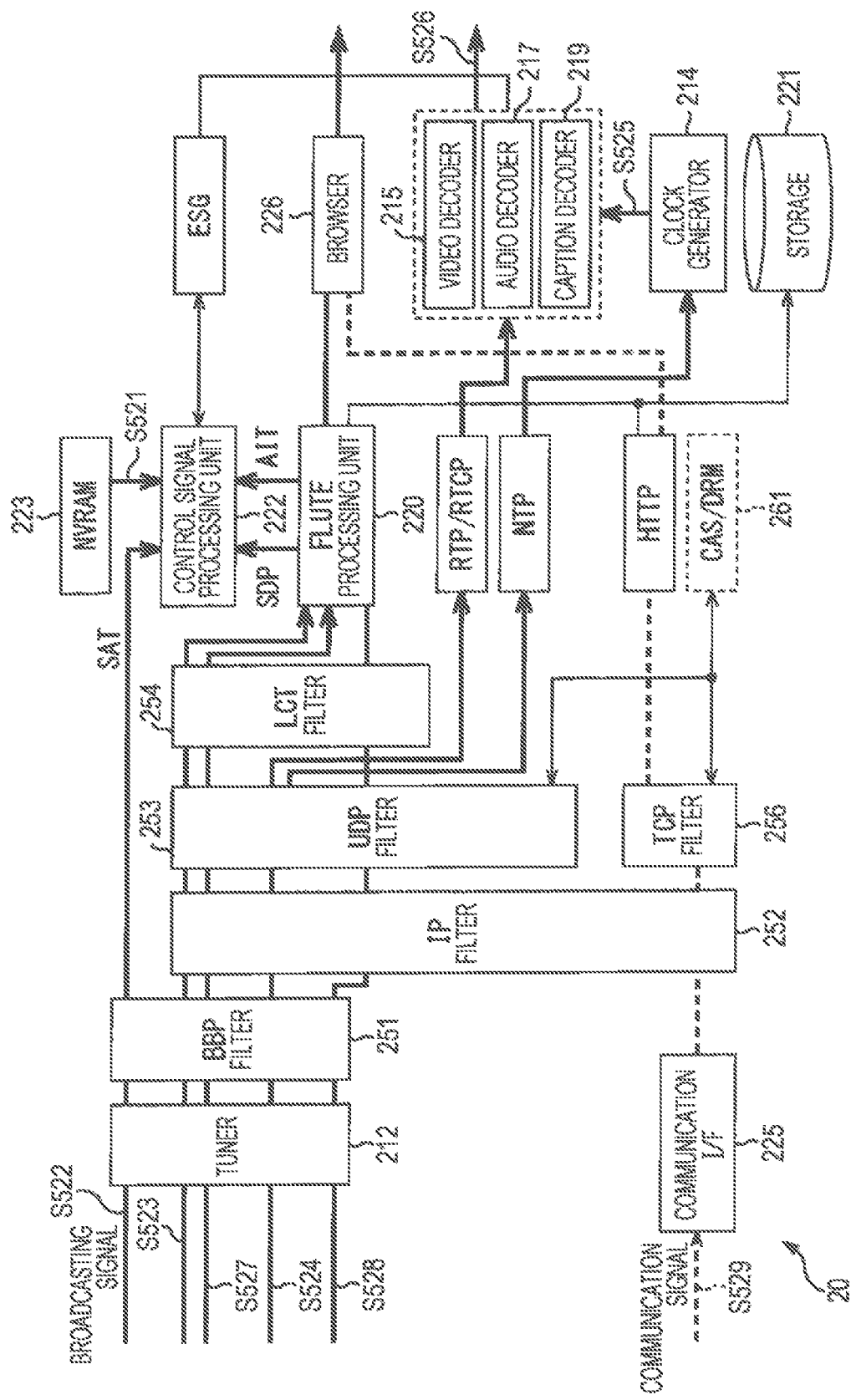
FIG. 65 is a view illustrating operation of the receiving device at the time of application acquisition and display.

FIG. 65 is a view illustrating operation of the receiving device 20 at the time of application acquisition and display.

When a service is selected by the viewer, the control signal processing unit 222 of the receiving device 20 at the time of application acquisition and display reads channel selection information from the NVRAM 223 as illustrated in FIG. 65 (S521). Then, the tuner 212 performs the channel selection process corresponding to the channel selection information under control by the control signal processing unit 222. The control signal processing unit 222 also acquires SAT extracted by filtering performed by the BBP filter 251 and the SGDU filter bank 255 (not shown) to determine whether or not the particular service is currently on the air (S522).

When the particular service is on the air, the FLUTE processing unit 220 acquires SDP from FLUTE session by filtering performed by the IP filter 252 through the SGDU filter bank 255 based on an IP address, port numbers, TSI and the like (S523). Then, the control signal processing unit 222 acquires SDP from the FLUTE processing unit 220.

Components of the broadcasting content are transmitted by RTP session. Accordingly, the IP filter 252 and the UDP filter 253 perform filtering based on the IP address and the port numbers, and supply NTP, video data, and audio data to the clock generator 214, the video decoder 215, and the audio decoder 217, respectively (S524).

The clock generator 214 generates a clock signal based on the NTP received from the UDP filter 253, and supplies the clock signal to the video decoder 215 and the audio decoder 217 (S525). The video decoder 215 decodes video data received from the UDP filter 253 in accordance with the clock signal received from the clock generator 214, and supplies the decoded video data to the not-shown video output unit 216 (S526). The audio decoder 217 decodes the audio data received from the UDP filter 253 in accordance with the clock signal received from the clock generator 214, and supplies the decoded audio data to the not-shown audio output unit 218 (S526). As a result, images of a TV program or the like are displayed on the display unit, while voices corresponding to the images are output from the speaker.

Moreover, the FLUTE processing unit 220 acquires AIT from FLUTE session by filtering performed by the IP filter 252 through the SGDU filter bank 255 based on the IP address, port numbers, TSI and the like (9527). Then, the control signal processing unit 222 acquires the AIT from the FLUTE processing unit 220. The receiving device 20 acquires a file of an application from FLUTE session based on the AIT, and executes the file in conjunction with the broadcasting content (S528). According to the example discussed above, the application is transmitted by FLUTE session. However, the application is acquired from the application server 50 when distributed via the Internet (S529).

According to the above description with reference to FIGS. 63 through 65, RTP session and FLUTE session are transmitted by an identical service (service channel). However, FLUTE session may be transmitted by a service different from the service of RTP session. In this case, SCS (SDP, AIT) is transmitted for each of these services.

<(4) UDP Transmission Method>

Each of the operation mode examples discussed above adopts the FLUTE transmission method as the IP transmission method. Described hereinbelow is an example adopting the UDP transmission method. The FLUTE transmission method and the UDP transmission method are different in that whether SCS is transmitted by FLUTE session or UDP. Accordingly, this difference is chiefly discussed herein while presenting an example of a direct channel selection process.

(4-1) Channel Selection (4-11) Direct Channel Selection

Figure 66:
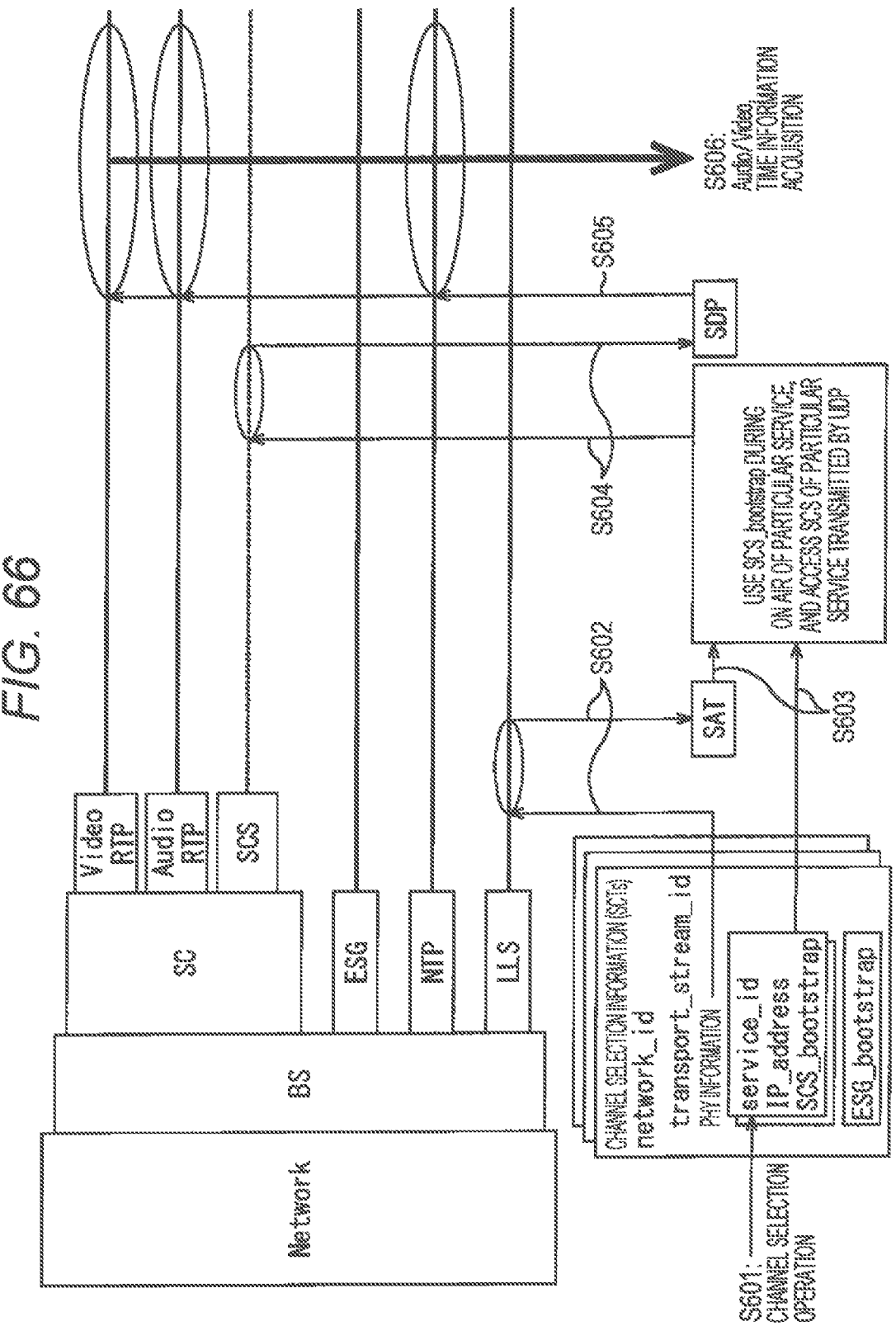
FIG. 66 is a view illustrating a direct channel selection process in the UDP transmission method.
Figure 67:
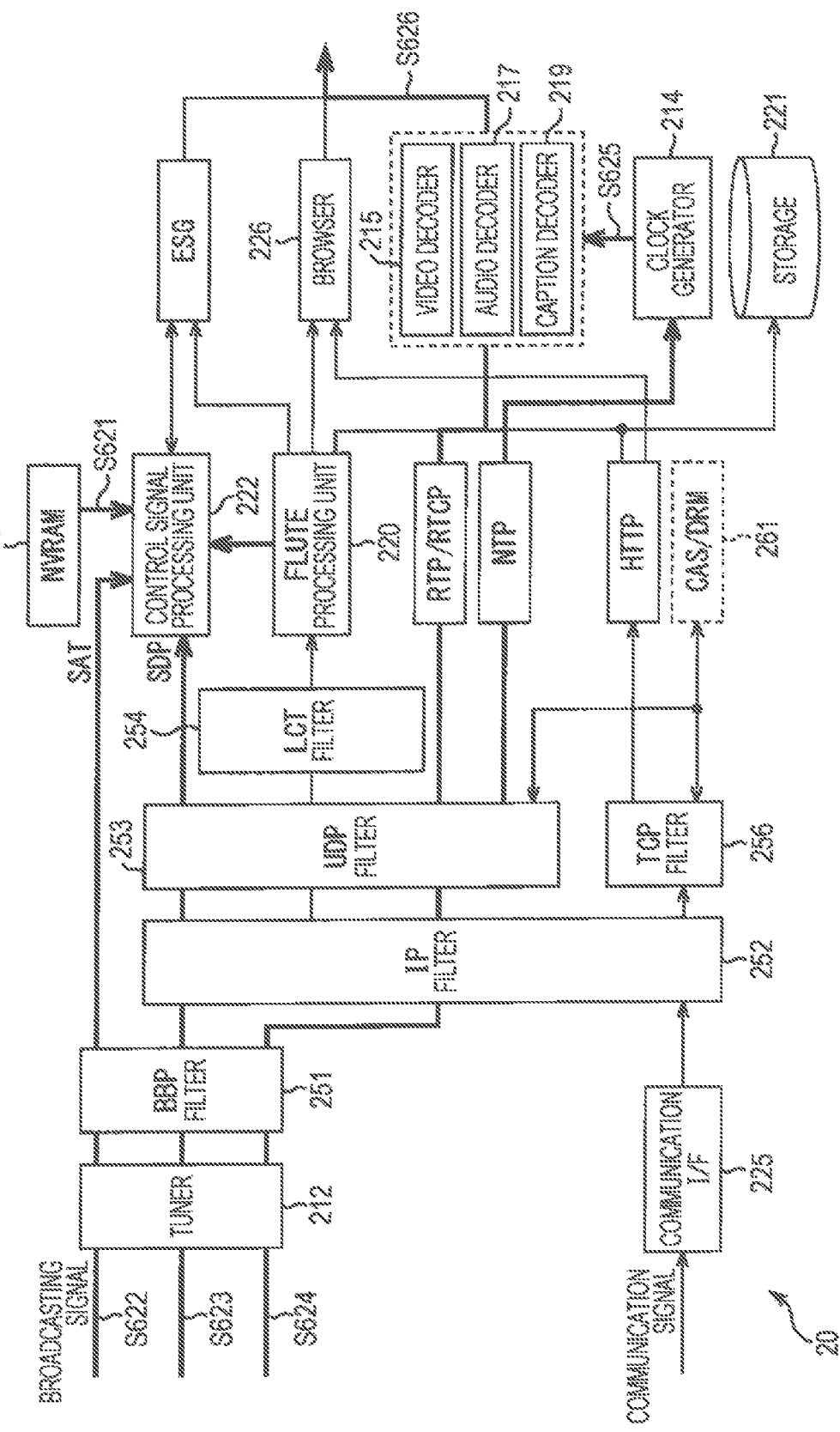
FIG. 67 is a view illustrating operation of the receiving device at the time of direct channel selection in the UDP transmission method.

Discussed hereinbelow with reference to FIGS. 66 and 67 is a direct channel selection process performed when a particular channel (service) is directly selected based on operation of the remote controller by a viewer.

FIG. 66 is a view illustrating the direct channel selection process in the UDP transmission method.

When the receiving device 20 detects channel selection operation input by the viewer, the receiving device 20 reads channel selection information (SCT) recorded in the NVRAM 223 as illustrated in FIG. 66 (S601). The receiving device 20 further acquires SAT transmitted as LLS in a predetermined transmission cycle (S602). Then, service_id of the particular service selected by the viewer and service_id contained in SAT are compared to determine whether or not the particular service is currently on the air (S603).

When the particular service is on the air, the receiving device 20 acquires SDP by accessing SDP of the particular service transmitted by UDP based on SCS_bootstrap information corresponding to service_id of the selected particular service contained in the channel selection information (SCT) (S604).

The SDP contains component attributes and configuration information such as port numbers and TSI of respective components. Accordingly, components of the particular service can be acquired from RTP session or FLUTE session by filtering based on the port numbers and TSI contained in the SDP. In addition, time information (NTP) common to a plurality of services can be acquired by filtering based on an IP address for NT. According to the example illustrated in FIG. 66, video data and audio data are acquired as components from RTP session (S605, S606). The video data and audio data thus acquired are decoded in accordance with a clock signal corresponding to the NTP.

FIG. 67 is a view illustrating operation of the receiving device 20 at the time of direct channel selection in the UDP transmission method.

As illustrated in FIG. 67, the control signal processing unit 222 of the receiving device 20 at the time of direct channel selection reads channel selection information (SCT)

recorded in the NVRAM 223 (S621). The tuner 212 performs the channel selection process in accordance with the channel selection information under control by the control signal processing unit 222. The control signal processing unit 222 also acquires SAT extracted by filtering performed by the BBP filter 251 and the SGDU filter bank 255 (not shown) to determine whether or not the particular service selected by the viewer is currently on the air (S622).

When the particular service is on the air, SDP transmitted by UDP is acquired by filtering performed by the IP filter 252, the UDP filter 253, and the SGDU filter bank 255 based on an IP address, port numbers and the like, and supplied to the control signal processing unit 222 (S623). According to the example illustrated in FIG. 67, components are transmitted by RTP session. Accordingly, the IP filter 252 and the UDP filter 253 perform filtering based on the IP address and the port numbers, and supply NTP, video data, and audio data to the clock generator 214, the video decoder 215, and the audio decoder 217, respectively (S624).

The clock generator 214 generates a clock signal based on the NTP received from the UDP filter 253, and supplies the clock signal to the video decoder 215 and the audio decoder 217 (S625). The video decoder 215 decodes video data received from the UDP filter 253 in accordance with the clock signal received from the clock generator 214, and supplies the decoded video data to the not-shown video output unit 216 (S626). The audio decoder 217 decodes the audio data received from the UDP filter 253 in accordance with the clock signal received from the clock generator 214, and supplies the decoded audio data to the not-shown audio output unit 218 (S626). As a result, images of a TV program corresponding to the particular service directly selected by the viewer are displayed on the display unit, while voices corresponding to the images are output from the speaker.

While the method for acquiring SCS (SDP) in the UDP transmission method in the example of the direct channel selection process has been discussed, SCS (SDP) is similarly acquired in the ESG channel selection process, the ESG recording reservation and execution process, the NRT content acquisition and reproduction process (NRT service handling), the NRT content acquisition and display process (NRT service handling), the application acquisition and display process (hybrid service handling), and other processes. The same description concerning the UDP transmission method applied to these processes is not repeated herein.

4. Specific Processes Executed by Respective Devices

Figure 68:
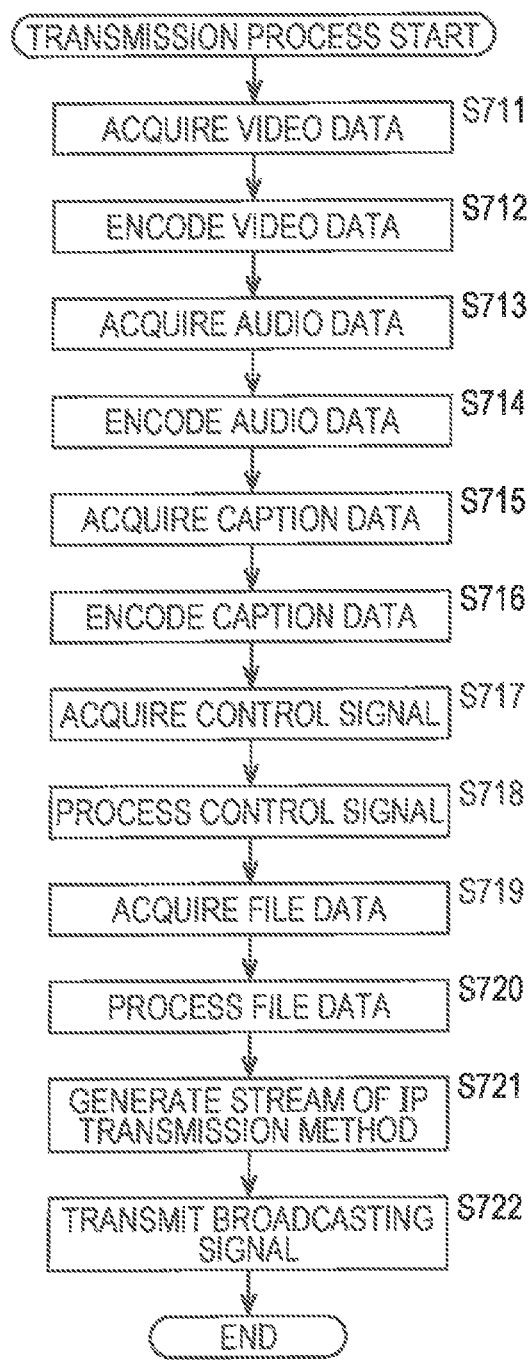
FIG. 68 is a flowchart illustrating a transmission process.
Figure 69:
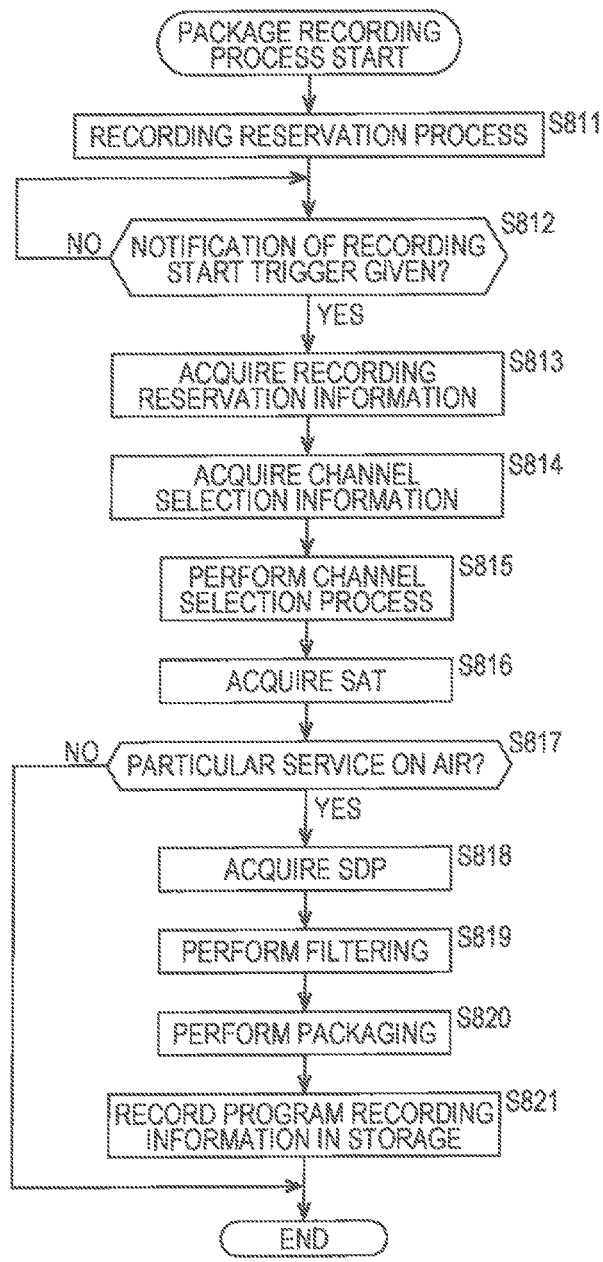
FIG. 69 is a flowchart illustrating a package recording process.
Figure 70:
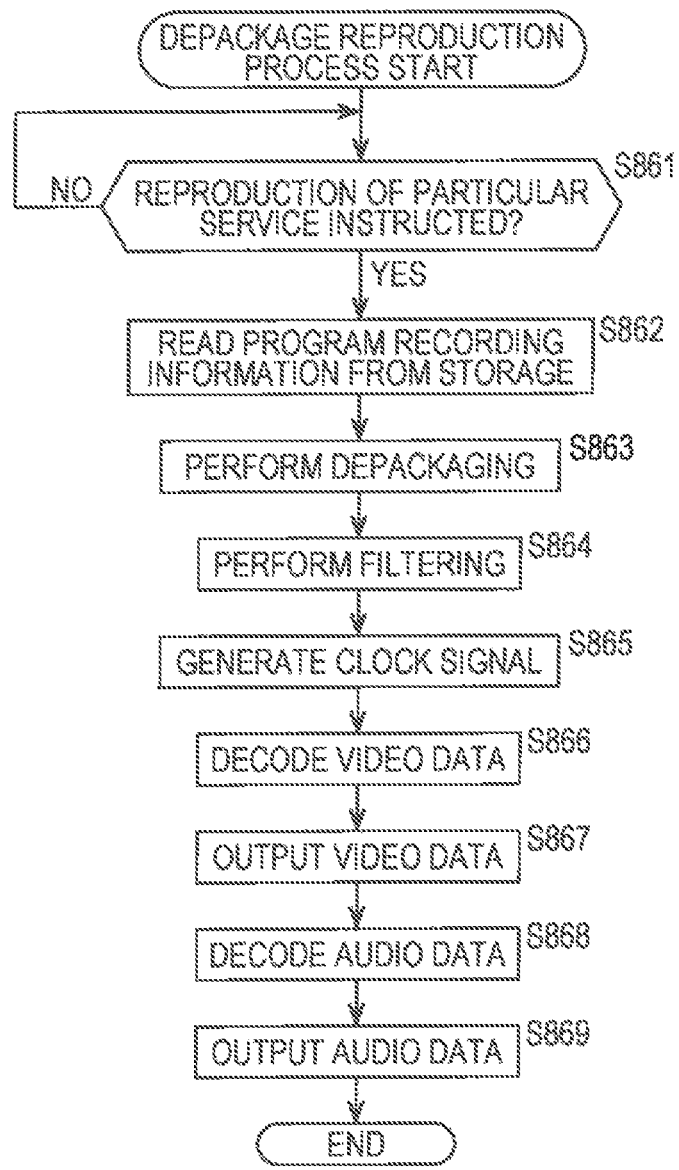
FIG. 70 is a flowchart illustrating a depackage reproduction process.

Specific processes performed by respective devices constituting the broadcasting system 1 illustrated in FIG. 7 are hereinafter described with reference to FIGS. 68 through 70.

(Transmission Process)

A transmission process performed by the transmitting device 10 illustrated in FIG. 7 is initially described with reference to a flowchart in FIG. 68.

In step S711, the video data acquisition unit 111 acquires video data, and supplies the video data to the video encoder 112. In step S712, the video encoder 112 encodes the video data supplied from the video data acquisition unit 111, and supplies the encoded video data to the Mux 121.

In step S713, the audio data acquisition unit 113 acquires audio data, and supplies the audio data to the audio encoder 114. In step S714, the audio encoder 114 encodes the audio data supplied from the audio data acquisition unit 113, and supplies the encoded audio data to the Mux 121.

In step S715, the caption data acquisition unit 115 acquires caption data, and supplies the caption data to the caption encoder 116. In step S716, the caption encoder 116 encodes the caption data supplied from the caption data acquisition unit 115, and supplies the encoded caption data to the Mux 121.

In step S717, the control signal acquisition unit 117 acquires control signals such as SCS and LLS, and supplies these control signals to the control signal processing unit 118. In step S718, the control signal processing unit 118 performs predetermined signal processing for the control signals received from the control signal acquisition unit 117, and supplies the processed signals to the Mux 121. When the FLUTE transmission method is adopted, for example, the control signal processing unit 118 performs signal processing for SCS acquired by the control signal acquisition unit 117 for transmission by FLUTE session. On the other hand, when the UDP transmission method is adopted, for example, the control signal processing unit 118 performs signal processing for SCS acquired by the control signal acquisition unit 117 for transmission by UDP.

In step S719, the file data acquisition unit 119 acquires file data such as NRT content and an application, and supplies the file data to the file processing unit 120 at the time of transmission of asynchronous data in file format. In step S720, the file processing unit 120 performs predetermined file processing for the file data supplied from the file data acquisition unit 119, and supplies the processed file data to the Mux 121.

In step S721, the Mux 121 multiplexes the video data received from the video encoder 112, the audio data received from the audio encoder 114, the caption data received from the caption encoder 116, the control signals received from the control signal processing unit 118, and the file data received from the file processing unit 120 to generate BBP streams in the IP transmission method (FLUTE transmission method or UDP transmission method), and supplies the generated BBP streams to the transmission unit 122.

In step S722, the transmission unit 122 transmits, via the antenna 123, broadcasting signals corresponding to the BBP streams supplied from the Mux 121. When the FLUTE transmission method is adopted, SCS is transmitted by FLUTE session. When the UDP transmission method is adopted, SCS is transmitted by UDP. After completion of the process in step S722, the transmission process ends.

This is all the description concerning the transmission process.

(Package Recording Process)

A package recording process performed by the receiving device 20 illustrated in FIG. 7 is hereinafter described with reference to a flowchart in FIG. 69.

In step S811, a recording reservation process is performed. When a particular service is selected from a service list corresponding to ESG information, the recording reservation process records recording reservation information about this particular service in the storage 221 as described in the ESG recording reservation and execution process in FIG. 51.

After completion of the recording reservation process, the process proceeds to step S812. In step S812, it is determined whether or not notification of a recording start trigger has been given. When it is determined that notification of the recording start trigger has been given, the process proceeds to step S813.

In step S813, the control signal processing unit 222 acquires recording reservation information from the storage 221. In step S814, the control signal processing unit 222 acquires channel selection information (SCT) from the NVRAM 223.

In step S815, the tuner 212 performs a channel selection process under control by the control signal processing unit 222. As a result, broadcasting signals of the particular service corresponding to the recording reservation target are extracted and demodulated.

In step S816, the control signal processing unit 222 acquires SAT extracted by filtering performed by the BBP filter 251 and the SGDU filter bank 255. In step S817, the control signal processing unit 222 determines whether or not the particular service is currently on the air based on the SAT.

When it is determined in step S817 that the particular service is not on the air, the following processes are canceled. As a result, the package recording process ends. When it is determined in step S817 that the particular service is on the air, the process proceeds to step S818.

In step S818, the control signal processing unit 222 acquires SDP corresponding to predetermined filtering. More specifically, SDP transmitted by FLUTE session is acquired based on SCS_bootstrap information corresponding to service_id of the particular service contained in the channel selection information (SCT) when the FLUTE transmission method is adopted. However, SDP transmitted by UDP is acquired based on SCS_bootstrap information corresponding to service_id of the particular service contained in the channel selection information (SCT) when the UDP transmission method is adopted.

In step S819, the IP filter 252 performs filtering. In this case, components (audio/video), time information (NTP), and control signals (SCS) of the particular service transmitted by RTP session can be acquired, for example, by filtering performed based on an IP address acquired from the channel selection information (SCT).

In step S820, the service package unit 224 performs a package process for packaging the components (audio/video), time information (NTP), and control signals (SCS) extracted by the IP filter 252.

In step S821, the service package unit 224 records program recording information about the particular service obtained by the package process in the storage 221. After completion of the process in step S821, the package recording process ends.

This is all the description concerning the package recording process.

(Depackage Reproduction Process)

A depackage reproduction process performed by the receiving device 20 illustrated in FIG. 7 is hereinafter described with reference to FIG. 70.

In step S861, it is determined whether or not a particular service has been selected by a viewer from a service list of recorded services corresponding to ESG information. When an instruction of reproduction of a particular service selected by the viewer is issued, the process proceeds to step S862.

In step S862, the service package unit 224 reads program recording information about the particular service from the storage 221. In step S863, the service package unit 224 depackages the program recording information read by the process in step S862 to acquire components (audio/video), time information (NTP), and control signals (SCS) packaged in units of service, and supplies the acquired components and the like to the IP filter 252.

In step S864, the IP filter 252 and the UDP filter 253 perform filtering based on an IP address and port numbers, and supply NTP, video data, and audio data to the clock generator 214, the video decoder 215, and the audio decoder 217, respectively.

In step S865, the clock generator 214 generates a clock signal based on the NTP supplied from the UDP filter 253, and supplies the clock signal to the video decoder 215 and the audio decoder 217.

In step S866, the video decoder 215 decodes the video data received from the UDP filter 253 based on the clock signal received from the clock generator 214, and supplies the decoded video data to the video output unit 216. In step S867, the video output unit 216 outputs the video data supplied from the video decoder 215 to the display unit.

In step S868, the audio decoder 217 decodes the audio data received from the UDP filter 253 based on the clock signal received from the clock generator 214, and supplies the decoded audio data to the audio output unit 218. In step S869, the audio output unit 218 supplies the audio data received from the audio decoder 217 to the speaker.

As described above, the video data and the audio data are decoded synchronously in accordance with the clock signal. Accordingly, voices corresponding to images of a TV program displayed on the display unit are output from the speaker. After completion of the process in step S869, the depackage reproduction process ends.

This is all the description concerning the depackage reproduction process.

Names of respective sets of information in the foregoing description presented only by way of example may be other names. For example, the "BBP_stream" in the foregoing description is called "BSP stream" in some cases. In addition, "transport_stream_id" in the foregoing description is called "BSP_stream_id" in some cases. Furthermore, "SCS" is called "SC" in some cases. When this name is applied, "SCS_bootstrap" is referred to as "SC_bootstrap".

<Description of Computer According to Present Technology>

A series of processes described herein may be executed either by hardware or software. When the series of processes are performed by software, programs included in the software are installed in a computer. Examples of the computer used herein include a computer incorporated in dedicated hardware, and a computer, for example, a general-purpose personal computer, capable of performing various types of functions under various types of programs installed in the computer.

Figure 71:
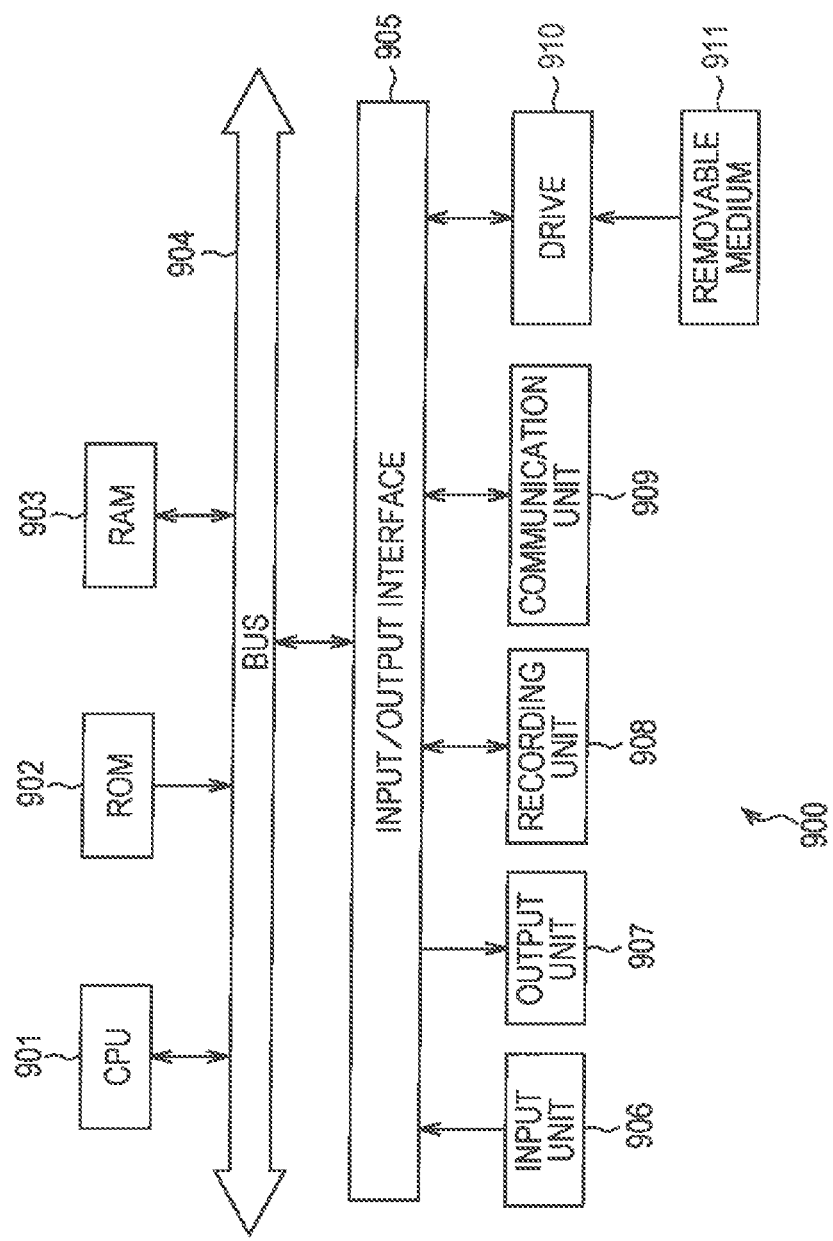
FIG. 71 is a view illustrating a configuration example of a computer.

FIG. 71 is a block diagram illustrating a configuration example of hardware of a computer which executes the series of processes described herein by a program.

The Central Processing Unit (CPU) 901, a Read Only Memory (ROM) 902, and a Random Access Memory (RAM) 903 of a computer 900 are connected with each other via a bus 904. An input/output interface 905 is further connected to the bus 904. An input unit 906, an output unit 907, a recording unit 908, a communication unit 909, and a drive 910 are connected to the input/output interface 905.

The input unit 906 is constituted by a keyboard, a mouse, a microphone and the like. The output unit 907 is constituted by a display, a speaker and the like. The recording unit 908 is constituted by a hard disk, a non-volatile memory and the like. The communication unit 909 is constituted by a network interface and the like. The drive 910 drives a removable medium 911 such as a magnetic disk, an optical disk, a magneto-optical disk, or a semiconductor memory.

The CPU 901 of the computer 900 having this structure loads programs recorded in the recording unit 908 into the RAM 903 via the input/output interface 905 and the bus 904, and executes the programs to perform the series of processes described above.

The programs executed by the computer 900 (CPU 901) may be provided in a form recorded in the removable medium 911 corresponding to a package medium. Alternatively, the programs may be provided via a wired or wireless transmission medium such as a local area network, the Internet, and digital satellite broadcasting.

According to the computer 900, the removable medium 911 may be attached to the drive 910 to install the programs into the recording unit 908 via the input/output interface 905. Alternatively, programs may be received by the communication unit 909 via a wired or wireless transmission medium and installed into the recording unit 908. Instead, programs may be installed beforehand into the ROM 902 or the recording unit 908.

Programs executed by the computer 900 may execute processes in time series in the order described in the present specification, or may execute processes in parallel or at necessary timing such as the timing of calls.

According to the present specification, processing steps describing programs under which the computer 900 executes various types of processes need not be processed in time series corresponding to the order described in the flowcharts, but may be performed in parallel or individually (such as parallel processes and processes by objects).

Programs may be processed only by one computer, or may be separately processed by a plurality of computers. Furthermore, the programs may be transferred to a remote computer to be executed by the remote computer.

According to the present specification, the system refers to a collection of plural constituent elements (such as devices and modules (parts)). In this case, all of the constituent elements are not required to be included in an identical housing. Accordingly, multiple devices accommodated in separate houses and connected via a network, and one device including multiple modules accommodated within one housing are both regarded as systems.

Embodiments of the present technology are not limited to the specific embodiment described herein. Various modifications and changes may be made without departing from the subject matters of the present technology. For example, the present technology is applicable to a system of cloud computing where one function is shared by multiple devices and processed in cooperation with one another via a network.

The respective steps discussed with reference to the foregoing flowcharts may be shared and executed by multiple devices rather than executed by one device. When multiple processes are contained in one step, the multiple processes contained in the one step may be shared and executed by multiple devices rather than executed by one device.

The present technology may have the following configurations.

(1)

A receiving device including:

a receiving unit that receives a broadcasting wave of digital broadcasting using an IP (Internet Protocol) transmission method; and a processing unit that processes one or a plurality of components constituting a particular service of a plurality of services included in the broadcasting wave, and a first control signal transmitted by File Delivery over Unidirectional Transport (FLUTE) session in such a manner that the component or components and the first control signal are processed in units of service based on an IP address contained in each packet.

(2)

The receiving device according to (1), wherein a packet of the component and a packet of the first control signal contained in an identical service have an identical IP address.

(3)

The receiving device according to (1) or (2), wherein the first control signal is used in a first layer corresponding to a layer higher than an IP layer in layers of protocol in the IP transmission method, and at least contains information about the component constituting the particular service.

(4)

The receiving device according to (3), wherein the broadcasting wave transmits a second control signal used in a second layer corresponding to a layer lower than the IP layer, and the second control signal at least contains an ID for identifying a network, an ID for identifying a transport stream, and an ID for identifying a service.

(5)

The receiving device according to any one of (1) through (4), wherein the particular first control signal transmitted by FLUTE session is designated based on URL (Uniform Resource Locator) information contained in an electronic service guide transmitted by the broadcasting wave for designating the first control signal.

(6)

The receiving device according to (4), wherein the second control signal contains information indicating whether a particular service is on the air.

(7)

The receiving device according to (4) or (6), wherein the first control signal and the second control signal are contained in an SGDU (Service Guide Delivery Unit) container and transmitted.

(8)

A receiving method for a receiving device, the method including steps of:

allowing the receiving device to receive a broadcasting wave of digital broadcasting using an IP transmission method; and allowing the receiving device to process one or a plurality of components constituting a particular service of a plurality of services included in the broadcasting wave, and a first control signal transmitted by FLUTE session, in such a manner that the component or components and the first control signal are processed in units of service based on an IP address contained in each packet.

(9)

A transmitting device including:

a component acquisition unit that acquires one or a plurality of components;

a control signal acquisition unit that acquires a control signal; and a transmission unit that transmits a broadcasting wave of digital broadcasting using an IP transmission method in such a manner that a packet of the component constituting a particular service and a packet of the control signal transmitted by FLUTE session have an identical IP address.

(10)

A transmitting method for a transmitting device, the method including the steps of:

allowing the transmitting device to acquire one or a plurality of components;

allowing the transmitting device to acquire a control signal; and allowing the transmitting device to transmit a broadcasting wave of digital broadcasting using an IP transmission method in such a manner that a packet of the component constituting a particular service and a packet of the control signal transmitted by FLUTE session have an identical IP address.

(11)

A receiving device including:

a receiving unit that receives a broadcasting wave of digital broadcasting using an IP transmission method; and a processing unit that processes one or a plurality of components constituting a particular service of a plurality of services included in the broadcasting wave, and a first control signal transmitted by UDP (User Datagram Protocol), in such a manner that the component or components and the first control signal are processed in units of service based on an IP address contained in each packet.

(12)

The receiving device according to (11), wherein a packet of the component and a packet of the first control signal contained in an identical service have an identical IP address.

(13)

The receiving device according to (11) or (12), wherein the first control signal is used in a first layer corresponding to a layer higher than an IP layer in layers of protocol in the IP transmission method, and at least contains information about the component constituting the particular service.

(14)

The receiving device according to (13), wherein the broadcasting wave transmits a second control signal used in a second layer corresponding to a layer lower than the IP layer, and the second control signal at least contains an ID for identifying a network, an ID for identifying a transport stream, and an ID for identifying a service.

(15)

The receiving device according to (14), wherein the first control signal and the second control signal are contained in an SGDU container and transmitted.

(16)

The receiving device according to (15), wherein the packet of the first control signal contains first URL information for designating the first control signal as extension information of SGDU, and the particular first control signal transmitted by UDP is designated by specifying the first URL information based on second URL information that is contained in an electronic service guide transmitted by the broadcasting wave and designates the first control signal.

(17)

The receiving device according to any one of (14) through (16), wherein the second control signal contains information indicating whether a particular service is on the air.

(18)

A receiving method for a receiving device, the method including the steps of:

allowing the receiving device to receive a broadcasting wave of digital broadcasting using an IP transmission method; and allowing the receiving device to process one or a plurality of components constituting a particular service of a plurality of services included in the broadcasting wave, and a first control signal transmitted by UDP, in such a manner that the component or components and the first control signal are processed in units of service based on an IP address contained in each packet.

(19)

A transmitting device including:

a component acquisition unit that acquires one or a plurality of components;

a control signal acquisition unit that acquires a control signal; and a transmission unit that transmits a broadcasting wave of digital broadcasting using an IP transmission method in such a manner that a packet of the component constituting a particular service and a packet of the control signal transmitted by UDP have an identical IP address.

(20)

A transmitting method for a transmitting device, the method including the steps of:

allowing the transmitting device to acquire one or a plurality of components, allowing the transmitting device to acquire a control signal, and allowing the transmitting device to transmit a broadcasting wave of digital broadcasting using an IP transmission method in such a manner that a packet of the component constituting a particular service and a packet of the control signal transmitted by UDP have an identical IP address.

REFERENCE SIGNS LIST

1 Broadcasting system
10 Transmitting device
20 Receiving device
111 Video data acquisition unit
113 Audio data acquisition unit
117 Control signal acquisition unit
119 File data acquisition unit
121 Mux
122 Transmission unit
212 Tuner
213 Demux
214 Clock generator
215 Video decoder
216 Video output unit
217 Audio decoder
218 Audio output unit
219 Caption decoder
220 FLUTE processing unit
221 Storage
222 Control signal processing unit
223 NVRAM
224 Service package unit
225 Communication I/F
226 Browser
251 BBP filter
252 IP filter
253 UDP filter
254 LCT filter
255 SGDU filter bank
900 Computer
901 CPU

The invention claimed is:

1. A receiving device, comprising:
a receiver configured to receive a broadcast stream, the broadcast stream including a plurality of services, each of the plurality of services including one or a plurality of components and a first control signal transmitted by a unidirectional transport session; and
processing circuitry configured to process the one or the plurality of components constituting a particular service of the plurality of services included in the broadcast stream, and process the first control signal of the particular service received from signals transmitted by the unidirectional transport session according to an Internet Protocol (IP) address, wherein
each of the plurality of services is associated with a different IP address that is contained in packets of the one or the plurality of components and the first control signal of the respective service, and in an IP layer, wherein no transport layer exists between the IP layer and a physical layer in a protocol stack.

2. The receiving device according to claim 1, wherein
the broadcast stream is broadcast according to an IP transmission method, and
the first control signal is used in a first layer that is higher than the IP layer of the protocol stack of the IP transmission method, and at least contains information about the one or the plurality of components constituting the particular service.

3. The receiving device according to claim 2, wherein
the broadcast stream includes a second control signal used in a second layer that is lower than the first layer, and
the second control signal at least contains an identification for identifying a network, an identification for identifying a transport stream, and an identification for identifying a service.

4. The receiving device according to claim 3, wherein the first control signal of the particular service transmitted by the unidirectional transport session is designated based on uniform resource locator (URL) information contained in an electronic service guide in the broadcast stream for designating the first control signal of the particular service.

5. The receiving device according to claim 3, wherein the second control signal contains information indicating whether the particular service is on the air.

6. The receiving device according to claim 3, wherein the first control signal of the particular service and the second control signal are contained in a service guide delivery unit (SGDU) container and transmitted.

7. The receiving device according to claim 1, wherein the unidirectional transport session is a file delivery over unidirectional transport (FLUTE) session.

8. A receiving method comprising:
receiving a broadcast stream, the broadcast stream including a plurality of services, each of the plurality of services including one or a plurality of components and a first control signal transmitted by a unidirectional transport session; and
processing the one or the plurality of components constituting a particular service of the plurality of services included in the broadcast stream, and processing the first control signal of the particular service received from signals transmitted by the unidirectional transport session according to an Internet Protocol (IP) address, wherein
each of the plurality of services is associated with a different IP address that is contained in packets of the one or the plurality of components and the first control signal of the respective service, and in an IP layer, wherein no transport layer exists between the IP layer and a physical layer in a protocol stack.

9. The receiving method according to claim 8, wherein
the broadcast stream is broadcast according to an IP transmission method, and
the first control signal is used in a first layer that is higher than the IP layer of the protocol stack of the IP transmission method, and at least contains information about the one or the plurality of components constituting the particular service.

10. The receiving method according to claim 9, wherein
the broadcast stream includes a second control signal used in a second layer that is lower than the first layer, and
the second control signal at least contains an identification for identifying a network, an identification for identifying a transport stream, and an identification for identifying a service.

11. The receiving method according to claim 10, wherein the first control signal of the particular service transmitted by the unidirectional transport session is designated based on uniform resource locator (URL) information contained in an electronic service guide in the broadcast stream for designating the first control signal of the particular service.

12. The receiving method according to claim 10, wherein the second control signal contains information indicating whether the particular service is on the air.

13. The receiving method according to claim 10, wherein the first control signal of the particular service and the second control signal are contained in a service guide delivery unit (SGDU) container and transmitted.

14. The receiving method according to claim 8, wherein the unidirectional transport session is a file delivery over unidirectional transport (FLUTE) session.

15. A non-transitory computer readable storage medium storing instructions, which, when being executed by processing circuitry of a receiving device, cause the processing circuitry to perform a method comprising:
receiving a broadcast stream, the broadcast stream including a plurality of services, each of the plurality of services including one or a plurality of components and a first control signal transmitted by a unidirectional transport session; and
processing the one or the plurality of components constituting a particular service of the plurality of services included in the broadcast stream, and processing the first control signal of the particular service received from signals transmitted by the unidirectional transport session according to an Internet Protocol (IP) address, wherein
each of the plurality of services is associated with a different IP address that is contained in packets of the one or the plurality of components and the first control signal of the respective service, and in an IP layer, wherein no transport layer exists between the IP layer and a physical layer in a protocol stack.

16. The non-transitory computer readable storage medium according to claim 15, wherein
the broadcast stream is broadcast according to an IP transmission method, and
the first control signal is used in a first layer that is higher than the IP layer of the protocol stack of the IP transmission method, and at least contains information about the one or the plurality of components constituting the particular service.

17. The non-transitory computer readable storage medium according to claim 16, wherein the broadcast stream includes a second control signal used in a second layer that is lower than the first layer, and the second control signal at least contains an identification for identifying a network, an identification for identifying a transport stream, and an identification for identifying a service.

18. The non-transitory computer readable storage medium according to claim 17, wherein the first control signal of the particular service transmitted by the unidirectional transport session is designated based on uniform resource locator (URL) information contained in an electronic service guide in the broadcast stream for designating the first control signal of the particular service.

19. The non-transitory computer readable storage medium according to claim 17, wherein the second control signal contains information indicating whether the particular service is on the air.

20. The non-transitory computer readable storage medium according to claim 17, wherein the first control signal of the particular service and the second control signal are contained in a service guide delivery unit (SGDU) container and transmitted.

\* \* \* \* \*